(12) United States Patent  (10) Patent No.: US 9,957,170 B2
Nakamura et al.  (45) Date of Patent: May 1, 2018

(54) WATER TREATMENT DEVICE AND WATER TREATMENT METHOD

(71) Applicant: MITSUBISHI ELECTRIC CORPORATION, Chiyoda-ku (JP)

(72) Inventors: Yasuhiro Nakamura, Chiyoda-ku (JP); Yasutaka Inanaga, Chiyoda-ku (JP); Akira Morikawa, Chiyoda-ku (JP); Tokiko Yamauchi, Chiyoda-ku (JP); Takao Tsurimoto, Chiyoda-ku (JP); Hirotaka Muto, Chiyoda-ku (JP); Gaku Oinuma, Chiyoda-ku (JP); Masakazu Taki, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 433 days.

(21) Appl. No.: 14/438,805

(22) PCT Filed: Nov. 7, 2013

(86) PCT No.: PCT/JP2013/080114
§ 371 (c)(1),
(2) Date: Apr. 27, 2015

(87) PCT Pub. No.: WO2014/077181
PCT Pub. Date: May 22, 2014

(65) Prior Publication Data
US 2015/0251933 A1  Sep. 10, 2015

(30) Foreign Application Priority Data

Nov. 13, 2012  (JP) .................................. 2012-249043
Apr. 12, 2013  (JP) .................................. 2013-083925
Aug. 13, 2013  (JP) .................................. 2013-168070

(51) Int. Cl.
C02F 1/46  (2006.01)
C02F 1/74  (2006.01)
(Continued)

(52) U.S. Cl.
CPC .............. *C02F 1/4608* (2013.01); *C02F 1/74* (2013.01); *C02F 2001/46171* (2013.01);
(Continued)

(58) Field of Classification Search
None
See application file for complete search history.

(56) References Cited

U.S. PATENT DOCUMENTS 3,706,646 A * 12/1972 Gibson, Jr. ............... C02F 5/08
                                                                 204/272
5,464,513 A   11/1995 Goriachev et al.
(Continued)

FOREIGN PATENT DOCUMENTS

JP  2002 159973  6/2002
JP  2003 62579   3/2003
(Continued)

OTHER PUBLICATIONS

International Search Report dated Dec. 10, 2013 in PCT/JP2013/080114 Filed Nov. 7, 2013.

*Primary Examiner* — Krishnan S Menon
*Assistant Examiner* — Bradley R Spies
(74) *Attorney, Agent, or Firm* — Oblon, McClelland, Maier & Neustadt, L.L.P.

(57) ABSTRACT

A water treatment device generates a bubble in water to be treated inside a treatment tank, and treats the water to be treated through use of radicals that are generated by bubble electric discharge caused via the bubble. The water treatment device includes main electrodes for forming a main discharge area between a first main electrode and a second
(Continued)

main electrode, auxiliary electrodes for forming a preliminary discharge area between a first auxiliary electrode and a second auxiliary electrode, and a bubble generator generating a bubble in water to be treated through use of an externally supplied gas. When a bubble generated by the bubble generator passes through the preliminary discharge area, discharge is caused via the bubble, and, when the bubble in an excited state subsequently passes through the main discharge area, the bubble causes discharge again to generate radicals.

14 Claims, 41 Drawing Sheets

(51) Int. Cl.
    *C02F 101/30*     (2006.01)
    *C02F 1/461*     (2006.01)

(52) U.S. Cl.
    CPC .... *C02F 2101/30* (2013.01); *C02F 2201/003* (2013.01); *C02F 2201/4619* (2013.01); *C02F 2201/46175* (2013.01); *C02F 2201/48* (2013.01); *C02F 2305/023* (2013.01)

(56) References Cited

U.S. PATENT DOCUMENTS

| | | |
|---|---|---|
| 2002/0008014 A1 | 1/2002 | Adachi et al. |
| 2006/0060464 A1 | 3/2006 | Chang |
| 2012/0048792 A1 | 3/2012 | Saitou et al. |
| 2014/0054242 A1* | 2/2014 | Imai .................. C02F 1/4608 |
| | | 210/748.17 |

FOREIGN PATENT DOCUMENTS

| | | |
|---|---|---|
| JP | 2004 89935 | 3/2004 |
| JP | 2005 13858 | 1/2005 |
| JP | 2005 529455 | 9/2005 |
| JP | 2007 207540 | 8/2007 |
| JP | 3983282 | 9/2007 |
| JP | 2010 22991 | 2/2010 |
| JP | 2010 58036 | 3/2010 |
| JP | 2012 176347 | 9/2012 |
| JP | 2013 31800 | 2/2013 |
| WO | 95 18768 | 7/1995 |
| WO | 03 096767 | 11/2003 |
| WO | 2010 131429 | 11/2010 |
| WO | WO 2012157034 A1 * | 11/2012 ............ C02F 1/4608 |

* cited by examiner

| SUBSTANCE | OXIDATION-REDUCTION POTENTIAL [V] |
|---|---|
| OH | 2.85 |
| O | 2.42 |
| $O_3$ | 2.07 |
| $H_2O_2$ | 1.78 |
| $Cl_2$ | 1.36 |

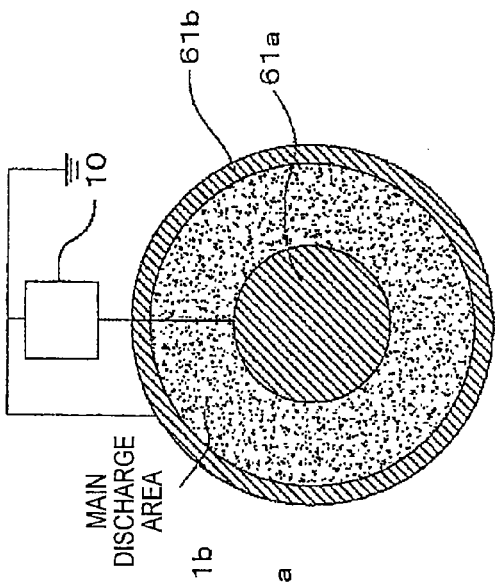
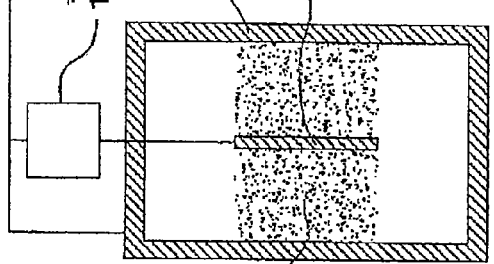
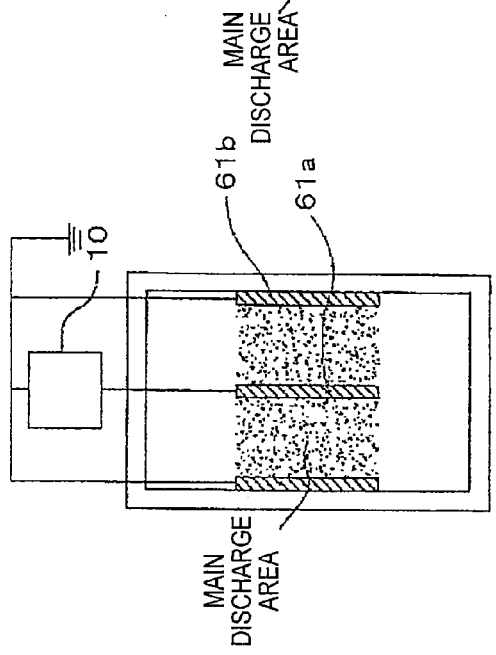

FIG. 17A
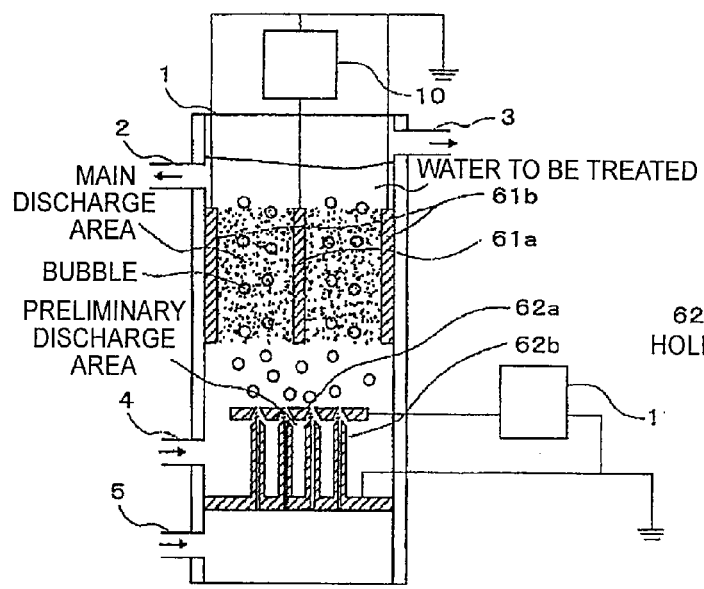
FIG. 17B
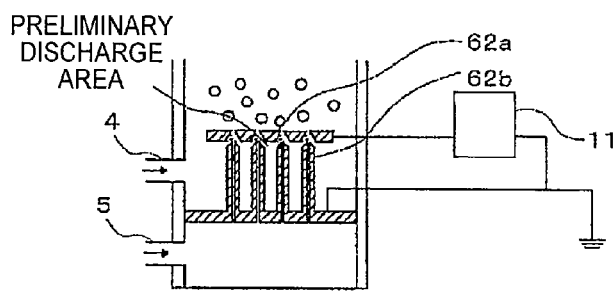
FIG. 17C
FIG. 17D

WATER TREATMENT DEVICE AND WATER TREATMENT METHOD

TECHNICAL FIELD

The present invention relates to a water treatment device and a water treatment method for treating water to be treated through use of radicals generated via bubbles in the water.

BACKGROUND ART

There has been known a waste water treatment device in which, in order to treat organic substances in waste water by degradation, a cathode nozzle covered entirely with an insulator except the exposed tip to serve as a first electrode and an anode opposed to the cathode nozzle to serve as a second electrode are disposed inside a treatment tank, and the first electrode and the second electrode are each connected to a high-voltage pulse power supply. In this type of waste water treatment device, bubbles are generated in waste water from the tip of the cathode nozzle while high-voltage pulses are applied to the cathode nozzle and the anode which are electrodes, thereby applying an electric field directly to the bubbles and causing "bubble electric discharge". Bubble electric discharge generates oxidized radicals, with which organic substances in waste water are treated by degradation (see, for example, Patent Literature 1).

Causing bubble electric discharge requires supplying initial electrons. A problem is that the lack of free electrons in bubbles in water is not conducive to discharge. As a way to supply initial electrons necessary to start discharge to the interior of bubbles, hitherto, there has been known discharge-inside-bubbles that uses an X-ray irradiator to apply voltage while irradiating the space between opposed electrodes with an X-ray beam (see, for example, Non Patent Literature 1).

CITATION LIST

Patent Literature

[PTL 1] JP 2005-58887 A

Non Patent Literature

[NPL 1] Kenji Horii, "Generation of Discharges in Underwater Bubbles and their Utilization", Papers of Technical Meeting on Electrical Discharge, Institute of Electrical Engineers of Japan, Japan, Nagoya University, Aug. 20, 1973, Paper No. ED-73-22, pp. 1-5

SUMMARY OF INVENTION

Technical Problems

However, with the waste water treatment device of related art that is disclosed in Patent Literature 1, bubbles are generated in a limited area in the vicinity of the tip of the cathode nozzle. This gives rise to a problem in that treating waste water in a large-capacity treatment tank takes time and is low in treatment efficiency.

With the discharge-inside-bubbles disclosed in Non Patent Literature 1, the attenuation of an X-ray in water makes it difficult to irradiate bubbles that are located apart from the X-ray irradiator in an X-ray irradiation direction. The resultant problem is that efficient discharge from bubbles dispersed over a wide range is difficult.

The present invention has been made to solve the problems described above, and an object of the present invention is therefore to obtain a water treatment device and a water treatment method which are applicable to a large-capacity treatment tank and are capable of improving the efficiency of treating waste water in a treatment tank.

Solution to Problems

According to one embodiment of the present invention, there is provided a water treatment device for treating water to be treated inside a treatment tank by generating a bubble in the water to be treated and causing discharge through use of the bubble, the water treatment device including: discharge electrodes placed in the water to be treated; a bubble generating unit having a bubble hole through which an externally supplied gas emerges as a bubble into the water to be treated; a high-voltage power supply; and a bubble flattening unit placed in the water to be treated to flatten a shape of the bubble generated by the bubble generating unit, in which: the high-voltage power supply applies a high voltage between the discharge electrodes to form a discharge area in which discharge is caused inside the bubble; and the bubble flattened by the bubble flattening unit is emitted into the discharge area.

Further, according to one embodiment of the present invention, there is provided a method of treating water including: a bubble generating step of generating, by the bubble generating unit, the bubble in the water to be treated inside the treatment tank; a bubble flattening step of flattening, by the bubble flattening unit, the bubble generated in the bubble generating step; a preliminary discharge step of causing preliminary discharge in which charged particles are generated inside the bubble, by emitting the bubble that has been flattened in the bubble flattening step into the discharge area and discharging by the discharge electrodes for the bubble; and a main discharge step of continuing the discharge by the discharge electrodes for the bubble during a period in which the bubble that has undergone the preliminary discharge in the preliminary discharge step stays in the discharge area.

Advantageous Effects of Invention

According to the water treatment device of one embodiment of the present invention, the discharge is caused inside the bubble generated by the bubble generating unit when the bubble passes through the preliminary discharge area, and, when the bubble subsequently passes through the main discharge area, the discharge is again caused inside the bubble.

Further, the water treatment method according to one embodiment of the present invention includes the steps of: bringing the bubble into the excited state by causing the discharge through use of the bubble when the generated bubble generated in the treatment tank passes through the preliminary discharge area in water; and generating the radicals by causing the discharge through use of the bubble when the excited bubble passes through the main discharge area in water.

It is therefore possible to apply the water treatment device and the water treatment method to a large-capacity treatment tank and improve the efficiency of treating the waste water in the treatment tank.

BRIEF DESCRIPTION OF DRAWINGS

FIG. 4A is a structural diagram illustrating the water treatment device according to Embodiment 1 of the present invention, FIG. 4B is a structural diagram illustrating a water treatment device according to Embodiment 2 of the present invention, and FIG. 4C is a structural diagram illustrating a water treatment device according to Embodiment 3 of the present invention.

FIGS. 17A to 17D are structural diagrams illustrating a water treatment device according to Embodiment 16 of the present invention.

DESCRIPTION OF EMBODIMENTS

Figure 1:
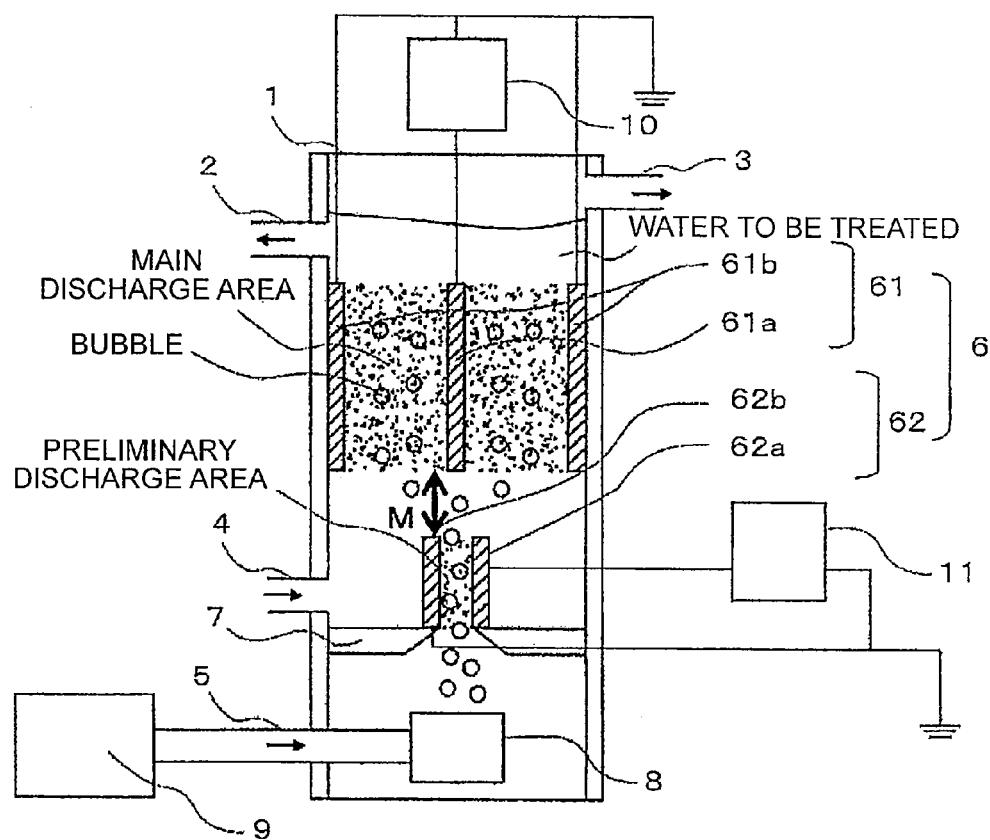
FIG. 1 is a structural diagram illustrating a water treatment device according to Embodiment 1 of the present invention.

Now, a water treatment device and a water treatment method according to preferred embodiments of the present invention are described referring to the accompanying drawings. In the drawings, the same or corresponding parts are denoted by the same reference symbols for description.

Embodiment 1

FIG. 1 is a structural diagram illustrating a water treatment device according to Embodiment 1 of the present invention. In FIG. 1, the main body of the water treatment device is a treatment tank 1 in which water to be treated is stored or through which the water to be treated is run. Provided in an upper part of the treatment tank 1 are a water outlet 2 and a gas outlet 3. A water inlet 4 and a gas inlet 5 are provided in a lower part of the treatment tank 1.

Provided in the interior of the treatment tank 1 are a discharge unit 6 and a bubble leading guide 7 and a bubble generating unit 8, which are disposed below the discharge unit 6. The discharge unit 6 includes main electrodes 61, which constitute an upper part, and auxiliary electrodes 62, which constitute a lower part. The bubble generating unit 8 is connected to a gas supply 9 through the gas inlet 5.

The main electrodes 61 include a first main electrode 61a and a second main electrode 61b. The first main electrode 61a is connected to a first power supply 10, and the second main electrode 61b is connected to a ground. A main discharge area is formed between the first main electrode 61a and the second main electrode 61b. It is sufficient if a given voltage required for discharge is applied between the first main electrode 61a and the second main electrode 61b, and giving the second main electrode 61b a ground electric potential is not always necessary.

The auxiliary electrodes 62 include a first auxiliary electrode 62a and a second auxiliary electrode 62b. The first auxiliary electrode 62a is connected to a second power supply 11, and the second auxiliary electrode 62b is connected to a ground. A preliminary discharge area is formed between the first auxiliary electrode 62a and the second auxiliary electrode 62b. It is sufficient if a given voltage required for discharge is applied between the first auxiliary electrode 62a and the second auxiliary electrode 62b, and giving the second auxiliary electrode 62b a ground electric potential is not always necessary.

A difference between the main electrodes 61 and the auxiliary electrodes 62 is that the auxiliary electrodes 62, whose purpose is to generate initial electrons inside bubbles by discharging through use of bubbles through the application of a high electric field, are narrower in the gap between electrodes and narrower in discharge area as well in order to apply a high electric field. The main electrodes 61, on the other hand, are to generate radicals efficiently by discharging through use of bubbles that contain initial electrons generated by preliminary discharge, over a wide area, through the application of a low electric field, and are formed to have a wide gap between electrodes and a wide discharge area. A voltage applied to the main discharge area can therefore be lower than a discharge starting voltage that is required when preliminary discharge is not used.

In the case where the electric field of the preliminary discharge area and the electric field of the main discharge area are not uniform, a solution is, for example, setting so that the average field intensity of the preliminary discharge area is higher than the average field intensity of the main discharge area, or setting so that the intensity of an electric field applied to bubbles in the preliminary discharge area is higher than the intensity of an electric field applied to bubbles in the main discharge area. The preliminary discharge area and the main discharge area are an area where preliminary discharge substantially takes place and an area where main discharge substantially takes place, respectively.

The operation of the water treatment device according to Embodiment 1 of the present invention is described next. First, the water to be treated is poured from the water inlet 4 into the treatment tank 1 to be stored. Oxygen or steam, or a mixture gas of oxygen and steam, is introduced into the bubble generating unit 8 from the gas supply 9 through the gas inlet 5, thereby generating bubbles in the water to be treated.

The generated bubbles travel along the bubble leading guide 7 to be supplied to the preliminary discharge area. At this point, a high voltage is applied to the main electrodes 61 and the auxiliary electrodes 62 from the first power supply 10 and the second power supply 11, respectively, to thereby form a high electric field in the main discharge area and the preliminary discharge area each.

The bubbles passing through the preliminary discharge area cause discharge (preliminary discharge), which supplies initial electrons to the bubbles. When the bubbles containing initial electrons (bubbles in an excited state) subsequently pass through the main discharge area, discharge is again caused via the bubbles (main discharge), thereby generating radicals with which the water to be treated is treated. Some of the bubbles that remain unreacted are let out of the gas outlet 3.

In Embodiment 1 of the present invention, "bubble electric discharge" refers to causing discharge on the boundary of a bubble or inside a bubble while the boundary of the bubble is in contact with water. The principle of the generation of radicals by bubble electric discharge is described below.

First, when discharge is caused through use of a bubble that contains oxygen, O radicals are generated inside the bubble by a collision that is caused between electrons and oxygen molecules by the discharge as expressed by Reaction Formula (1).

$$e + O_2 \rightarrow O + O \qquad (1)$$

The O radicals further react with water molecules, generating OH radicals as expressed by Reaction Formula (2).

$$O + H_2O \rightarrow 2OH \qquad (2)$$

Discharge through use of a bubble that contains moisture also generates OH radicals through a collision between electrons and water molecules as expressed by Reaction Formula (3).

$$e + H_2O \rightarrow OH + H \qquad (3)$$

The principle of the generation of radicals by bubble electric discharge has now been described. When the reaction of radicals progresses further in a bubble that contains oxygen and/or moisture, ozone, hydrogen peroxide, and the like are generated as well and contribute to the treatment of water to be treated more than a little.

Figures 2, 3:
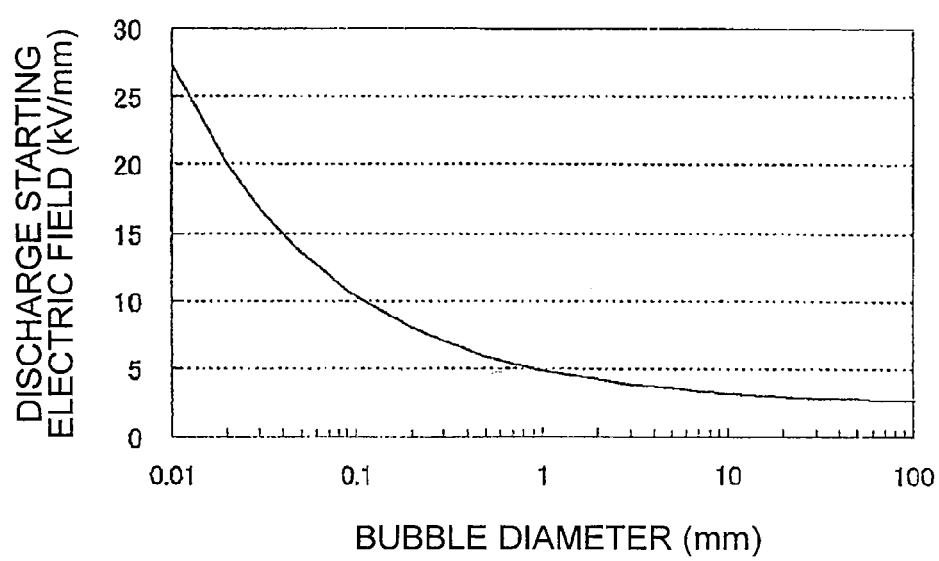
FIG. 2 is an explanatory diagram showing an action and effect of the water treatment device according to Embodiment 1 of the present invention.
FIG. 3 is an explanatory diagram showing another action and effect of the water treatment device according to Embodiment 1 of the present invention.

FIG. 2 shows for each relevant substance an oxidation-reduction potential which is an indicator of the oxidizing power of the substance. A higher oxidation-reduction potential means higher oxidative activity, namely, a stronger effect on the treatment of water to be treated. In FIG. 2, the oxidation-reduction potentials of OH radicals and O radicals which are 2.85 volts and 2.42 volts, respectively, exceed the oxidation-reduction potential of ozone which is 2.07 volts.

The core mechanism of the treatment of water to be treated by bubble electric discharge resides in the degradation of target components (persistent components) in water to be treated by these radicals generated inside bubbles. Other substances than those mentioned above generate oxygen ions and the like by bubble electric discharge but are low in oxidative activity, and remain inside bubbles for a relatively long term.

Described next is an applied electric field that is necessary to cause discharge through use of bubbles in water. An electric field $E_2$ applied to an oxygen bubble that is located between a pair of plate electrodes in water is expressed by Expression (4) when a uniform electric field between the pair of plate electrodes is given as $E_1$, the relative permittivity of water is given as $\varepsilon_1$, and the relative permittivity of oxygen bubbles is given as $\varepsilon_2$.

[Math. 1]

$$E_2 = \frac{3\varepsilon_1}{2\varepsilon_1 + \varepsilon_2} E_1 \quad (4)$$

FIG. 3 shows a relation between the diameter of an oxygen bubble in water and the discharge starting electric field which is derived from Paschen's law. A smaller bubble diameter equals a greater applied electric field that is necessary to cause discharge.

Radicals generated by bubble electric discharge in water react on the boundary between water to be treated and a bubble, and it is therefore important to increase the areal dimension of contact on the gas-liquid boundary in view of improving efficiency in the treatment of water to be treated. Causing discharge through use of a large quantity of bubbles each having a small bubble diameter is therefore desirable.

However, because a smaller bubble diameter means that a higher electric field intensity is required to cause discharge due to the situation described above, bubble electric discharge needs to be accomplished at a bubble diameter that is adequate to cause discharge when the electric field applied to a bubble is taken into consideration based on power supply performance, the discharge gap, the electrode shape, and the relative permittivity of water to be treated.

Discharge in water also has the issue of energy loss due to Joule loss. Specifically, the conductivity is low at 1 µS/cm or less and the insulating properties are high in highly pure water such as ion exchanged water, whereas water to be treated which contains many impurities is high in conductivity.

The application of a high voltage therefore leads to Joule loss in which most are consumed as thermal energy by energization. Joule loss increases in proportion to voltage application time, and is reduced by momentary voltage application that lasts a hundred nanoseconds or so. For that reason, a short-pulse power supply capable of outputting a voltage waveform that is quick to rise and is short in voltage application time is used when discharge is caused in water.

A bubble in water has fewer electrons and ions (initial electrons) which trigger discharge than in the air, thus making the probability of discharge markedly low. This problem affects a bubble with a smaller bubble diameter more prominently, and could cause a delay of several minutes or more till discharge (a discharge delay).

Known countermeasures for lessening this adverse effect include an excessive application of an electric field compared to the discharge starting electric field of bubbles, and to supply initial electrons by ionizing a bubble in advance through X-ray irradiation or the like.

In light of the above, Embodiment 1 of the present invention involves conducting preliminary discharge of bubbles in the preliminary discharge area to supply bubbles with initial electrons of discharge such as electrons and ions. The discharge delay which is on the order of $10^3$ to $10^5$ seconds when the bubble diameter is 1 mm is thus eliminated, and the main electrodes 61 in the downstream can cause discharge at the electric field application condition of FIG. 3 which is approximately the same as the one for discharge in the air.

In order to examine the duration of the effect of preliminary discharge in the water treatment device according to Embodiment 1 of the present invention, tests were conducted by varying a distance M between the auxiliary electrodes 62 and the main electrodes 61. As a result, the causing of main discharge became unstable when the distance M between the auxiliary electrodes and the main electrodes reached 40 mm. A moving velocity v of a bubble at this point was 400 mm/seconds. In short, the duration of the effect of preliminary discharge is approximately 0.1 seconds, which is a value obtained by dividing M by v.

A preferred time interval till a bubble that has exited the preliminary discharge area is introduced into the main discharge area is accordingly 0.1 seconds or less in Embodiment 1 of the present invention. It is therefore preferred to set the distance between the auxiliary electrodes and the main electrodes so that the following expression which is expressed in terms of the moving velocity of a bubble is satisfied.

[Math. 2]

$$\frac{M}{v} \leq 0.1$$

This makes large-volume discharge possible in water to be treated that contains a large quantity of minute bubbles via, for example, a plate electrode that has large areal dimensions, without utilizing an electric field concentration effect which is obtained by giving an electrode a particular shape, or utilizing X-ray irradiation. As a result, efficiency in the treatment of water to be treated is improved.

In addition, because the main electrodes 61 and the auxiliary electrodes 62 are both structured so as to be in contact with water to be treated all the time, a local rise in electrode temperature due to discharge-induced heat is mitigated and, even when a material that has a relatively low strength such as alumina ceramic is used, damage from the stress of local thermal expansion is prevented.

While oxygen bubbles or steam bubbles are used in Embodiment 1 of the present invention, discharge via various gasses can be employed. Specifically, nitrogen or the air, or a rare gas such as argon or helium, or a mixture gas thereof can be used. In the case where oxygen or steam is mixed in an inert gas such as nitrogen, for example, resultant radicals have a relatively long life span and the effect of degradation by radicals is improved.

In the case where a mixture gas of argon and oxygen, or argon and steam, is used, discharge can be caused by an electric field that is lower than when oxygen or steam is used. However, the type and composition of discharge gas are not limited to the examples given above.

The gas supply 9 in Embodiment 1 of the present invention can be a gas canister to which a mass flow controller is connected as means for supplying a desired gas at a given flow rate. Means for generating steam can be one that includes an electric heater to heat water. However, it is sufficient if a gas having a desired composition is supplied at a desired flow rate to the bubble generating unit 8, and the method of supplying a gas and the method of generating steam are not limited to the examples given above.

The bubble generating unit 8 in Embodiment 1 of the present invention can be means that use a plate with a hole or an airstone. However, it is sufficient if bubbles having a desired shape (bubble diameter) are supplied in a desired quantity into water, and the bubble generating unit 8 is not limited to the example given above.

In Embodiment 1 of the present invention, a metal material such as stainless steel, aluminum, or copper can be used as the material of the main electrodes 61 and the auxiliary electrodes 62. However, the material and machining method for the electrodes are not particularly limited.

In Embodiment 1 of the present invention, discharge-side surfaces of the main electrodes 61 and the auxiliary electrodes 62 may be covered with a dielectric. This suppresses contamination of water to be treated caused by the precipitation of metal components of the electrodes due to ion etching or electrolysis when bubble electric discharge is caused in the vicinity of electrode surfaces. Alumina ceramic or glass, for example, can be used as the material of the dielectric. The dielectric can be formed by, for example, the thermal spraying of alumina ceramics or glass onto the circumference of a metal body. However, it is sufficient if the dielectric is formed to a desired thickness on the electrode surfaces, and the material and machining method for the dielectric are not particularly limited.

A preferred thickness range of the dielectric is from 10 µm to 5,000 µm. This is because a dielectric film that is too thin is insufficient in dielectric strength and a dielectric film that is too thick requires the application of a huge voltage to cause discharge.

A power supply that is preferred as the first power supply 10 in Embodiment 1 of the present invention outputs a voltage waveform that is quick to rise and is narrow in width (short in voltage application time) in order to lessen the adverse effect of Joule loss of water to be treated. Specifically, a power supply that outputs a pulsed voltage can be used. A preferred frequency range and preferred applied voltage range of the power supply are approximately from 10 Hz to 1 MHz and approximately from 1 kV to 200 kv, respectively.

This is because a frequency that is too low requires the application of a huge voltage to input a given power while a frequency that is too high leads to a huge power consumption, and an applied voltage that is too low results in a failure to cause discharge while an applied voltage that is too high increases the cost of introducing a power supply. However, the specifications of the first power supply 10 can be determined based on the modes of electrodes and operating conditions, and are not limited to the example given above.

A power supply that is preferred as the second power supply 11 in Embodiment 1 of the present invention outputs a voltage waveform that is quick to rise and is narrow in width (short in voltage application time), as in the case of the first power supply 10. Power supplies that are common to the second power supply 11 and the first power supply 10 may therefore be used. An alternate current power supply or a direct current power supply may also be used under conditions that make the adverse effect of Joule loss of water to be treated relatively small. However, the specifications of the second power supply 11 can be determined based on the modes of electrodes and operating conditions, and are not limited to the example given above.

A material that can be used for the bubble leading guide 7 in Embodiment 1 of the present invention is, for example, a ceramic material such as alumina, or an insulative resin material such as polytetrafluoroethylene (PTFE). The bubble leading guide 7 can be, for example, a plate with a hole that is shaped to have an opening in the center and to be sloped toward the hole from the perimeter. However, it is sufficient if insulation from a high-voltage portion is maintained and bubbles are led to the preliminary discharge area, and the bubble leading guide 7 is not limited to the materials and shape described above.

A preferred gap of the preliminary discharge area in Embodiment 1 of the present invention is set narrower than the gap of the main discharge area at a ratio of 1 to 2 or lower. This is because a gap ratio that is too low increases the chance of electrical short circuit between the auxiliary electrodes 62 and decreases efficiency in the generation of bubbles containing initial electrons, while a gap ratio that is too high leads to a rise in applied voltage that is required to cause discharge and makes it difficult to cause discharge.

A preferred gap of the main discharge area is set within a range of from 1 mm to 50 mm. This is because too small a gap decreases treatment efficiency due to a reduction in treatment volume, while too large a gap is impractical in view of treatment efficiency: Expression (4) shows that, when the main discharge gap is 50 mm, discharge cannot be caused via bubbles whose diameter is in millimeters even with the application of 100 kV.

In Embodiment 1 of the present invention, water to be treated does not always need to be kept stored in the treatment tank 1, and another method may be employed in which water to be treated is kept running or circulated within the treatment tank 1 at a desired flow rate. This method can be carried out through use of, for example, a liquid mass flow controller or a pump. Whether water to be treated is to be kept stored or kept running or circulating can be determined depending on the degradation time of water to be treated.

The modification modes described above apply not only to Embodiment 1 of the present invention but also to other embodiments described below.

As described above, according to Embodiment 1, discharge is caused through use of bubbles generated in the bubble generating unit when the bubbles pass through the preliminary discharge area, and these excited bubbles subsequently pass through the main discharge area, thereby causing discharge again and generating radicals. It is therefore possible to obtain the water treatment device and the water treatment method which are capable of accomplishing large-volume discharge in water to be treated containing a large quantity of minute bubbles by the application of approximately the same level of electric field as in discharge in the air, and are highly efficient in the treatment of water to be treated.

Embodiment 2

Embodiment 1 of the present invention deals with a structure in which, as illustrated in FIG. 4A, the second main electrode 61b is disposed in close contact with the treatment tank 1. The present invention, however, is not limited thereto, and may have a structure of FIG. 4B in which the treatment tank 1 itself is a ground electrode (the second main electrode 61b or the second auxiliary electrode 62b). This structure can be realized by, for example, using a metal material such as stainless steel, aluminum, or copper as the material of the treatment tank 1, and connecting the treatment tank 1 to a ground.

Embodiment 2 of the present invention describes a case in which the very walls of the treatment tank 1 that face each other across the first main electrode 61a disposed at the center of the interior of the treatment tank 1 serve as the second main electrode 61b.

FIG. 4B is a structural diagram illustrating the placement of the main electrodes 61a and 61b of a water treatment device according to Embodiment 2 of the present invention. As illustrated in FIG. 4B, a container having a rectangular shape in section which constitutes the treatment tank 1 is formed from the material of the main electrodes 61a and 61b. In other words, the second main electrode 61b is unitary with the treatment tank 1, and the material used for the treatment tank 1 is, for example, a conductive material such as stainless steel, aluminum, or copper. The rest of the structure is the same as in Embodiment 1.

In the water treatment device according to Embodiment of the present invention, as in Embodiment 1, preliminary discharge in which a high electric field is applied to the bubble interior, and the bubbles that have come to contain initial electrons by the preliminary discharge can cause discharge in a main discharge area formed wide inside the treatment tank through use of an electric field lower than the electric field of preliminary discharge, thereby generating OH radicals efficiently. As a result, a large quantity of OH radicals are generated in a shorter period of time than in the past, which makes Embodiment 2 applicable to large-capacity treatment tanks and improves the efficiency of treating wastewater in a treatment tank.

Embodiment 3

Embodiment 1 of the present invention may have an alternative structure in which, as illustrated in FIG. 4C, the treatment tank 1 itself serves as a ground electrode (the second main electrode 61b or the second auxiliary electrode 62b), and the treatment tank 1 and the first main electrode 61a are arranged concentrically. This structure is realized by, for example, giving the treatment tank 1 a cylindrical shape and giving the first main electrode 61a a columnar shape, and allows the main discharge area or the preliminary discharge area to be wide.

FIG. 4C is a structural diagram illustrating in top view the placement of the main electrodes 61a and 61b of a water treatment device according to Embodiment 3 of the present invention. As illustrated in FIG. 4C, a cylindrical container is used as the treatment tank 1. The first main electrode 61a is shaped like a pillar that is substantially circular in section (shaped like a column). The rest of the structure is the same as in Embodiment 2.

With the second main electrode 61b placed all around the first main electrode 61a, the main discharge area can be wider than in Embodiment 1. This enables the water treatment device to treat an even larger amount of water to be treated efficiently.

Embodiment 4

Figure 5A:
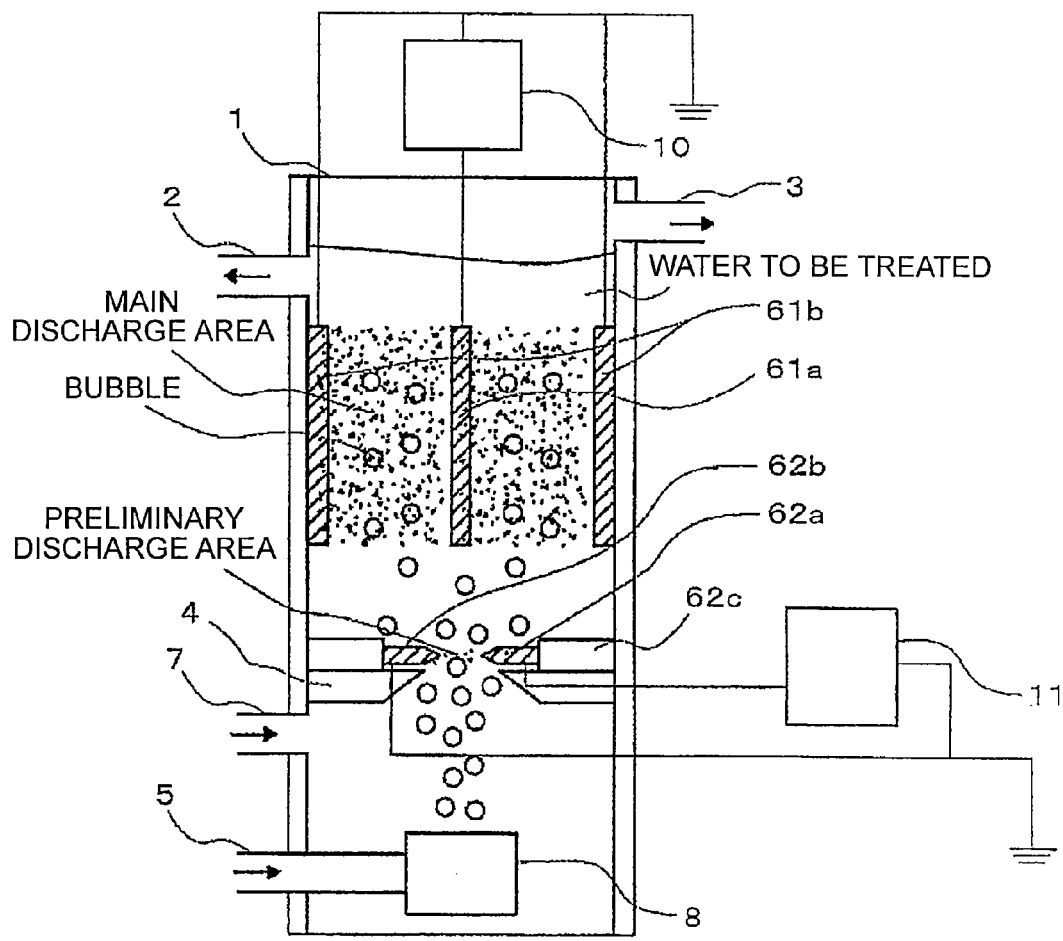
FIGS. 5A and 5B are structural diagrams illustrating a water treatment device according to Embodiment 4 of the present invention.
Figure 5B:
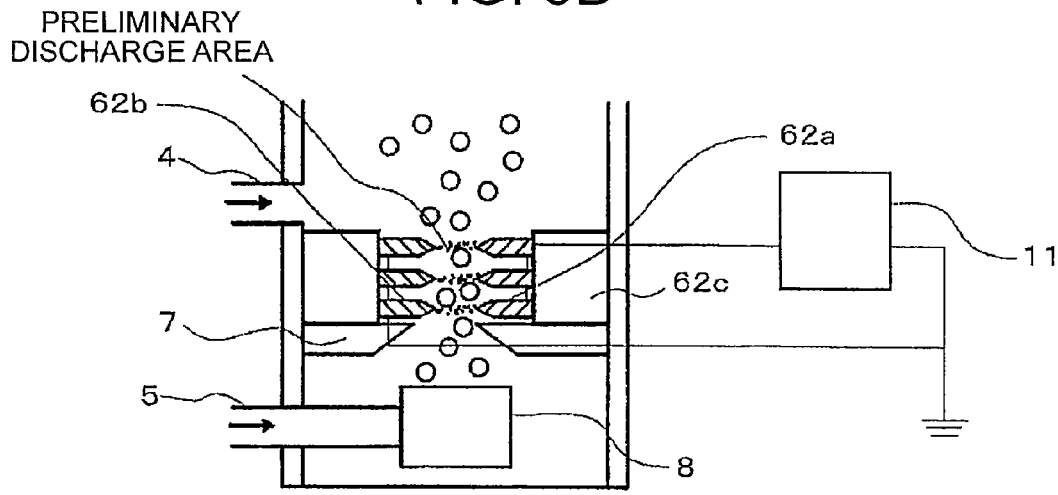

FIGS. 5A, 5B are structural diagrams illustrating a water treatment device according to Embodiment 4 of the present invention. Embodiment 4 of the present invention differs from Embodiment 1 described above in that the first auxiliary electrode 62a and the second auxiliary electrode 62b are both given a needle shape.

As illustrated in FIG. 5A, the first auxiliary electrode 62a and the second auxiliary electrode 62b in Embodiment 4 of the present invention are both needle-shaped electrodes, and are mounted to the treatment tank 1 so that the needle tips protrude slightly from an insulating member 62c while maintaining electrical insulation via the insulating member 62c.

In this manner, an electric field concentration effect is obtained in Embodiment 4 of the present invention by the use of the needle electrodes, as an additional advantage to the advantages of Embodiment 1, and a higher electric field can be applied to bubbles. Discharge can thus be caused through use of bubbles small in diameter which require a high electric field to cause discharge.

While Embodiment 4 of the present invention deals with an example that includes a pair of auxiliary electrodes 62, a plurality of needle-shaped electrodes may be arranged side by side as illustrated in FIG. 5B, for example. In this way, preliminary discharge can be caused in relatively large areal dimensions while obtaining the electric field concentration effect. However, the number and placement of the auxiliary electrodes 62 are not limited to the examples given above.

A preferred length of the protruding portion of each needle in Embodiment 4 of the present invention is 1 mm or less. This is because a protruding portion that is long is an obstacle to the leading of bubbles to the preliminary discharge area at the needle tip portion.

A material that can be used for the insulating member 62c in Embodiment 4 of the present invention is, for example, a ceramic material such as alumina or an insulative resin material such as PTFE. However, it is sufficient if insulating properties that suppress discharge and electrical conduction outside the preliminary discharge area are maintained, and the material of the insulating member is not limited to the examples given above.

Embodiment 5

Figure 6A:
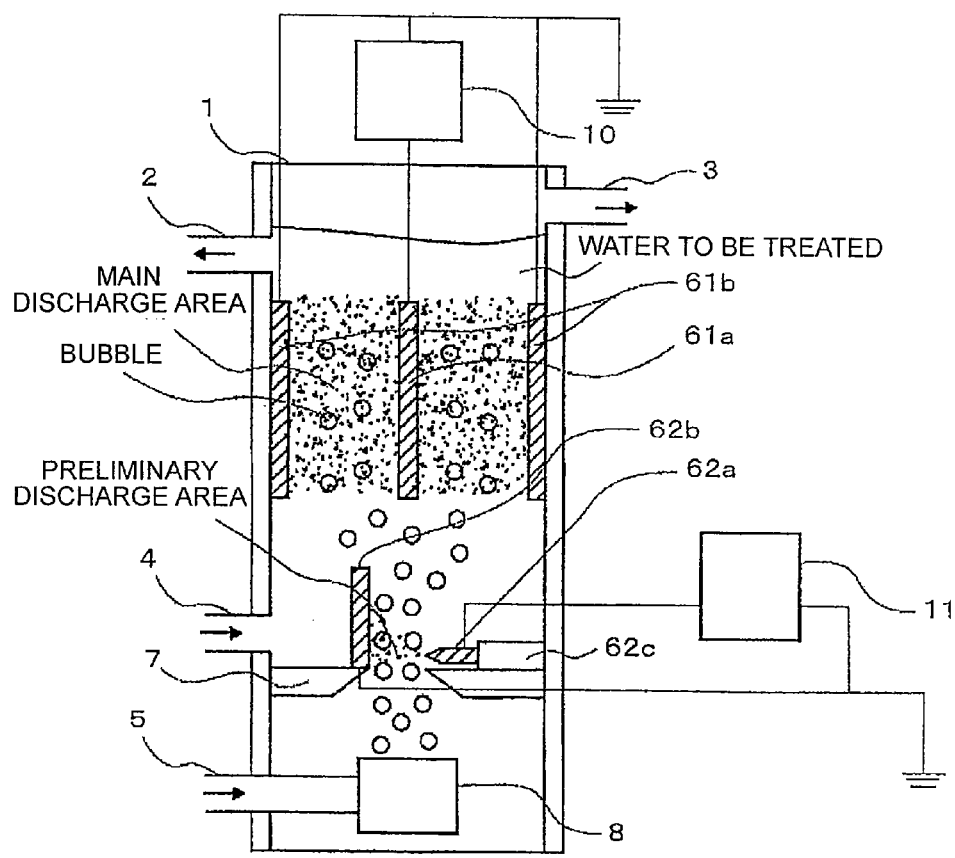
FIGS. 6A and 6B are structural diagrams illustrating a water treatment device according to Embodiment 5 of the present invention.
Figure 6B:
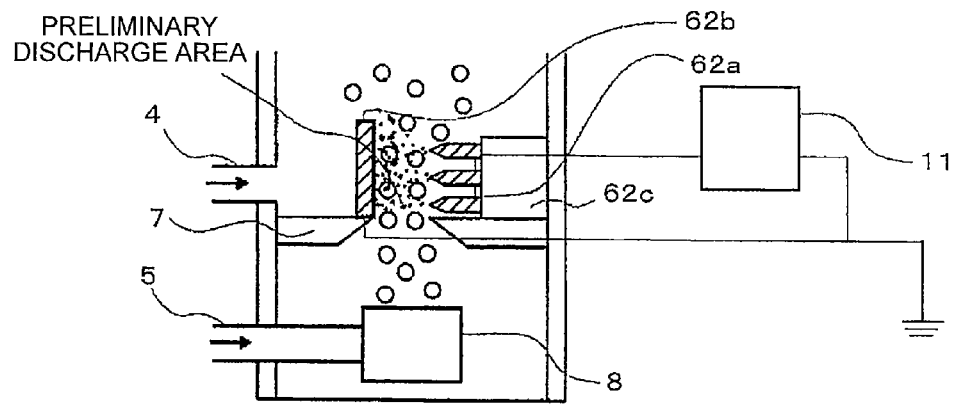

FIGS. 6A, 6B are structural diagrams illustrating a water treatment device according to Embodiment 5 of the present invention. Embodiment 5 of the present invention differs from Embodiment 1 described above in that one of the first auxiliary electrode 62a and the second auxiliary electrode 62b is given the shape of a needle, while the other thereof is given the shape of a flat plate.

As illustrated in FIG. 6A, one of the first auxiliary electrode 62a and the second auxiliary electrode 62b in Embodiment 5 of the present invention is a needle-shaped electrode, while the other thereof is a flat-shaped electrode. The needle-shaped electrode is mounted to the treatment tank 1 so that the needle tip protrudes slightly from an insulating member 62c while maintaining electrical insulation via the insulating member 62c.

In this manner, an electric field concentration effect is obtained in Embodiment 5 of the present invention by the use of the needle electrode, as an additional advantage to the advantages of Embodiment 1, and a higher electric field can be applied to bubbles. Discharge can thus be caused through use of bubbles small in diameter which require a high electric field to cause discharge.

Embodiment 5 of the present invention deals with an example in which the number of auxiliary electrodes 62 is 1. However, as illustrated in FIG. 6B, for example, the areal dimensions on the flat plate side may be made large, while on the needle side, a plurality of needle-shaped electrodes may be arranged side by side. In this way, preliminary discharge can be caused in relatively large areal dimensions while obtaining the electric field concentration effect. However, the number and placement of the auxiliary electrodes 62 are not limited to the examples given above.

A preferred length of the protruding portion of each needle in Embodiment 5 of the present invention is 1 mm or less. This is because a protruding portion that is long is an obstacle to the leading of bubbles to the preliminary discharge area at the needle tip portion.

A material that can be used for the insulating member 62c in Embodiment 5 of the present invention is, for example, a ceramic material such as alumina or an insulative resin material such as PTFE. However, it is sufficient if insulating properties that suppress discharge and electrical conduction outside the preliminary discharge area are maintained, and the material of the insulating member is not limited to the examples given above.

Embodiment 6

Figure 7A:
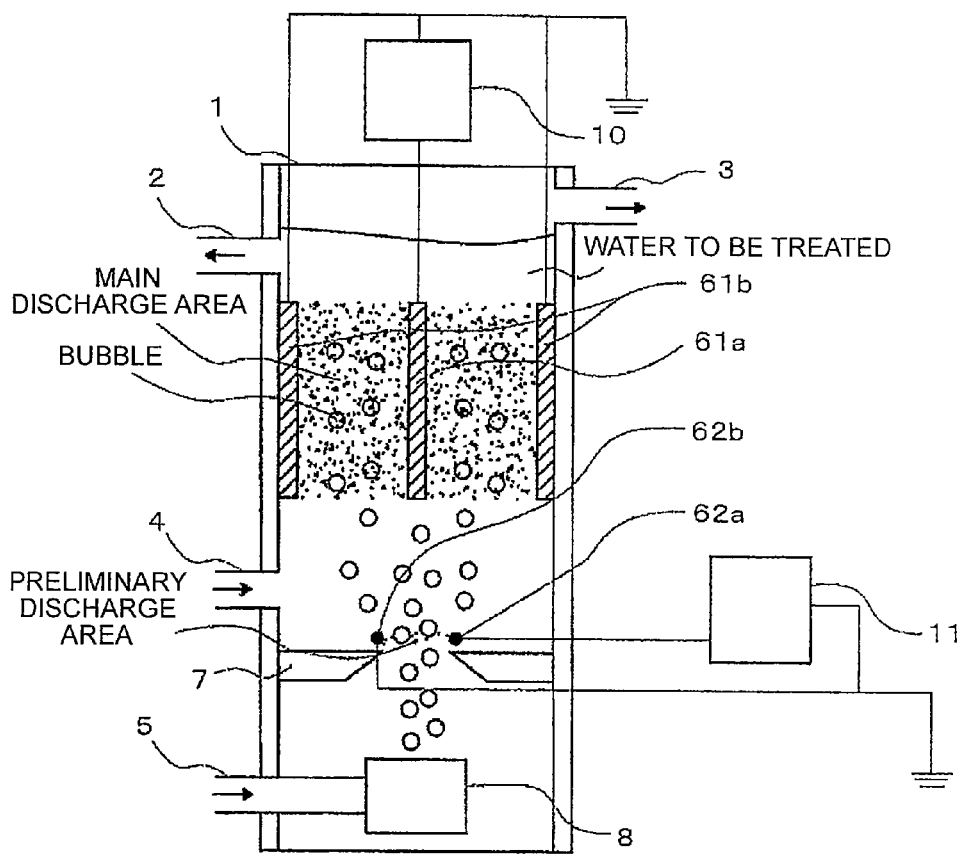
FIGS. 7A and 7B are structural diagrams illustrating a water treatment device according to Embodiment 6 of the present invention.
Figure 7B:
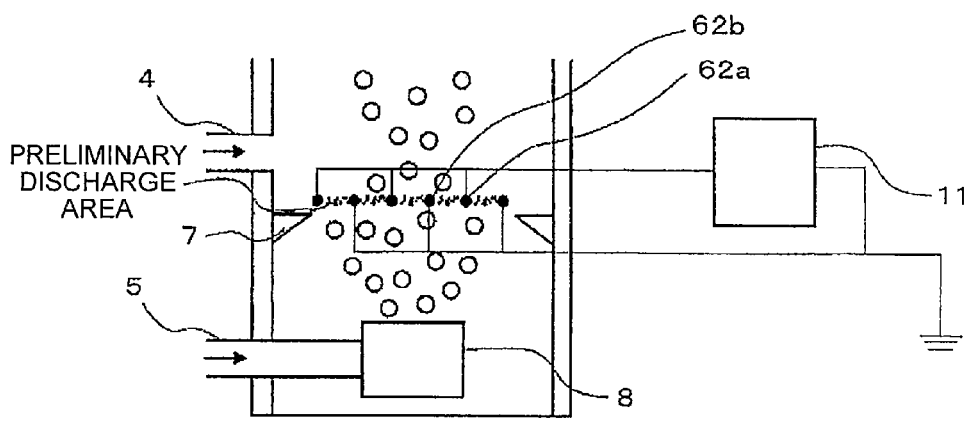

FIGS. 7A, 7B are structural diagrams illustrating a water treatment device according to Embodiment 6 of the present invention. Embodiment 6 of the present invention differs from Embodiment 1 described above in that the first auxiliary electrode 62a and the second auxiliary electrode 62b are both given the shape of a wire. As illustrated in FIG. 7A, the wires are disposed so as to run in the depth direction of the drawing.

In this manner, an electric field concentration effect is obtained in Embodiment 6 of the present invention by the use of the wire electrodes, as an additional advantage to the advantages of Embodiment 1, and a higher electric field can be applied to bubbles. Discharge can thus be caused easily through use of bubbles small in diameter which require a high electric field to cause discharge.

While Embodiment 6 of the present invention deals with an example that includes a pair of auxiliary electrodes 62, the auxiliary electrodes 62 may be a plurality of wires arranged so that wires connected to a ground and wires connected to a high-voltage power supply alternate as illustrated in FIG. 7B, for example. In this way, preliminary discharge can be caused in relatively large areal dimensions while obtaining the electric field concentration effect. However, the number and placement of the auxiliary electrodes 62 are not limited to the examples given above.

Embodiment 7

Figure 8A:
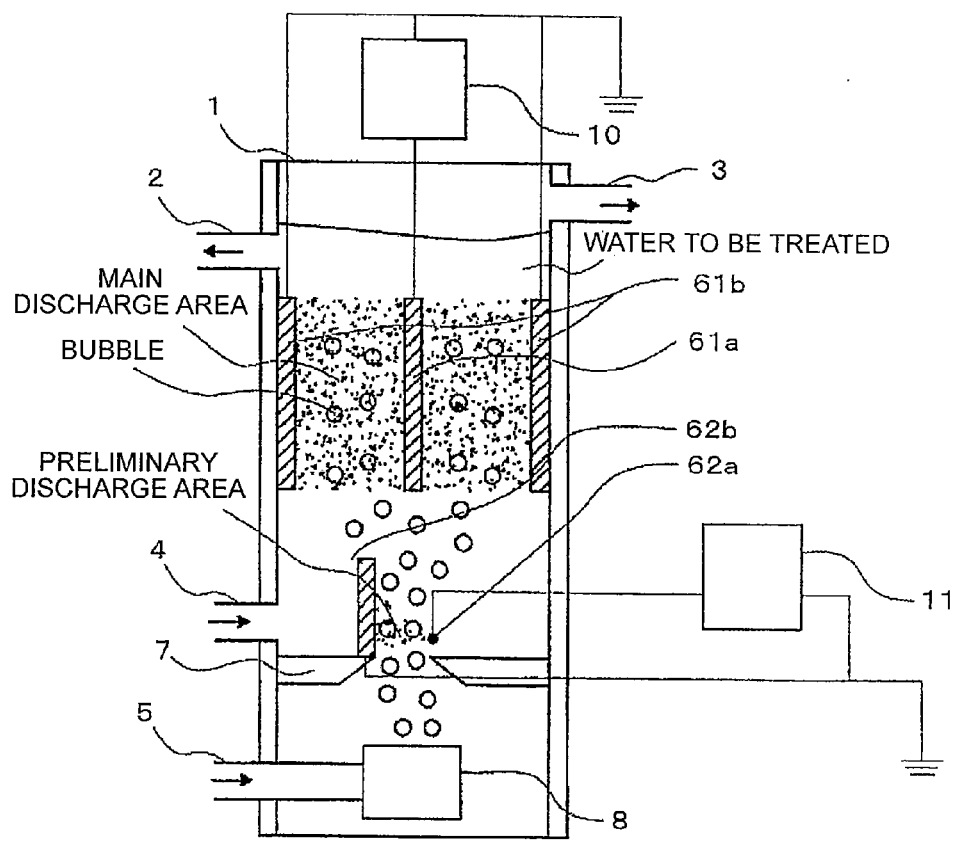
FIGS. 8A and 8B are structural diagrams illustrating a water treatment device according to Embodiment 7 of the present invention.
Figure 8B:
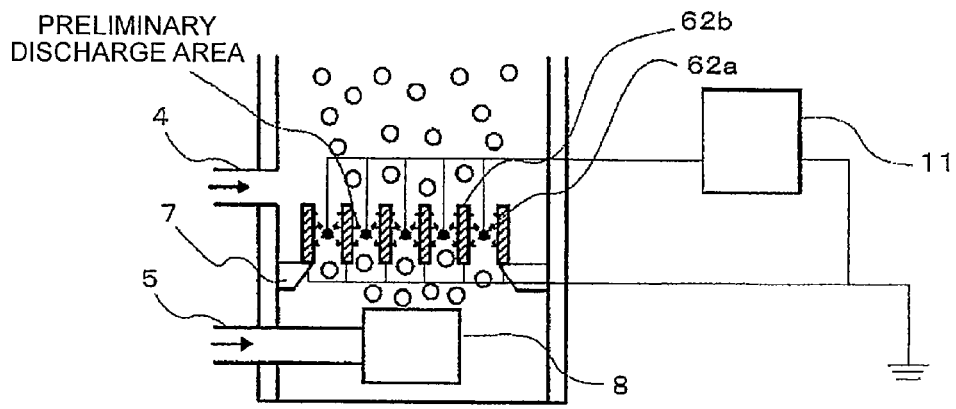

FIGS. 8A, 8B are structural diagrams illustrating a water treatment device according to Embodiment 7 of the present invention. Embodiment 7 of the present invention differs from Embodiment 1 described above in that one of the first auxiliary electrode 62a and the second auxiliary electrode 62b is given the shape of a wire, while the other thereof is given the shape of a flat plate. As illustrated in FIG. 8A, the wire is disposed so as to run in the depth direction of the drawing.

In this manner, an electric field concentration effect is obtained in Embodiment 7 of the present invention by the use of the wire electrode and the plate electrode, as an additional advantage to the advantages of Embodiment 1, and a higher electric field can be applied to bubbles. Discharge can thus be caused easily through use of bubbles small in diameter which require a high electric field to cause discharge.

While Embodiment 7 of the present invention deals with an example that includes a pair of auxiliary electrodes 62, the auxiliary electrodes 62 may be a plurality of flat plates and a plurality of wires arranged so that flat plates connected to a ground and wires connected to a high-voltage power supply alternate as illustrated in FIG. 8B, for example. In this way, preliminary discharge can be caused in relatively large areal dimensions while obtaining the electric field concentration effect. However, the number and placement of the auxiliary electrodes 62 are not limited to the examples given above.

Embodiment 8

Figure 9A:
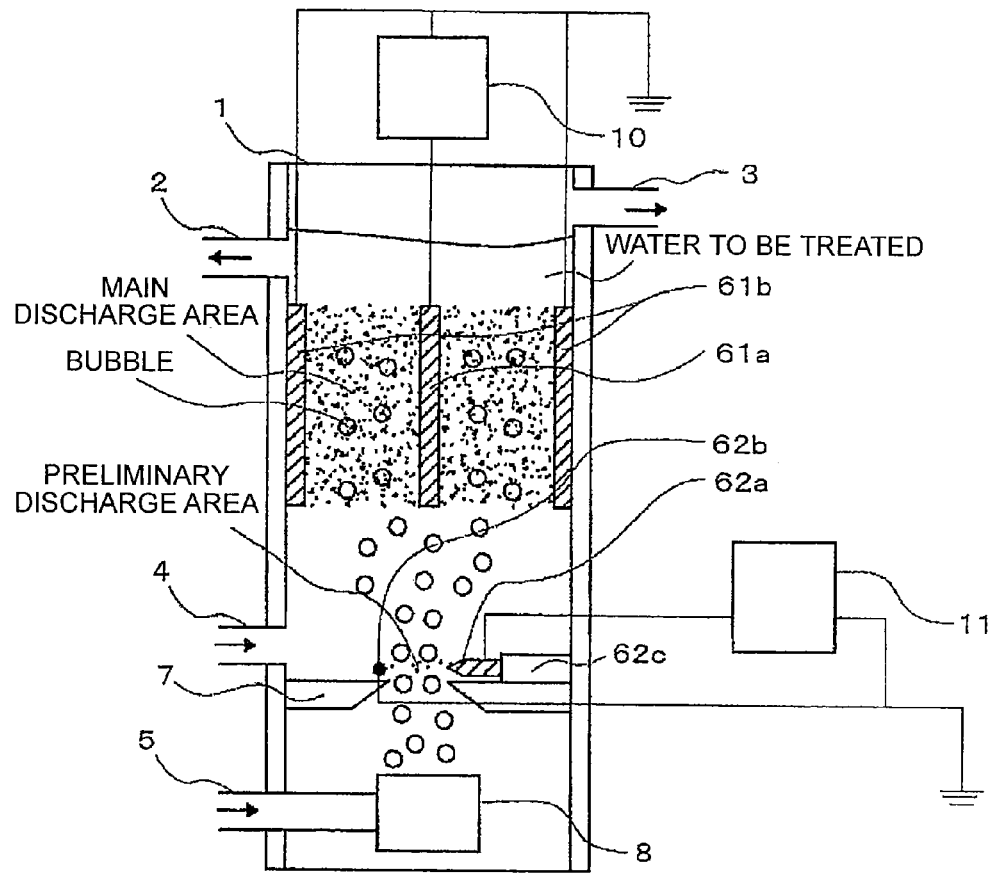
FIGS. 9A and 9B are structural diagrams illustrating a water treatment device according to Embodiment 8 of the present invention.
Figure 9B:
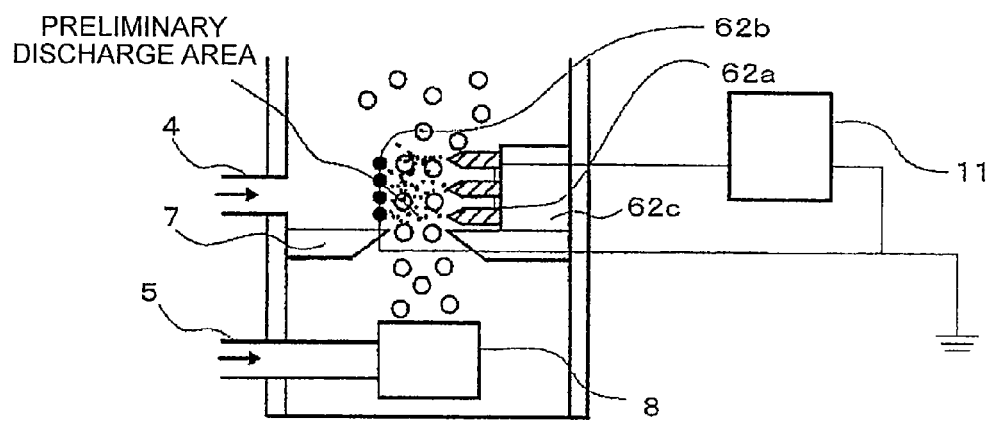

FIGS. 9A, 9B are structural diagrams illustrating a water treatment device according to Embodiment 8 of the present invention. Embodiment 8 of the present invention differs from Embodiment 1 described above in that one of the first auxiliary electrode 62a and the second auxiliary electrode 62b is given the shape of a wire, while the other thereof is given the shape of a needle. As illustrated in FIG. 9A, the wire is disposed so as to run in the depth direction of the drawing.

Embodiment 8

FIG. 9 are structural diagrams illustrating a water treatment device according to Embodiment 8 of the present invention. Embodiment 8 of the present invention differs from Embodiment 1 described above in that one of the first auxiliary electrode 62a and the second auxiliary electrode 62b is given the shape of a wire, while the other thereof is given the shape of a needle. As illustrated in FIG. 9(a), the wire is disposed so as to run in the depth direction of the drawing.

In this manner, an electric field concentration effect is obtained in Embodiment 8 of the present invention by the use of the wire electrode and the needle electrode, as an additional advantage to the advantages of Embodiment 1, and a higher electric field can be applied to bubbles. Discharge can thus be caused easily through use of bubbles small in diameter which require a high electric field to cause discharge.

While Embodiment 8 of the present invention deals with an example that includes a pair of auxiliary electrodes 62, the auxiliary electrodes 62 may be a plurality of wires arranged side by side and a plurality of needles arranged side by side as illustrated in FIG. 9B, for example. In this way, preliminary discharge can be caused in relatively large areal dimensions while obtaining the electric field concentration effect. However, the number and placement of the auxiliary electrodes 62 are not limited to the examples given above.

Embodiment 9

Figure 10:
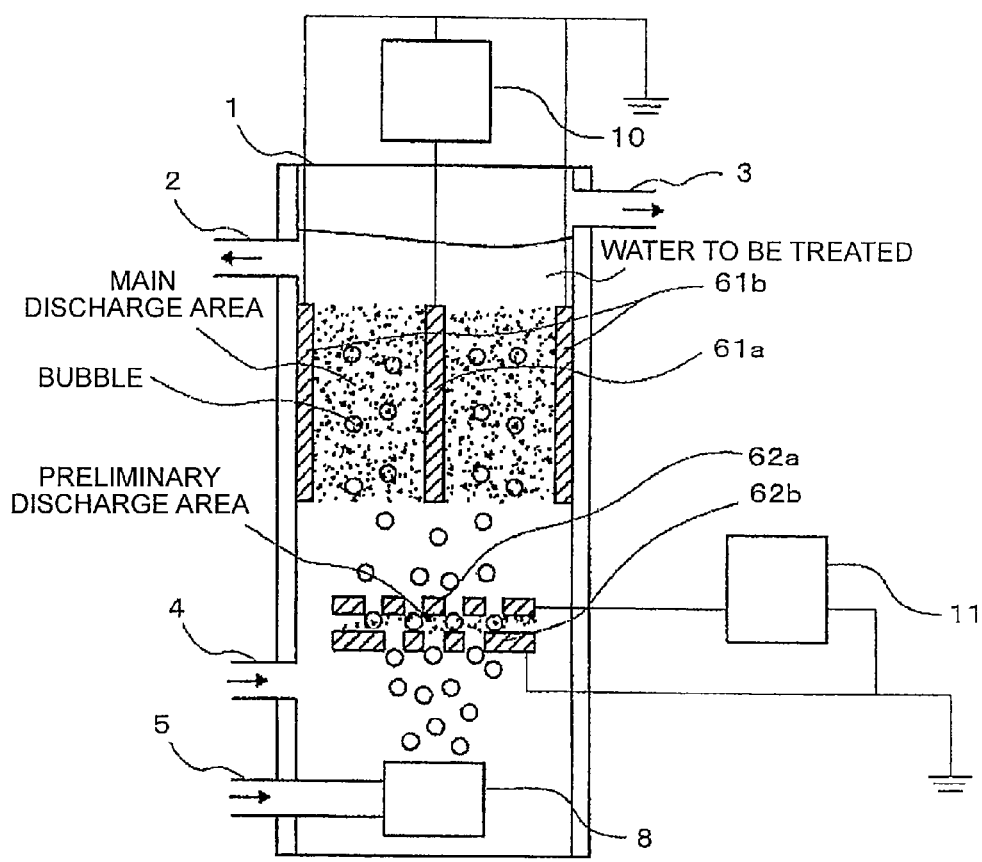
FIG. 10 is a structural diagram illustrating a water treatment device according to Embodiment 9 of the present invention.

FIG. 10 is a structural diagram illustrating a water treatment device according to Embodiment 9 of the present invention. Embodiment 9 of the present invention differs from Embodiment 1 described above in that the first auxiliary electrode 62a and the second auxiliary electrode 62b are both electrodes shaped into a perforated flat plate.

As illustrated in FIG. 10, the first auxiliary electrode 62a and the second auxiliary electrode 62b in Embodiment 9 of the present invention are both electrodes shaped into a perforated flat plate, and are arranged so that the holes of one electrode and the holes of the other electrode do not overlap linearly. This ensures that bubbles that have passed through the holes of the first auxiliary electrode 62a pass through the preliminary discharge area before emitted from the holes of the second auxiliary electrode 62b.

Embodiment 9 of the present invention thus has an additional advantage to the advantages of Embodiment 1 in that bubbles can be introduced to the preliminary discharge area without the bubble leading guide 7 by letting bubbles pass through holes in the auxiliary electrode 62. This also makes preliminary discharge via bubbles in large areal dimensions possible, which helps to simplify the device and generate bubbles containing initial electrons in the preliminary discharge area efficiently.

The diameter of the holes of the first auxiliary electrode 62a in Embodiment 9 of the present invention is not limited. However, it is preferred to set the hole diameter to a value between 2 mm and 10 mm in order to make sure that generated bubbles pass through the second auxiliary electrode 62b without congestion.

The diameter and interval of the holes of the second auxiliary electrode 62b in Embodiment 9 of the present invention are not particularly limited. However, it is preferred to arrange holes at an interval that is calculated by multiplying a hole diameter D by 1.5, or a greater interval, for the purpose of suppressing the merging of bubbles, and it is preferred to set the hole diameter to a value between 2 mm and 10 mm in order to ensure the passage of bubbles that is free of congestion.

Embodiment 10

Figure 11A:
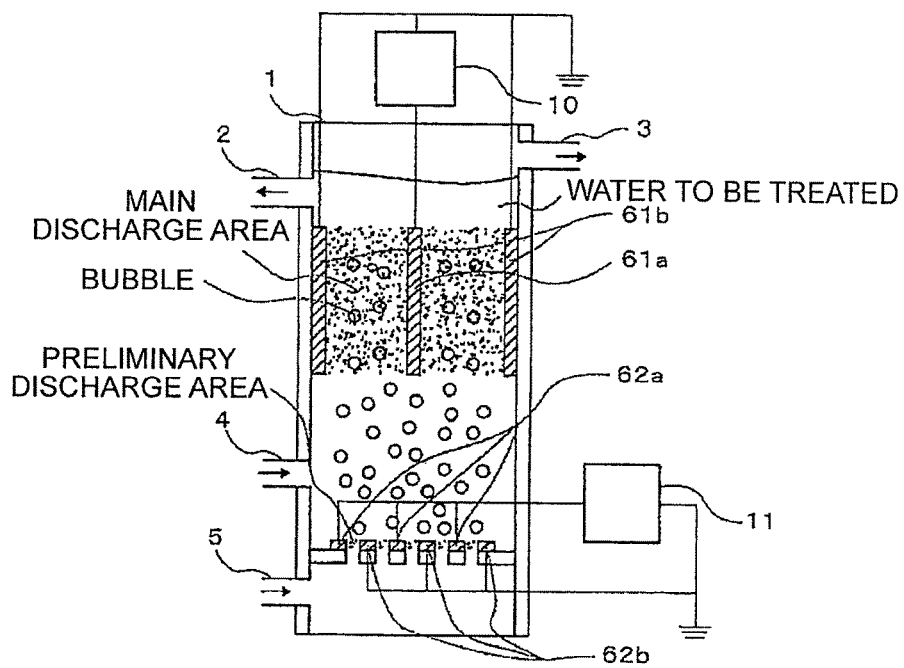
FIGS. 11A to 11C are structural diagrams illustrating a water treatment device according to Embodiment 10 of the present invention.
Figure 11B:
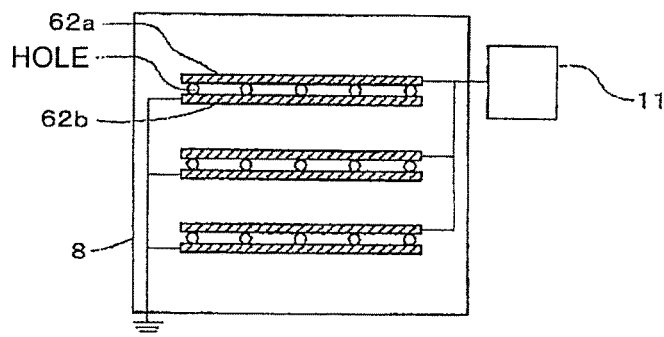
Figure 11C:
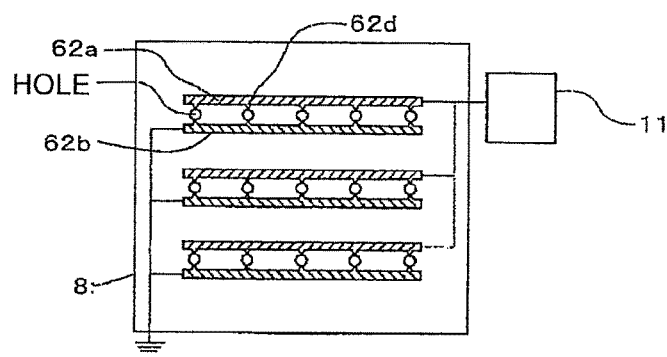

FIGS. 11A, 11B, 11C are structural diagrams illustrating a water treatment device according to Embodiment 10 of the present invention. In FIGS. 11A and 11B, the bubble generating unit 8 of Embodiment 10 of the present invention is built from a perforated insulator plate, which is provided with holes arranged in a matrix pattern. A difference from Embodiment 1 described above is that a pair of one first auxiliary electrode 62a and one second auxiliary electrode 62b sandwiches each line of holes as illustrated in FIG. 11B.

Embodiment 10 of the present invention thus has an additional advantage to the advantages of Embodiment 1 in that placing electrode pairs only in the vicinity of holes reduces the effective areal dimensions of discharge and accordingly lessens the adverse effect of Joule loss.

The auxiliary electrode 62 in Embodiment 10 of the present invention may have a different shape, for example, one illustrated in FIG. 11C where protruding portions 62d in the perimeter face each other across the holes. The electric field concentration effect is obtained by this electrode shape in addition to the effects described above, and preliminary discharge at an even lower voltage is accomplished as a result.

The bubble generating unit 8 in Embodiment 10 of the present invention can be, for example, a ceramic material such as alumina or an insulative resin material such as PTFE on which perforation machining is performed. However, it is sufficient if insulating properties that suppress discharge and electrical conduction outside the preliminary discharge area are maintained, and the material of the bubble generating unit 8 is not limited to the examples given above.

Embodiment 11

Figure 12:
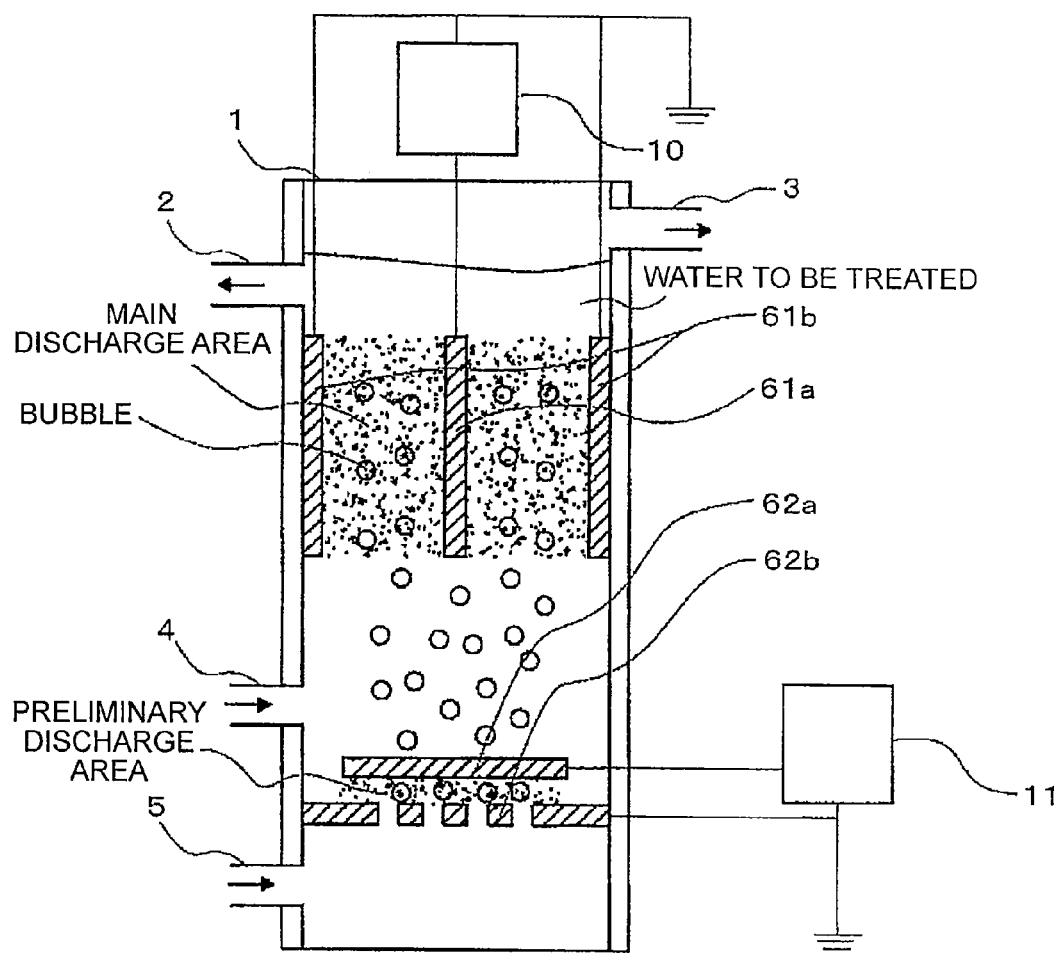
FIG. 12 is a structural diagram illustrating a water treatment device according to Embodiment 11 of the present invention.

FIG. 12 is a structural diagram illustrating a water treatment device according to Embodiment 11 of the present invention. Embodiment 11 of the present invention differs from Embodiment 1 described above in that the second auxiliary electrode 62b integrates the function of the bubble generating unit 8 and the function of the auxiliary electrodes 62 and is shaped like a perforated flat plate, and in that the first auxiliary electrode 62a is shaped like a flat plate.

As illustrated in FIG. 12, the second auxiliary electrode 62b in Embodiment 11 of the present invention is shaped like a perforated flat plate in which holes for generating bubbles are formed, and the first auxiliary electrode 62a is shaped like a flat plate that is equal in areal dimensions to an area where the holes of the second auxiliary electrode 62b are arranged.

Embodiment 11 of the present invention, where bubbles generated by the second auxiliary electrode 62b are introduced directly to the preliminary discharge area, thus has an additional advantage to the advantages of Embodiment 1 in that preliminary discharge can be caused at a relatively uniform bubble diameter without being affected by the merging of bubbles, thereby improving the stability of preliminary discharge.

The diameter and interval of the holes of the second auxiliary electrode 62b in Embodiment 11 of the present invention are not particularly limited. However, it is preferred to arrange holes at an interval that is calculated by multiplying a hole diameter D by 1.5, or a greater interval, for the purpose of suppressing the merging of bubbles, and it is preferred to set the hole diameter D to a value between 0.1 mm and 1 mm in order to generate bubbles with a small bubble diameter.

Embodiment 12

Figure 13:
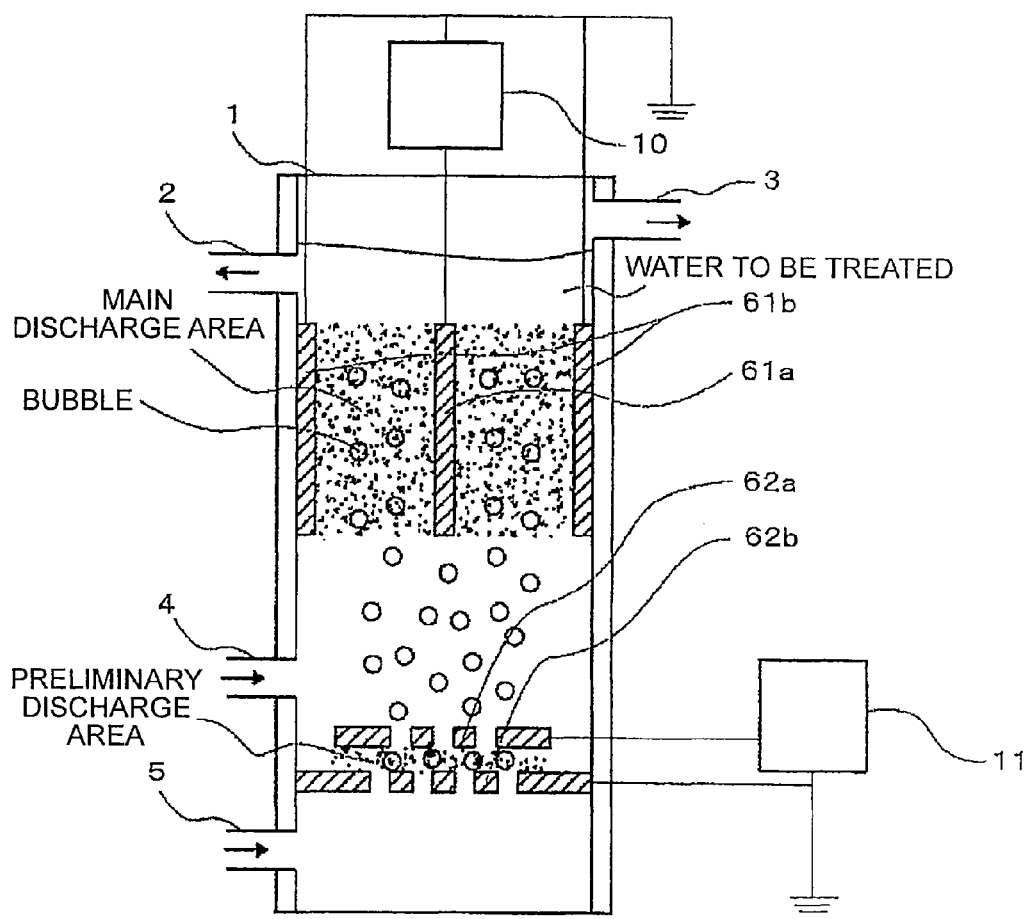
FIG. 13 is a structural diagram illustrating a water treatment device according to Embodiment 12 of the present invention.

FIG. 13 is a structural diagram illustrating a water treatment device according to Embodiment 12 of the present invention. Embodiment 12 of the present invention differs from Embodiment 1 described above in that the second auxiliary electrode 62b integrates the function of the bubble generating unit 8 and the function of the auxiliary electrodes 62 and is shaped like a perforated flat plate, and in that the first auxiliary electrode 62a is also shaped like a perforated flat plate.

As illustrated in FIG. 13, the first auxiliary electrode 62a and the second auxiliary electrode 62b in Embodiment 12 of the present invention are shaped like a perforated flat plate in which holes for generating bubbles are formed, and are arranged so that the holes of one electrode and the holes of the other electrode do not overlap linearly. This ensures that bubbles generated through the holes of the second auxiliary electrode 62b pass through the preliminary discharge area before emitted from the holes of the first auxiliary electrode 62a.

Embodiment 12 of the present invention, where bubbles generated by the second auxiliary electrode 62b are introduced directly to the preliminary discharge area, thus has an additional advantage to the advantages of Embodiment 1 in that preliminary discharge can be caused at a relatively uniform bubble diameter without being affected by the merging of bubbles, thereby improving the stability of preliminary discharge.

The diameter of the holes of the first auxiliary electrode 62a in Embodiment 12 of the present invention is not limited. However, it is preferred to set the hole diameter to a value between 2 mm and 10 mm in order to make sure that bubbles generated by the second auxiliary electrode 62b pass through the first auxiliary electrode 62a without congestion.

The diameter and interval of the holes of the second auxiliary electrode 62b in Embodiment 12 of the present invention are not particularly limited. However, it is preferred to arrange holes at an interval that is calculated by multiplying a hole diameter D by 1.5, or a greater interval, for the purpose of suppressing the merging of bubbles, and it is preferred to set the hole diameter D to a value between 0.1 mm and 1 mm in order to generate bubbles with a small bubble diameter.

Embodiment 13

Figure 14A:
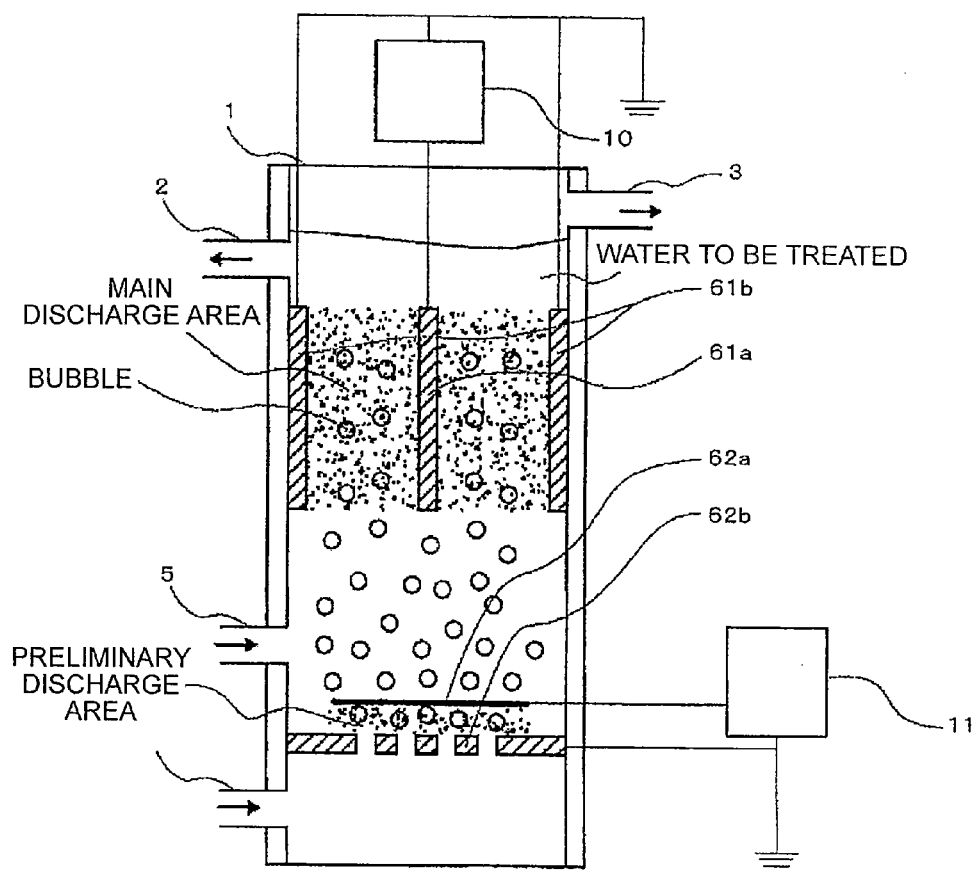
FIGS. 14A and 14B are structural diagrams illustrating a water treatment device according to Embodiment 13 of the present invention.
Figure 14B:
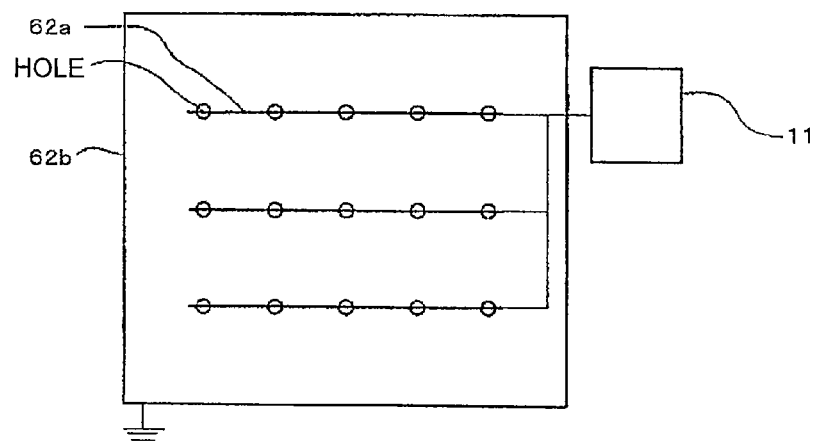

FIGS. 14A, 14B are structural diagrams illustrating a water treatment device according to Embodiment 13 of the present invention. In FIGS. 14A and 14B, Embodiment 13 of the present invention differs from Embodiment 1 described above in that the second auxiliary electrode 62b integrates the function of the bubble generating unit 8 and the function of the auxiliary electrodes 62 and is shaped like a perforated flat plate, and in that the first auxiliary electrode 62a is given the shape of a wire.

As illustrated in FIG. 14B, the second auxiliary electrode 62b in Embodiment 13 of the present invention is shaped like a perforated flat plate in which holes for generating bubbles are formed in a matrix pattern, and the first auxiliary electrode 62a is given the shape of a wire, which is represented by the bold line in FIG. 14B, and is disposed so that one wire runs directly above and along each line of holes of the second auxiliary electrode 62b.

Embodiment 13 of the present invention, where bubbles generated by the second auxiliary electrode 62b are supplied directly to the preliminary discharge area, thus has an additional advantage to the advantages of Embodiment 1 in that preliminary discharge can be caused at a relatively uniform bubble diameter without being affected by the merging of bubbles, thereby improving the stability of preliminary discharge. In addition, the wire shape of the electrode provides the electric field concentration effect, which makes causing discharge at a low voltage possible.

While Embodiment 13 of the present invention deals with an example in which the positional relation between the holes of the second auxiliary electrode 62b and the first auxiliary electrode 62a is such that one wire runs directly above and along each line of the holes, the positional relation between those electrodes is not particularly limited as long as the passage of bubbles through the preliminary discharge area is guaranteed.

The diameter of the holes of the first auxiliary electrode 62a in Embodiment 13 of the present invention is not limited. However, it is preferred to set the hole diameter to a value between 2 mm and 10 mm in order to make sure that bubbles generated by the second auxiliary electrode 62b pass through the first auxiliary electrode 62a without congestion.

Embodiment 14

Figure 15:
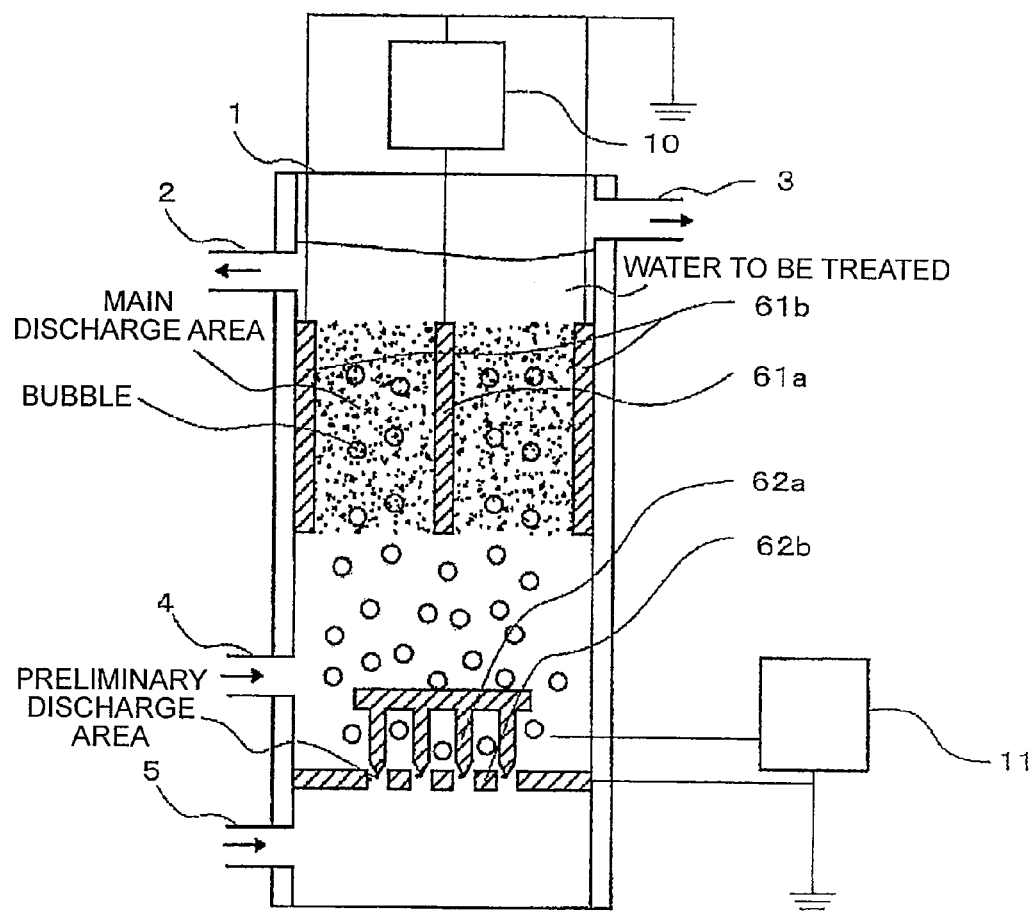
FIG. 15 is a structural diagram illustrating a water treatment device according to Embodiment 14 of the present invention.

FIG. 15 is a structural diagram illustrating a water treatment device according to Embodiment 14 of the present invention. Embodiment 14 of the present invention differs from Embodiment 1 described above in that the second auxiliary electrode 62b integrates the function of the bubble generating unit 8 and the function of the auxiliary electrodes 62 and is shaped like a perforated flat plate, and in that the first auxiliary electrode 62a is shaped to have a plurality of needles.

As illustrated in FIG. 15, the second auxiliary electrode 62b in Embodiment 14 of the present invention is shaped like a perforated flat plate in which holes for generating bubbles are formed in a matrix pattern, and the first auxiliary electrode 62a is given the shape of a needle. The needles of the first auxiliary electrode 62a and the holes of the second auxiliary electrode 62b are provided on a one-to-one basis, and are arranged so that the tip of a needle directly above a hole slightly enters the opening of the hole.

Embodiment 14 of the present invention, where bubbles generated by the second auxiliary electrode 62b are supplied directly to the preliminary discharge area, thus has an additional advantage to the advantages of Embodiment 1 in that preliminary discharge can be caused at a relatively uniform bubble diameter without being affected by the merging of bubbles, thereby improving the stability of preliminary discharge. In addition, the needle shape of electrode provides the electric field concentration effect, which makes causing discharge at a low voltage possible.

While Embodiment 14 of the present invention deals with an example in which the positional relation between the holes of the second auxiliary electrode 62b and the first auxiliary electrode 62a is such that the needles of the first auxiliary electrode 62a and the holes of the second auxiliary electrode 62b are provided on a one-to-one basis, and are arranged so that the tip of a needle slightly enters the opening of the hole, the positional relation between those electrodes is not particularly limited as long as the passage of bubbles through the preliminary discharge area is guaranteed.

The diameter and interval of the holes of the second auxiliary electrode 62b in Embodiment 14 of the present invention are not particularly limited. However, it is preferred to arrange holes at an interval that is calculated by multiplying a hole diameter D by 1.5, or a greater interval, for the purpose of suppressing the merging of bubbles, and it is preferred to set the hole diameter D to a value between 0.1 mm and 1 mm in order to generate bubbles with a small bubble diameter.

Embodiment 15

Figure 16:
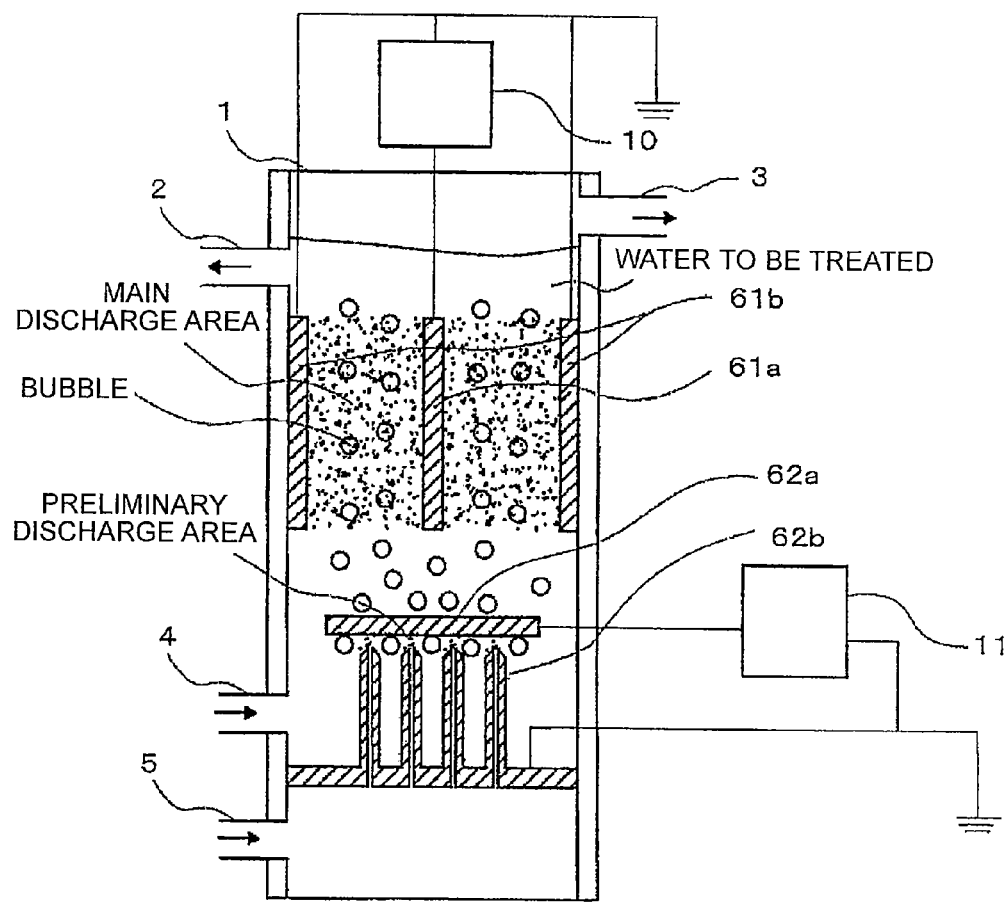
FIG. 16 is a structural diagram illustrating a water treatment device according to Embodiment 15 of the present invention.

FIG. 16 is a structural diagram illustrating a water treatment device according to Embodiment 15 of the present invention. Embodiment 15 of the present invention differs from Embodiment 1 described above in that the second auxiliary electrode 62b integrates the function of the bubble generating unit 8 and the function of the auxiliary electrodes 62 and is shaped to have needle nozzles, and in that the first auxiliary electrode 62a is shaped like a flat plate.

As illustrated in FIG. 16, the second auxiliary electrode 62b in Embodiment 15 of the present invention is built from needle nozzles arranged in a matrix pattern, and the first auxiliary electrode 62a is shaped like a flat plate that is equal in areal dimensions to an area that is formed by the tips of the nozzles of the second auxiliary electrode 62b.

Embodiment 15 of the present invention, where the use of needle nozzle-shaped electrodes keeps the preliminary discharge area a relatively narrow area and the electric field concentration effect is obtained, thus has an additional advantage to the advantages of Embodiment 1 in that preliminary discharge through use of bubbles can be caused at a low voltage while reducing the adverse effect of Joule loss.

Embodiment 16

FIGS. 17A-17D are structural diagrams illustrating a water treatment device according to Embodiment 16 of the present invention. In FIGS. 17A and 17B, Embodiment 16 of the present invention differs from Embodiment 1 described above in that the second auxiliary electrode 62b integrates the function of the bubble generating unit 8 and the function of the auxiliary electrodes 62 and is shaped to have needle nozzles, and in that the first auxiliary electrode 62a is shaped like a perforated flat plate.

As illustrated in FIG. 17B, the second auxiliary electrode 62b in Embodiment 16 of the present invention is built from needle nozzles arranged in a matrix pattern, and the first auxiliary electrode 62a is built from a perforated flat plate in which holes that are tapered openings are formed in a pattern corresponding to the arrangement of the needle nozzles of the second auxiliary electrode 62b. The holes of the first auxiliary electrode 62a and the needle nozzles of the second auxiliary electrode 62b are provided on a one-to-one basis, and are arranged so that the tip of a needle nozzle directly below a hole slightly enters the opening of the hole.

Embodiment 16 of the present invention, where the use of needle nozzle-shaped electrodes keeps the preliminary discharge area a relatively narrow area and the electric field concentration effect is obtained, thus has an additional advantage to the advantages of Embodiment 1 in that preliminary discharge through use of bubbles can be caused at a low voltage while reducing the adverse effect of Joule loss.

While Embodiment 16 of the present invention deals with an example in which the holes in the perforated flat plate are tapered, it is sufficient if the passage of bubbles through the preliminary discharge area is guaranteed, and the holes may be shaped as illustrated in FIG. 17C, for example. The holes may also have a shape that provides the electric field concentration effect as the one illustrated in FIG. 17D, and the diameter, number, shape, and arrangement of the holes are not particularly limited.

Embodiment 17

Figure 18:
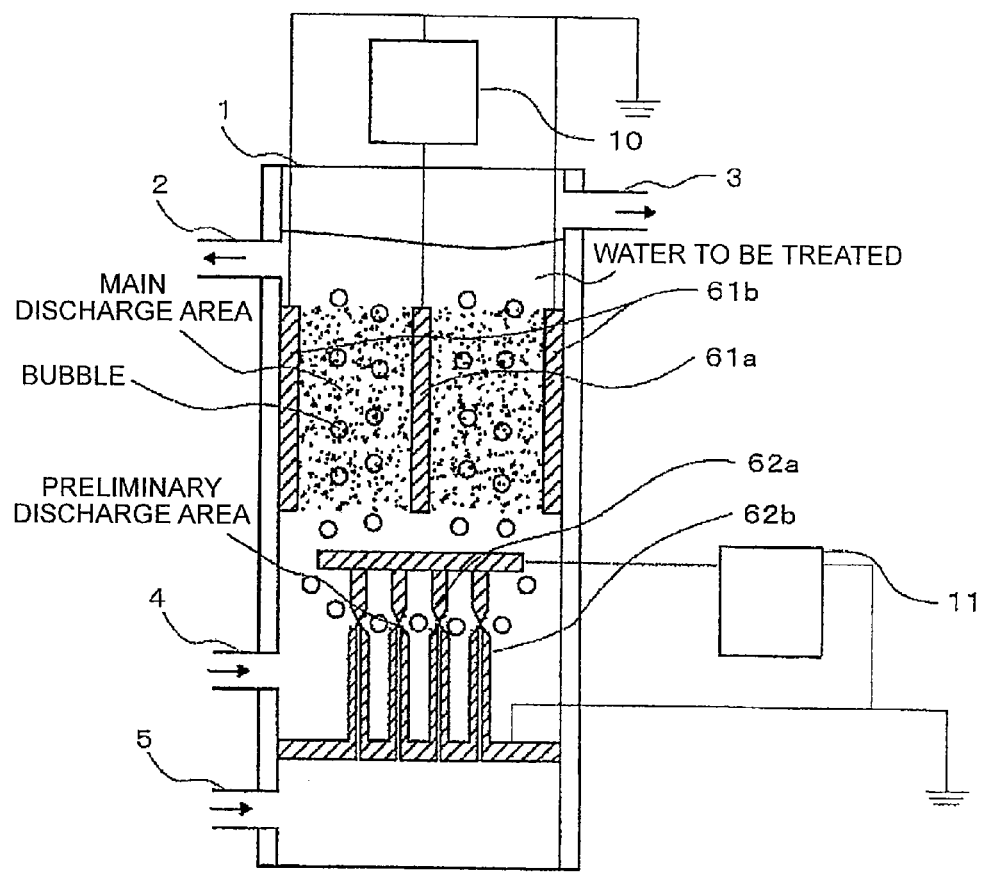
FIG. 18 is a structural diagram illustrating a water treatment device according to Embodiment 17 of the present invention.

FIG. 18 is a structural diagram illustrating a water treatment device according to Embodiment 17 of the present invention. Embodiment 17 of the present invention differs from Embodiment 1 described above in that the second auxiliary electrode 62b integrates the function of the bubble generating unit 8 and the function of the auxiliary electrodes 62 and is shaped to have needle nozzles, and in that the first auxiliary electrode 62a is shaped to have needles.

As illustrated in FIG. 18, the second auxiliary electrode 62b in Embodiment 17 of the present invention is shaped to have needle nozzles formed in a matrix pattern. The needles of the first auxiliary electrode 62a and the needle nozzles of the second auxiliary electrode 62b are provided on a one-to-one basis, with the tip of a needle directly above the tip of a needle nozzle facing the hole in the needle nozzle.

Embodiment 17 of the present invention, where the use of needle nozzle-shaped electrodes keeps the preliminary discharge area a relatively narrow area and the electric field concentration effect is obtained, thus has an additional advantage to the advantages of Embodiment 1 in that preliminary discharge through use of bubbles can be caused at a low voltage while reducing the adverse effect of Joule loss.

While Embodiment 17 of the present invention deals with an example in which the positional relation between the first auxiliary electrode 62a and the second auxiliary electrode 62b is such that the needles and the needle nozzles are provided on a one-to-one basis, with the tip of a needle directly above the tip of a needle nozzle facing the hole in the needle nozzle, it is sufficient if the passage of bubbles through the preliminary discharge area is guaranteed, and the diameter, number, shape, and arrangement of the holes are not particularly limited.

Embodiment 18

Figure 19:
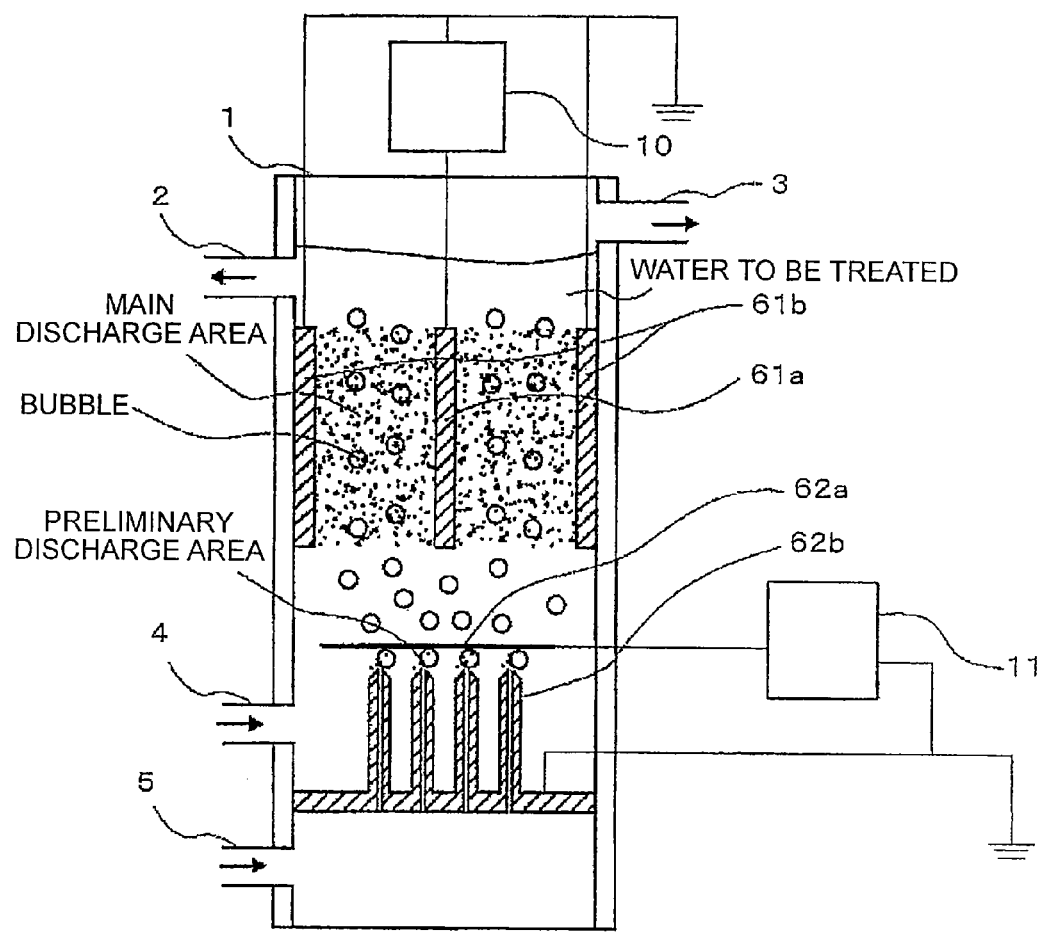
FIG. 19 is a structural diagram illustrating a water treatment device according to Embodiment 18 of the present invention.

FIG. 19 is a structural diagram illustrating a water treatment device according to Embodiment 18 of the present invention. Embodiment 18 of the present invention differs from Embodiment 1 described above in that the second auxiliary electrode 62b integrates the function of the bubble generating unit 8 and the function of the auxiliary electrodes 62 and is shaped to have needle nozzles, and in that the first auxiliary electrode 62a is given the shape of a wire.

As illustrated in FIG. 19, the second auxiliary electrode 62b in Embodiment 18 of the present invention is shaped to have needle nozzles formed in a matrix pattern, and the first auxiliary electrode 62a is given the shape of a wire, which is represented by the bold line in FIG. 14(b) described above, and is disposed so that one wire runs directly above and along each line of holes of the nozzles of the second auxiliary electrode 62b.

Embodiment 18 of the present invention, where the use of needle nozzle-shaped electrodes keeps the preliminary discharge area a relatively narrow area and the electric field concentration effect is obtained, thus has an additional advantage to the advantages of Embodiment 1 in that preliminary discharge through use of bubbles can be caused at a low voltage while reducing the adverse effect of Joule loss.

Embodiment 19

Figure 20A:
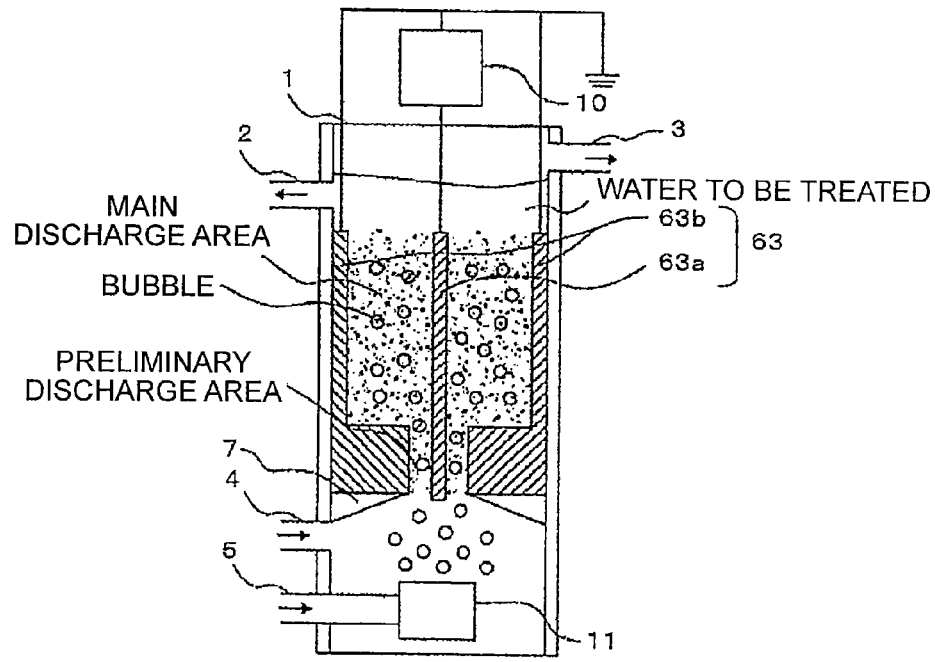
FIGS. 20A and 20B are structural diagrams illustrating a water treatment device according to Embodiment 19 of the present invention.
Figure 20B:
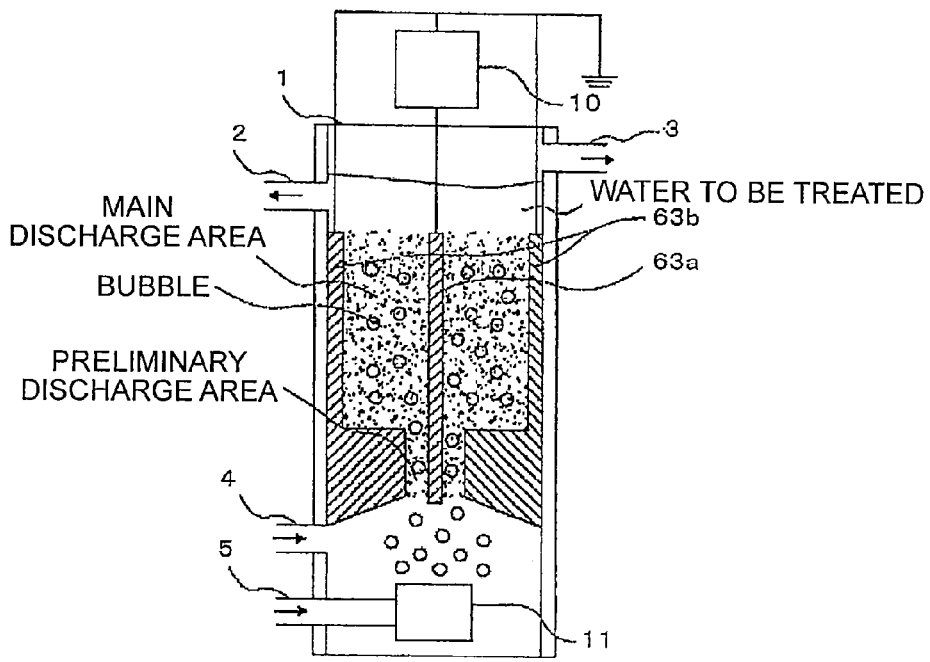

FIGS. 20A, 20B are structural diagrams illustrating a water treatment device according to Embodiment 19 of the present invention. Embodiment 19 of the present invention differs from Embodiments 1 to 18 described above in that integrated electrodes 63 in which the main electrodes 61 and the auxiliary electrodes 62 are integrated are included.

As illustrated in FIG. 20A, the integrated electrodes 63 in which the main electrodes 61 and the auxiliary electrodes 62 are integrated are provided in Embodiment 19 of the present invention, and the integrated electrodes 63 include a first integrated electrode 63a and a second integrated electrode 63b.

A main discharge area is provided between the first integrated electrode 63a and the second integrated electrode 63b. A partial area of the main discharge area where the gap between the first integrated electrode 63a and the second integrated electrode 63b is narrow serves as a preliminary discharge area.

The first integrated electrode 63a is connected to the first power supply 10, and the second integrated electrode 63b is connected to a ground. The bubble leading guide 7 for leading bubbles into the preliminary discharge area is provided below the second integrated electrode 63b. The bubble generating unit 8 for introducing bubbles into water is provided below the bubble leading guide 7.

The operation of the water treatment device according to Embodiment 19 of the present invention is described next. First, water to be treated is poured from the water inlet 4 into the treatment tank 1 to be stored. Oxygen or steam is introduced into the bubble generating unit 8 from the gas supply 9 through the gas inlet 5, thereby generating bubbles in the water to be treated.

The generated bubbles are supplied to the preliminary discharge area and the main discharge area. At this point, a high voltage is applied to the first integrated electrode 63*a* and from the first power supply 10, to thereby form a high electric field in the preliminary discharge area and the main discharge area each.

The bubbles passing through the preliminary discharge area cause discharge (preliminary discharge), which supplies initial electrons to the bubbles. Thereafter, the bubbles containing initial electrons are immediately introduced into the main discharge area, and discharge is again caused via the bubbles (main discharge), thereby generating radicals with which the water to be treated is treated. Some of the bubbles that remain unreacted are let out of the gas outlet 3.

Embodiment 19 of the present invention, where the use of the integrated electrodes 63 in which the main electrodes 61 and the auxiliary electrodes 62 are integrated allows bubbles that contain initial electrons because of preliminary discharge to directly enter the main discharge area, thus has an additional advantage to the advantages of Embodiments 1 to 18 in that discharge can be caused without being affected by the deactivation of initial electrons.

While Embodiment 19 of the present invention deals with an example in which the bubble leading guide 7 is used to lead bubbles into the preliminary discharge area, a structure of FIG. 20B, for example, may instead be employed in which the bottom of the second integrated electrode 63*b* is sloped toward the preliminary discharge area.

Embodiment 20

Figure 21A:
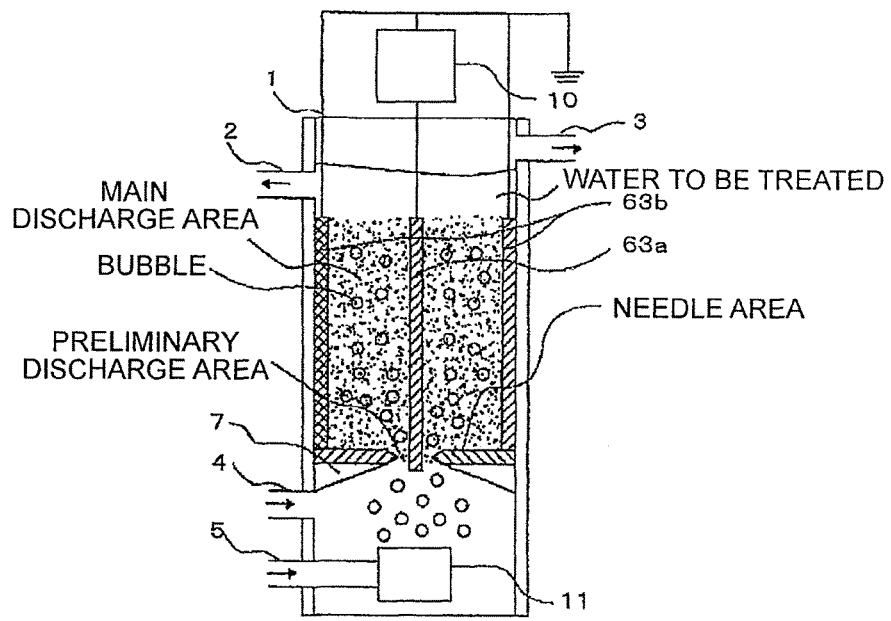
FIGS. 21A and 21B are structural diagrams illustrating a water treatment device according to Embodiment 20 of the present invention.
Figure 21B:
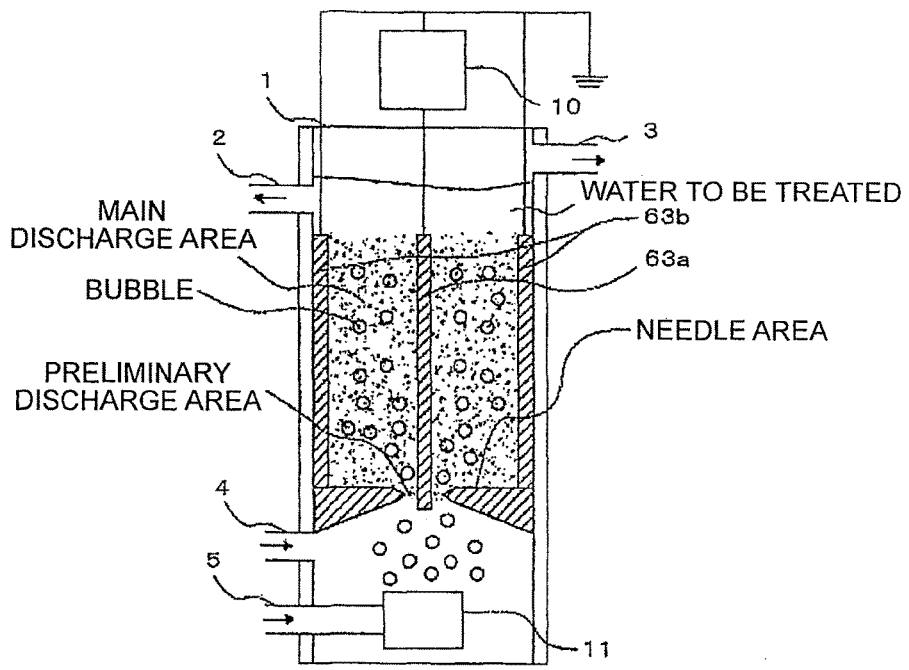

FIGS. 21A, 21B are structural diagrams illustrating a water treatment device according to Embodiment 20 of the present invention. In FIG. 21A, Embodiment 20 of the present invention differs from Embodiments 19 described above in that a part of the integrated electrodes 63 includes a needle area.

Embodiment 20 of the present invention, where the use of a needle electrode provides the electric field concentration effect which is brought about by the electrode shape, thus has an additional advantage to the advantages of Embodiment 19 in that an even higher electric field can be applied to bubbles. This makes it easy to cause discharge through use of bubbles having a small diameter which require a high electric field for discharge.

While Embodiment 20 of the present invention deals with an example in which the bubble leading guide 7 is used to lead bubbles into the preliminary discharge area, a structure of FIG. 21B, for example, may instead be employed in which the bottom of the second integrated electrode 63*b* is sloped toward the preliminary discharge area.

Embodiment 21

Figure 22:
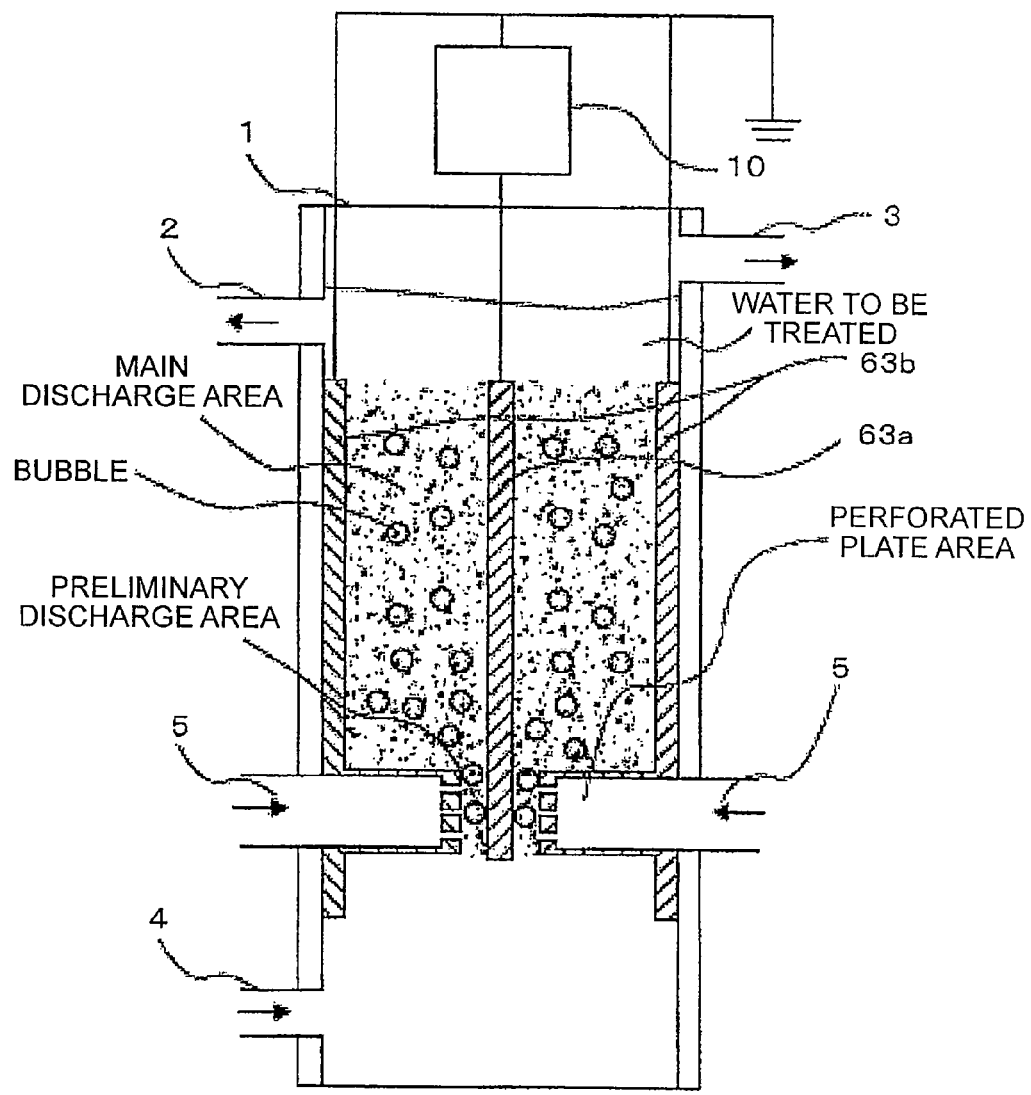
FIG. 22 is a structural diagram illustrating a water treatment device according to Embodiment 21 of the present invention.

FIG. 22 is a structural diagram illustrating a water treatment device according to Embodiment 21 of the present invention. Embodiment 21 of the present invention differs from Embodiment 19 described above in that integrated electrodes 63 in which the main electrodes 61, the auxiliary electrodes 62, and the bubble generating unit 8 are integrated are included, and in that a part of the integrated electrodes 63 is an area shaped like a perforated plate.

As illustrated in FIG. 22, the integrated electrodes 63 in which the main electrodes 61, the auxiliary electrodes 62, and the bubble generating unit 8 are integrated are provided in Embodiment 21 of the present invention, and the integrated electrodes 63 include a first integrated electrode 63*a* and a second integrated electrode 63*b*. The second integrated electrode 63*b* has a perforated plate area which is shaped like a plate with a plurality of holes opened in a part of the plate. A preliminary discharge area is formed between the perforated plate area and the first integrated electrode 63*a*.

Embodiment 21 of the present invention, where bubbles generated in the perforated plate area are introduced directly to the preliminary discharge area, thus has an additional advantage to the advantages of Embodiment 19 in that preliminary discharge can be caused at a relatively uniform bubble diameter without being affected by the merging of bubbles, thereby improving the stability of preliminary discharge.

While Embodiment 21 of the present invention deals with an example in which the second integrated electrode 63*b* is provided with the perforated plate area, the perforated plate area may instead be provided in the first integrated electrode 63*a*. The number and arrangement of holes in the perforated plate area are not particularly limited.

Embodiment 22

Figure 23:
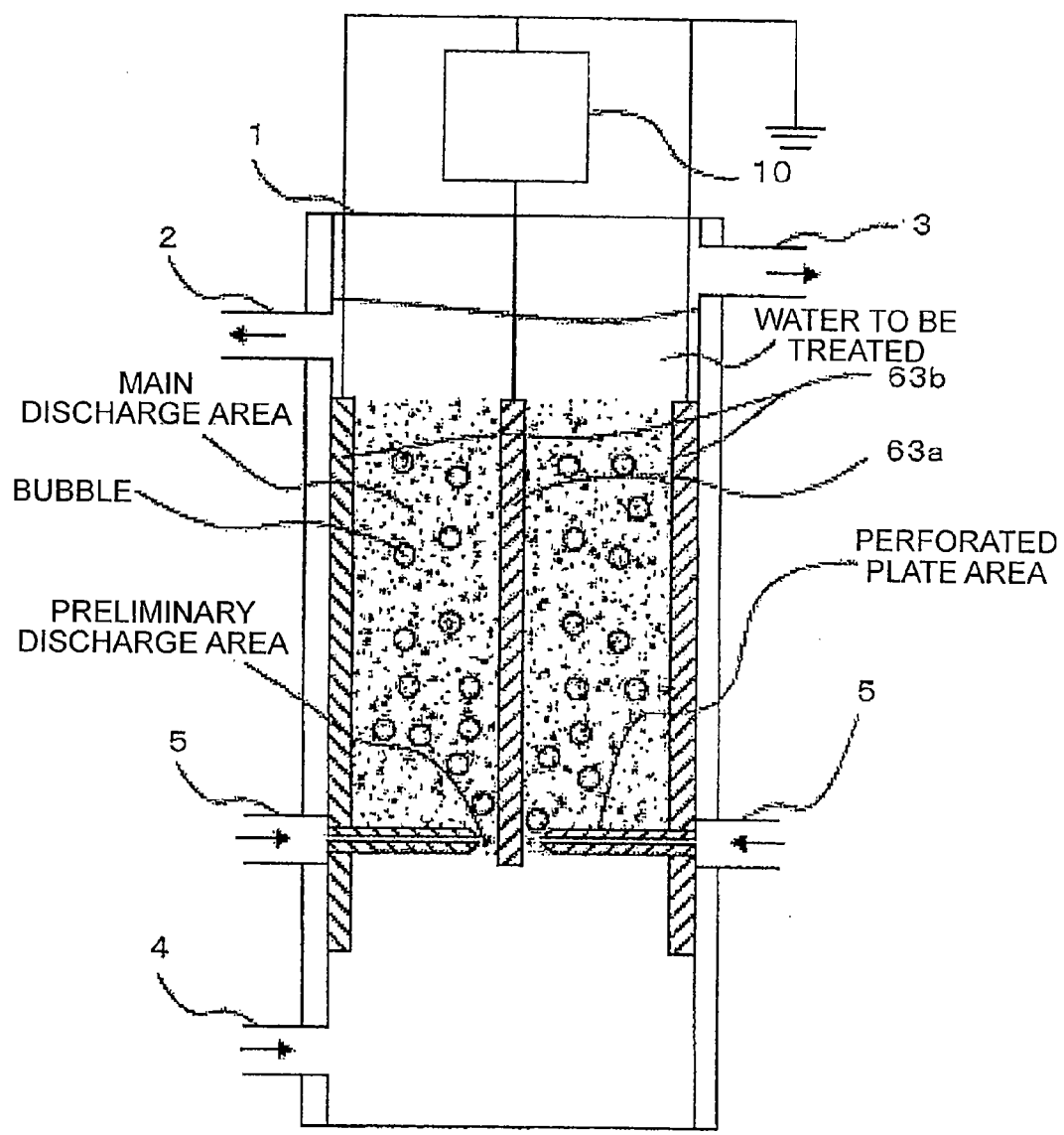
FIG. 23 is a structural diagram illustrating a water treatment device according to Embodiment 22 of the present invention.

FIG. 23 is a structural diagram illustrating a water treatment device according to Embodiment 22 of the present invention. Embodiment 22 of the present invention differs from Embodiment 21 described above in that integrated electrodes 63 in which the main electrodes 61, the auxiliary electrodes 62, and the bubble generating unit 8 are integrated are included, and in that a part of the integrated electrodes 63 is an area shaped like a needle nozzle.

As illustrated in FIG. 23, the integrated electrodes 63 in which the main electrodes 61, the auxiliary electrodes 62, and the bubble generating unit 8 are integrated are provided in Embodiment 22 of the present invention, and the integrated electrodes 63 include a first integrated electrode 63*a* and a second integrated electrode 63*b*.

A main discharge area is provided between the first integrated electrode 63*a* and the second integrated electrode 63*b*. The first integrated electrode 63*a* is connected to the first power supply 10, and the second integrated electrode 63*b* is connected to a ground.

A part of the second integrated electrode 63*b* is a needle nozzle area which includes a plurality of needle nozzles. Each needle nozzle is connected to one gas inlet 5. A preliminary discharge area is formed between the tips of the needle nozzles and the first integrated electrode 63*a*.

Embodiment 22 of the present invention, where the use of a needle electrode provides the electric field concentration effect, thus has an additional advantage to the advantages of Embodiment 21 in that an even higher electric field can be applied to bubbles. This makes it easy to cause discharge through use of bubbles having a small diameter which require a high electric field for discharge.

While Embodiment 22 of the present invention deals with an example in which the second integrated electrode 63*b* is provided with the needle nozzle area, the needle nozzle area may instead be provided in the first integrated electrode 63*a*.

The number and arrangement of needle nozzles in the needle nozzle area are not particularly limited.

Embodiment 23

Figure 24A:
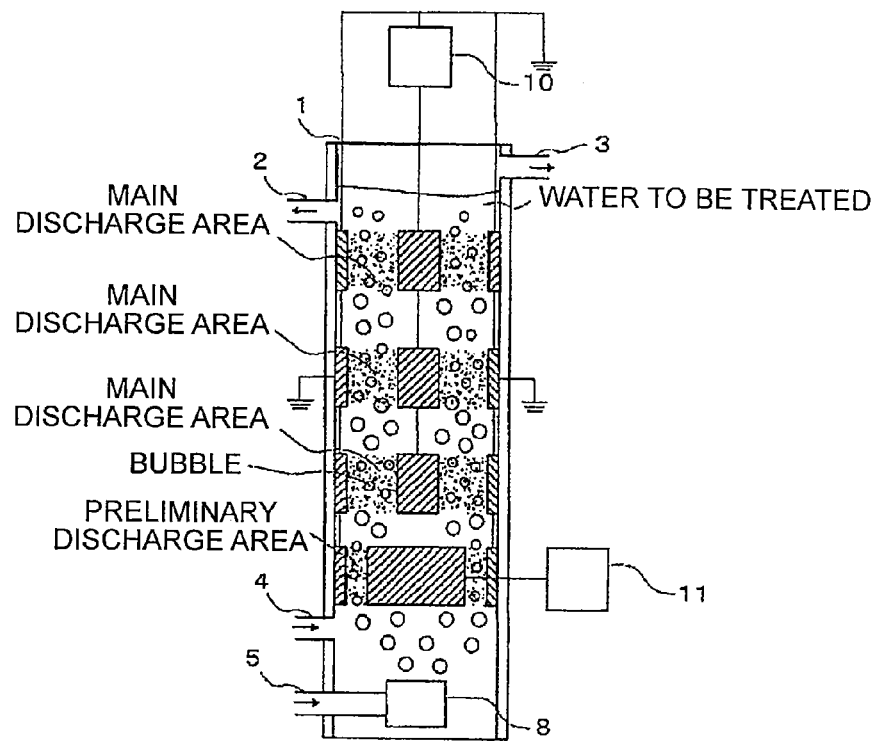
FIGS. 24A and 24B are structural diagrams illustrating a water treatment device according to Embodiment 23 of the present invention.
Figure 24B:
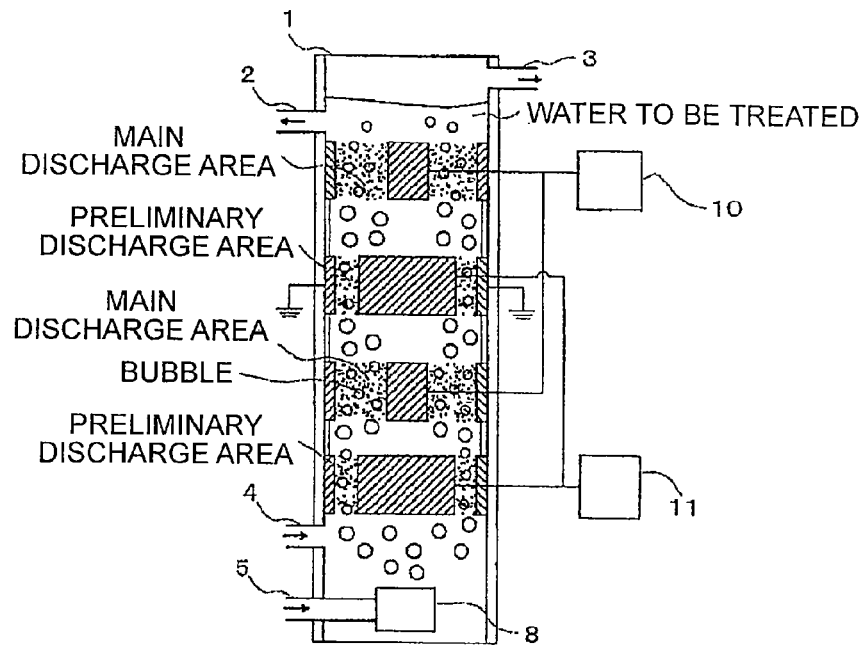

FIGS. 24A, 24B are structural diagrams illustrating a water treatment device according to Embodiment 23 of the present invention. Embodiment 23 of the present invention differs from Embodiments 1 to 18 described above in that the main electrodes 61 or the auxiliary electrodes 62 are built from a multi-stage electrode as in FIG. 24A.

Embodiment 23 of the present invention, where a multi-stage electrode is included, thus has an additional advantage to the advantages of Embodiments 1 to 18 in that bubbles reduced in diameter by discharge can be merged in a non-electric field applied area to be used to cause discharge again. Electric power and material gasses can be used effectively in this manner.

Embodiment 23 of the present invention deals with a structure in which a plurality of main electrodes 61 are provided at regular intervals. However, if the effect of preliminary discharge (initial electrons) is lost in a non-discharge area, the auxiliary electrodes 62 and the main electrodes 61 may be alternated as illustrated in FIG. 24B.

While an example of using four stages of electrodes is discussed in Embodiment 23 of the present invention, the number of stages of electrodes is not particularly limited.

Embodiment 24

Figure 25:
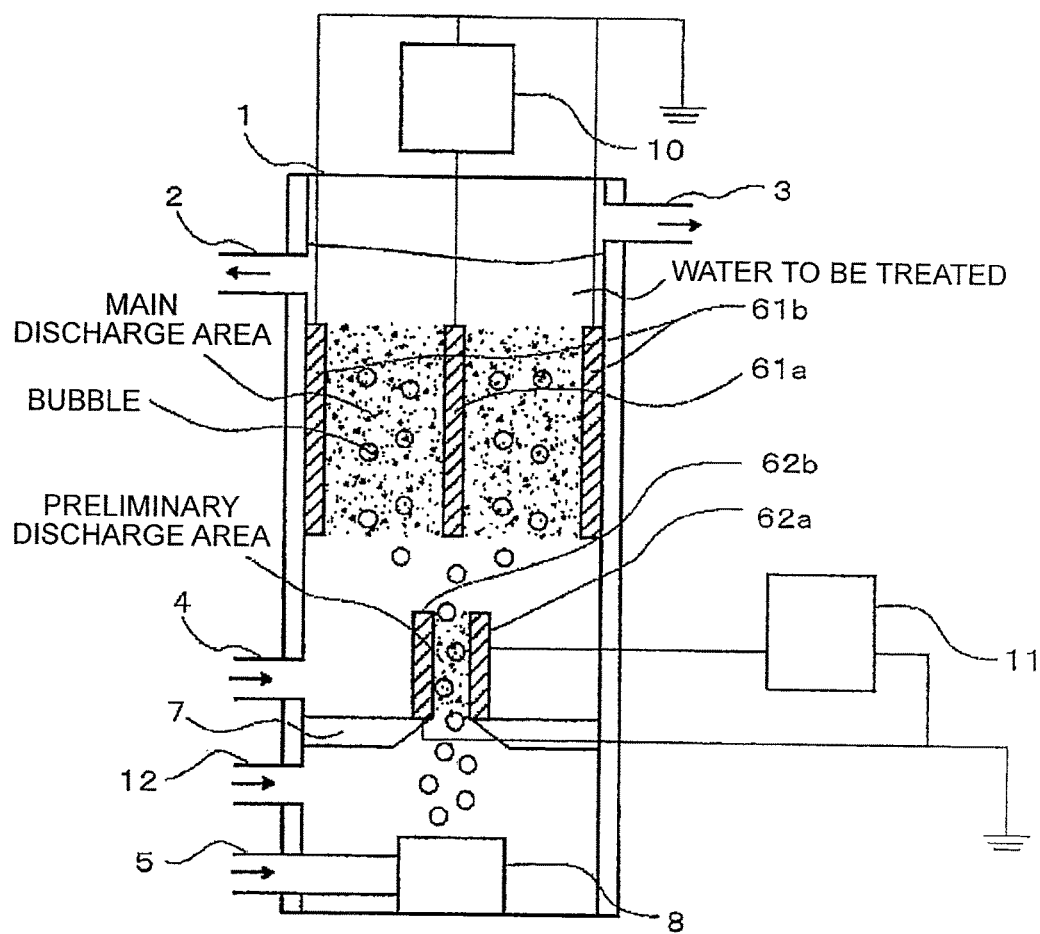
FIG. 25 is a structural diagram illustrating a water treatment device according to Embodiment 24 of the present invention.

FIG. 25 is a structural diagram illustrating a water treatment device according to Embodiment 24 of the present invention. Embodiment 24 of the present invention differs from Embodiments 1 to 18 described above in that a clear water inlet 12 is provided below the preliminary discharge area.

Clear water which is low in conductivity is supplied at a regular flow rate from the clear water inlet 12 provided below the preliminary discharge area. The preliminary discharge area is therefore filled with clear water all the time, and water to be treated does not flow into the preliminary discharge area. The clear water passes through the preliminary discharge area, and then is mixed with water to be treated to be let out of the treatment tank 1 through the water outlet 2.

Embodiment 24 of the present invention, where preliminary discharge is caused in clear water, thus has an additional advantage to the advantages of Embodiments 1 to 23 in that preliminary discharge can be caused while reducing Joule loss, thereby improving the power efficiency of preliminary discharge. In addition, the need for an expensive short pulse power supply is eliminated by running clear water which is low in conductivity and an inexpensive direct current power supply or the like can be used.

The term "clear water" in Embodiment 24 of the present invention refers to a liquid whose conductivity is within a range of from 0.05 μS/cm to 200 μS/cm.

Embodiment 25

Figure 26:
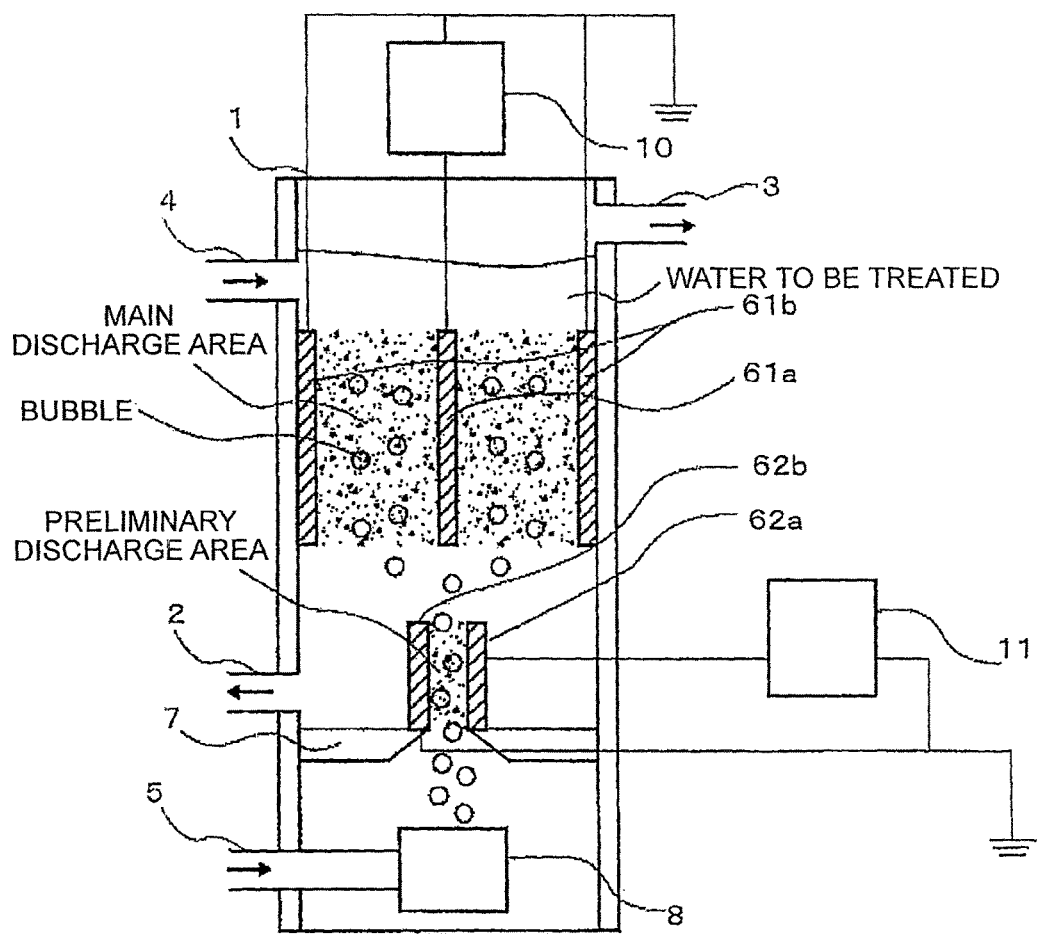
FIG. 26 is a structural diagram illustrating a water treatment device according to Embodiment 25 of the present invention.

FIG. 26 is a structural diagram illustrating a water treatment device according to Embodiment 25 of the present invention. Embodiment 25 of the present invention differs from Embodiments 1 to 24 described above in that the water inlet 4 and the water outlet 2 for water to be treated are connected inversely so that the direction in which water runs is reversed.

Embodiment 25 of the present invention, where water to be treated is run in a direction reverse to the travel direction of bubbles driven by buoyancy, thus has an additional advantage to the advantages of Embodiments 1 to 24 in that bubbles stay longer in the main discharge area, which makes more effective use of material gasses possible.

Embodiment 26

Figure 27:
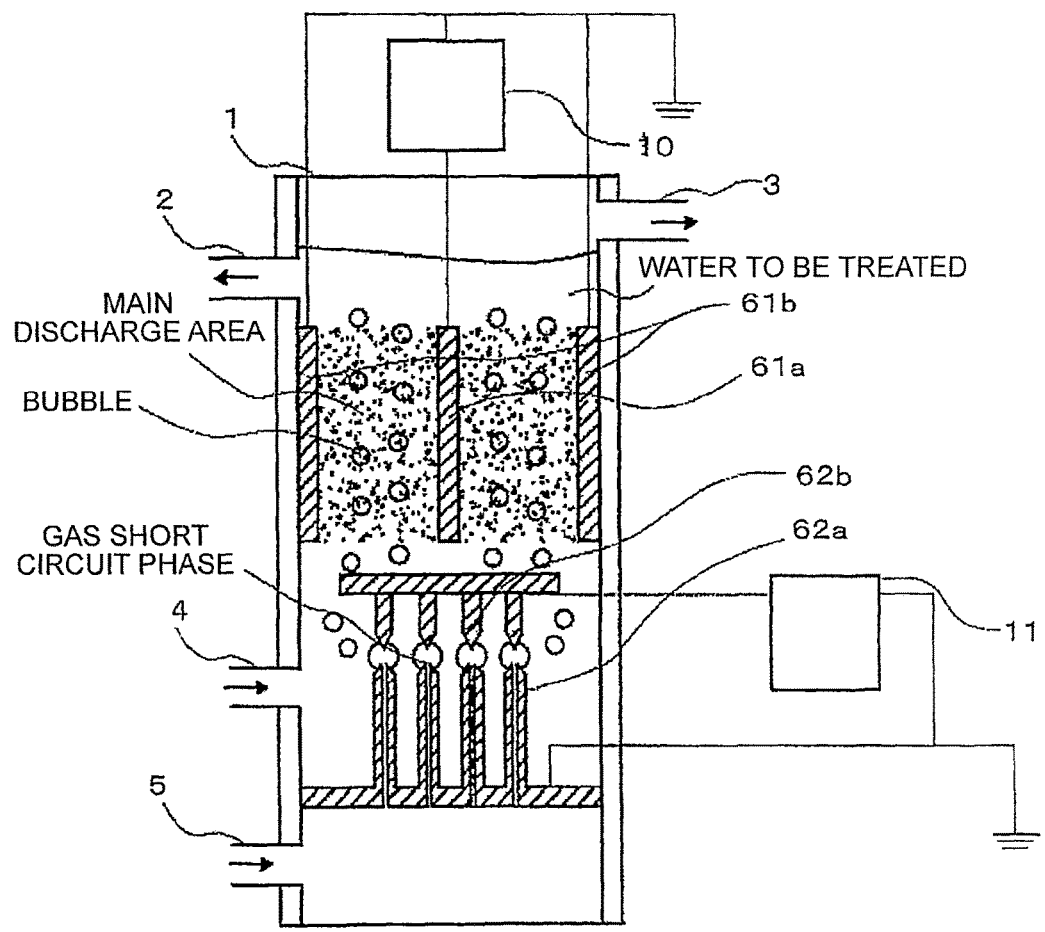
FIG. 27 is a structural diagram illustrating a water treatment device according to Embodiment 26 of the present invention.

FIG. 27 is a structural diagram illustrating a water treatment device according to Embodiment 26 of the present invention. Embodiment 26 of the present invention differs from Embodiments 1 to 24 described above in that a gas short circuit phase is formed in the preliminary discharge area to cause preliminary discharge. Embodiment 26 of the present invention is described with reference to FIG. 27 in which the device structure mode is the same as the one in Embodiment 17.

As illustrated in FIG. 27, the first auxiliary electrode 62a is built from needle-shaped electrodes and the second auxiliary electrode 62b is built from needle nozzle-shaped electrodes which are capable of introducing bubbles into water in Embodiment 26 of the present invention. A preliminary discharge area is formed between the tips of the first auxiliary electrode 62a and the second auxiliary electrode 62b. A gas short circuit phase is formed by setting the gap between the first auxiliary electrode 62a and the second auxiliary electrode 62b smaller than the diameter of a bubble that is emitted from the second auxiliary electrode 62b.

Embodiment 26 of the present invention, where a gas short circuit phase is formed between the first auxiliary electrode 62a and the second auxiliary electrode 62b, thereby making discharge through use of bubbles in water equal to discharge in the air, thus has an additional advantage to the advantages of Embodiments 1 to in that preliminary discharge can be caused without being affected by Joule loss. This improves the power efficiency of preliminary discharge and also eliminates the need for an expensive short pulse power supply, which means that an inexpensive direct current power supply or the like can be used.

The term "gas short circuit phase" in Embodiment 26 of the present invention refers to a state in which a generated bubble is in contact with the first auxiliary electrode 62a and the second auxiliary electrode 62b both.

The gas short circuit phase in Embodiment 26 of the present invention can be formed by, for example, setting the gap between the auxiliary electrodes 62 smaller than the diameter of a bubble that is emitted from each needle nozzle electrode. The gas short circuit state can also be maintained constantly by increasing the flow rate of the supplied gas. However, it is sufficient if a gas short circuit is accomplished between the auxiliary electrodes 62, and the method of forming the gas short circuit phase is not limited to the examples given above.

While the device mode of Embodiment 17 is used to describe the method of forming the gas short circuit phase in Embodiment 26 of the present invention, this treatment method is applicable not just to the device mode of Embodiment 17 but also to the device modes of other embodiments described above.

Embodiment 27

Figure 28:
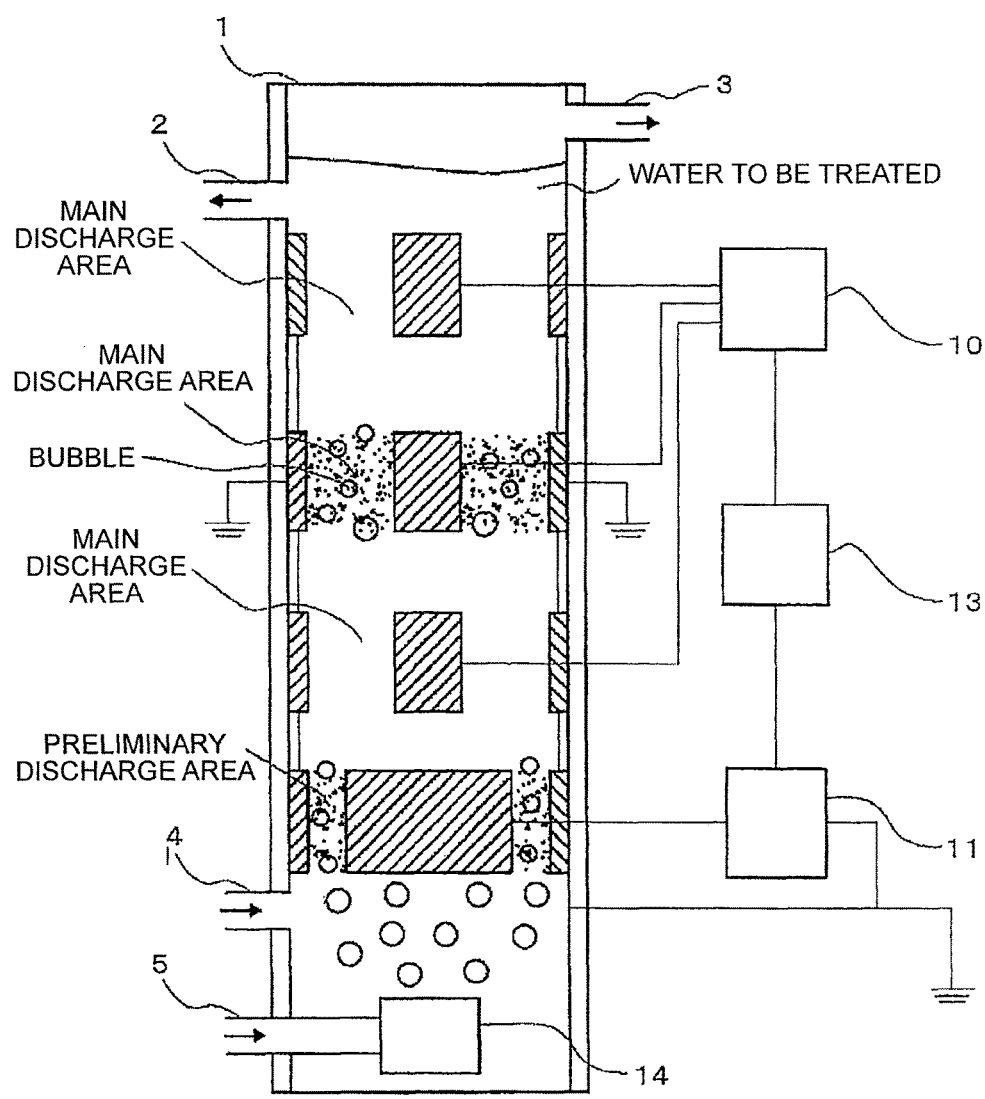
FIG. 28 is a structural diagram illustrating a water treatment device according to Embodiment 27 of the present invention.

FIG. 28 is a structural diagram illustrating a water treatment device according to Embodiment 27 of the present invention. Embodiment 27 of the present invention differs from Embodiments 1 to 24 described above in that a discharge control unit 13 and a pulsed bubble generating unit 14 are provided. Embodiment 27 of the present invention is described with reference to FIG. 28 in which the device structure mode is the same as the one in Embodiment 23.

As illustrated in FIG. 28, the discharge control unit 13 and the pulsed bubble generating unit 14 which are for generating bubbles in water in arbitrary cycles are provided in Embodiment 27 of the present invention, and the discharge control unit 13 is connected to the pulsed bubble generating unit 14, the first power supply 10, and the second power supply 11.

The pulsed bubble generating unit 14 generates bubbles in regular cycles. The generated bubbles are driven by buoyancy to travel. The knowledge on time intervals till the generated bubbles enter the respective discharge areas is to be grasped in advance. Information that informs of the emission of bubbles from the pulsed bubble generating unit 14 is transmitted to the discharge control unit 13. The discharge control unit 13 applies a voltage only to the discharge area where bubbles are currently located, out of all discharge areas. In other words, no voltage is applied to discharge areas where bubbles are not present. In this manner, discharge is caused in one discharge area after another along the travel direction of bubbles.

Embodiment 27 of the present invention, where a voltage is applied only to a discharge area where bubbles are currently located, thus has an additional advantage to the advantages of Embodiment 23 in that Joule loss is reduced, which makes efficient power utilization possible.

The discharge control unit 13 in Embodiment 27 of the present invention can be realized by, for example, control using a function generator. The pulsed bubble generating unit 14 can be realized by a method in which a switch that opens and closes cyclically is connected in a gas flow path between the bubble generating unit 8 and the gas supply 9. However, the discharge control unit 13 and the pulsed bubble generating unit 14 are not limited to the methods described above.

While the device mode of Embodiment 23 is used to describe the water treatment method that uses the discharge control unit 13 and the pulsed bubble generating unit 14 in Embodiment 27 of the present invention, this treatment method is applicable not just to the device mode of Embodiment 23 but also to the device modes of other embodiments described above.

Embodiment 28

Figure 29:
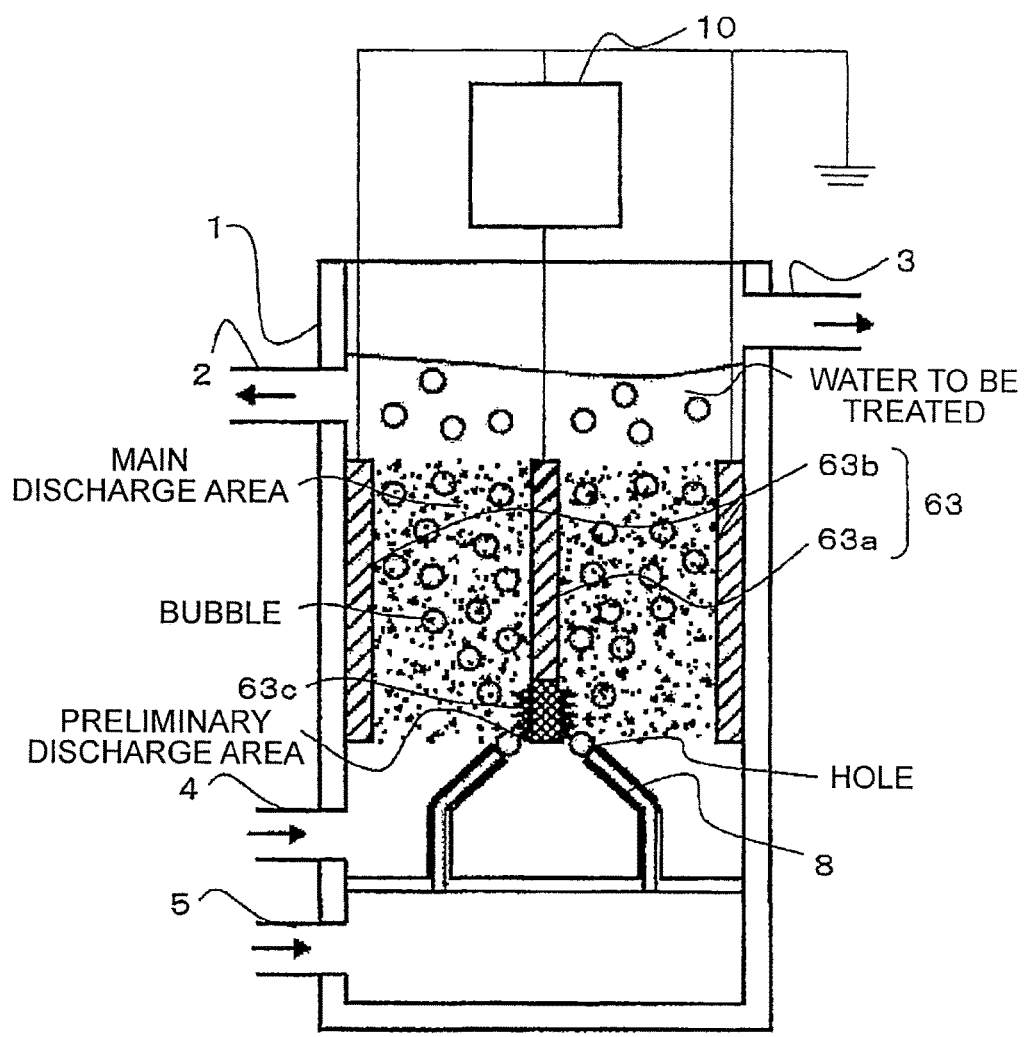
FIG. 29 is a structural diagram illustrating a water treatment device according to Embodiment 28 of the present invention.

FIG. 29 is a structural diagram illustrating a water treatment device according to Embodiment 28 of the present invention. Embodiment 28 of the present invention differs from Embodiments 1 to 24 described above in that integrated electrodes 63 are included which integrate the main electrodes 61 and the auxiliary electrode 62 and a part of which is a high electric field area 63c shaped to have needles, and in that the bubble generating unit 8 that is shaped to have nozzles is provided with holes from which bubbles are emitted facing the high electric field area 63c.

As illustrated in FIG. 29, in Embodiment 28 of the present invention, the high electric field area 63c in which a plurality of needle-shaped electrodes are formed so as to protrude side by side is provided on a surface of a first integrated electrode 63a at an end, and, below the integrated electrodes 63, the bubble generating unit 8 that is made from an insulating material and shaped to have nozzles is placed short of entering a discharge area between the electrodes, with the nozzle tip holes from which bubbles are emitted facing the near side of the high electric field area 63c.

The nozzle tips of the bubble generating unit 8 are slanted at an angle of 30 degrees to 50 degrees with respect to the perpendicular direction so that bubbles are supplied to the high electric field area 63c obliquely from below. With this structure, bubbles are led so as to approach the high electric field area 63c.

A voltage is applied at this point to the first integrated electrode 63a by the pulse power supply (first power supply) 10, thereby forming an electric field between the integrated electrodes 63. A gas is also supplied to the gas inlet 5 from the gas supply 9, thereby introducing bubbles into water to be treated from the nozzle tip holes of the bubble generating unit 8. This brings the bubbles into contact with the high electric field area 63c of the first integrated electrode 63a, thereby forming high electric fields in the bubbles, and preliminary discharge is caused via the bubbles. Charged particles which are initial electrons of discharge are generated inside the bubbles that have caused preliminary discharge, and bubble electric discharge therefore continues stably in the main discharge area.

Figure 30:
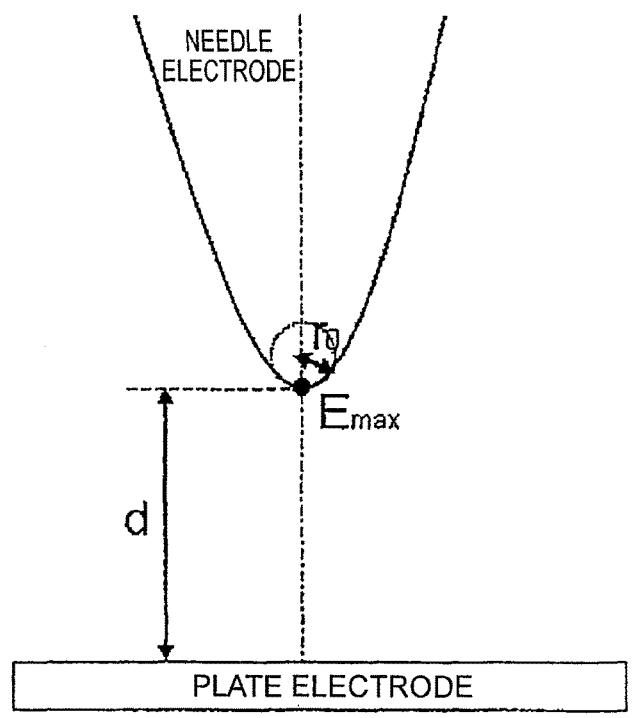
FIG. 30 is an explanatory diagram showing an action and effect of the water treatment device according to Embodiment 28 of the present invention.

An electric field applied to a bubble when the bubble comes into contact with the high electric field area 63c shaped to have needles is now examined. In a needle-shaped electrode, a high electric field is formed at the needle tip because of electric field concentration. For example, in a pin-to-plate electrode of FIG. 30, when the curvature radius at the needle tip is given as $r_0$, the discharge gap length is given as d, the voltage applied to the electrode is given as V, and $r_0$ is sufficiently smaller than d, an electric field E at the needle tip is expressed by Expression (5).

[Math. 3]

$$E \approx \frac{2V}{\ln\left(\frac{4d}{r_0}\right)} \frac{1}{r_0} \qquad (5)$$

Figure 31:
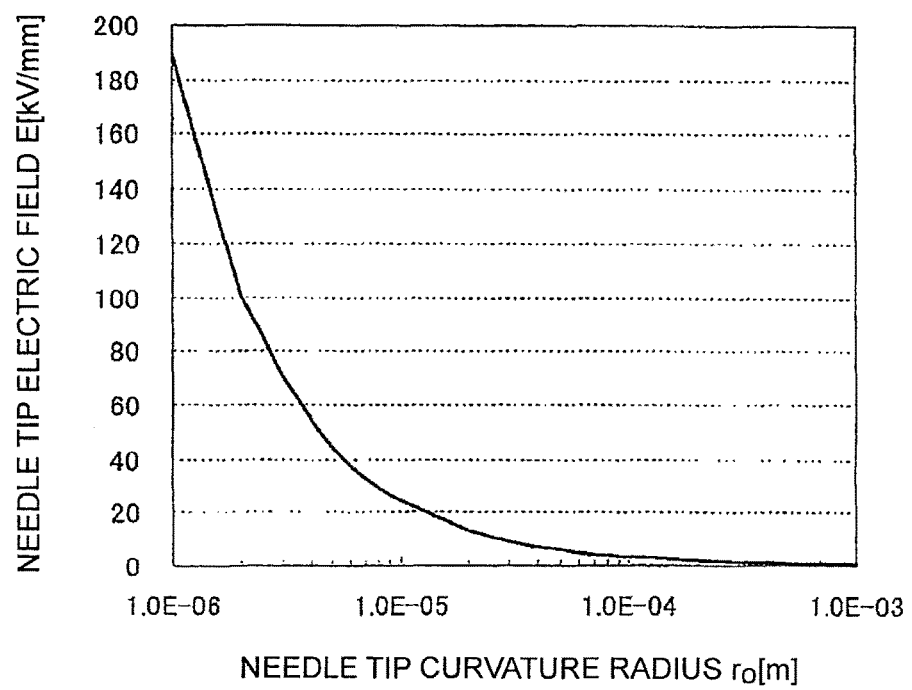
FIG. 31 is an explanatory diagram showing an action and effect of the water treatment device according to Embodiment 28 of the present invention.

When V is 1 kv and d is 10 mm in Expression (5), a relation shown in FIG. 31 is established between E and $r_0$. The electric field at the needle tip is highest in the needle-shaped electrode. When the curvature radius $r_0$ at the electrode tip is smaller (when the tip is sharper), the electric field at the tip is higher and a noticeable trend of increase in electric field intensity is observed when the curvature radius $r_0$ is 0.1 mm or less. A high electric field can therefore be applied to a bubble by bringing the bubble into contact with just the needle tip. Even in the case of a flat electrode, an electric field applied to a bubble that comes into contact with the electrode is higher than when a bubble is present between electrodes without the bubble touching the electrodes, because electric field concentration takes place in the vicinity of the point of contact between the bubble and the electrode.

Embodiment 28 of the present invention, where a bubble is brought into contact with the high electric field area 63c provided in a part of the integrated electrodes 63, thereby forming a high electric field in the bubble and causing preliminary discharge, thus has an additional advantage to the advantages of Embodiments 1 to 24 in that a higher electric field can be applied to a bubble than when the bubble is not brought into contact with the electrode. This is highly effective when discharge is caused under a condition that requires a high electric field to cause discharge, for example, when the bubble diameter is small.

While Embodiment 28 of the present invention deals with an example in which the high electric field area 63c is shaped to have needles, the high electric field area 63c can have any shape that has a portion where the curvature radius is high as shown in Expression (5). For example, an area that has many minute protrusions of which the curvature radius $r_0$ is 0.1 mm or less (a curvature of a given value or higher) may be formed by roughening a part of a surface of a discharge electrode. An edge of a discharge electrode may also be used, and the shape of the high electric field area is not limited to the examples given above.

The placement of the high electric field area 63c in the discharge electrode surface is not particularly limited. However, it is preferred to provide the high electric field area 63c in the vicinity of an entrance where bubbles enter an area between the discharge electrodes. This is because starting preliminary discharge early between the electrodes makes discharge in the main discharge area last longer, which results in high treatment efficiency.

The high electric field area, which is formed in the first integrated electrode 63a in the example discussed in Embodiment 28 of the present invention, may be formed in the second integrated electrode 63b, or may be formed in the first integrated electrode 63a and the second integrated electrode 63b each.

While Embodiment 28 of the present invention deals with a structure in which the integrated electrodes 63 are included which integrate the auxiliary electrodes 62 and the main electrodes 61, a structure in which the auxiliary electrodes 62 and the main electrodes 61 are independent may be employed, and Embodiment 28 is not limited to the example given above with regard to whether or not the auxiliary electrodes 62 and the main electrodes 61 are integrated.

The treatment method described in Embodiment 28 of the present invention may be applied not only to preliminary discharge but also to main discharge. An electric field that is high in intensity to a degree can be applied to a bubble without providing the high electric field area 63c in a discharge electrode surface, by bringing the bubble into contact with the electrode. For instance, while a high electric field owing to electric field concentration at the tip of a needle electrode cannot be expected to form in a device mode where the electrode shape is flat, such as the device mode of Embodiment 1 which is illustrated in FIG. 1 and the device mode of Embodiment 11 which is illustrated in FIG. 12, an electric field that is high in intensity to a degree can be applied to a bubble by bringing the bubble into contact with the flat-shaped electrode and thus causing electric field concentration in the vicinity of the point of contact between the bubble and the electrode.

The gap between the high electric field area 63c and the nozzle tips of the bubble generating unit 8 is not particularly limited in Embodiment 28 of the present invention. However, it is preferred to place the nozzle tips with the gap set between ½M and M in relation to a bubble diameter M. Through setting of the gap to a value equal to or smaller than the bubble diameter, bubbles can be led to the high electric field area without being affected by the flow rate of the supplied gas and the flow velocity of treatment water running in the treatment tank. Too small a gap inhibits the generation of bubbles due to clogging at the nozzle holes.

While Embodiment 28 of the present invention deals with an example in which the bubble generating unit 8 is formed from an insulating material and shaped to have nozzles, a structure in which an electrode is shaped to have nozzles may be employed as in, for example, Embodiment 22 illustrated in FIG. 23. The material and shape of the bubble generating unit are not limited to the example given above. Further, this treatment method is applicable not just to the device mode of Embodiment 28 but also to the device modes of other embodiments described above.

Embodiment 29

Figure 32:
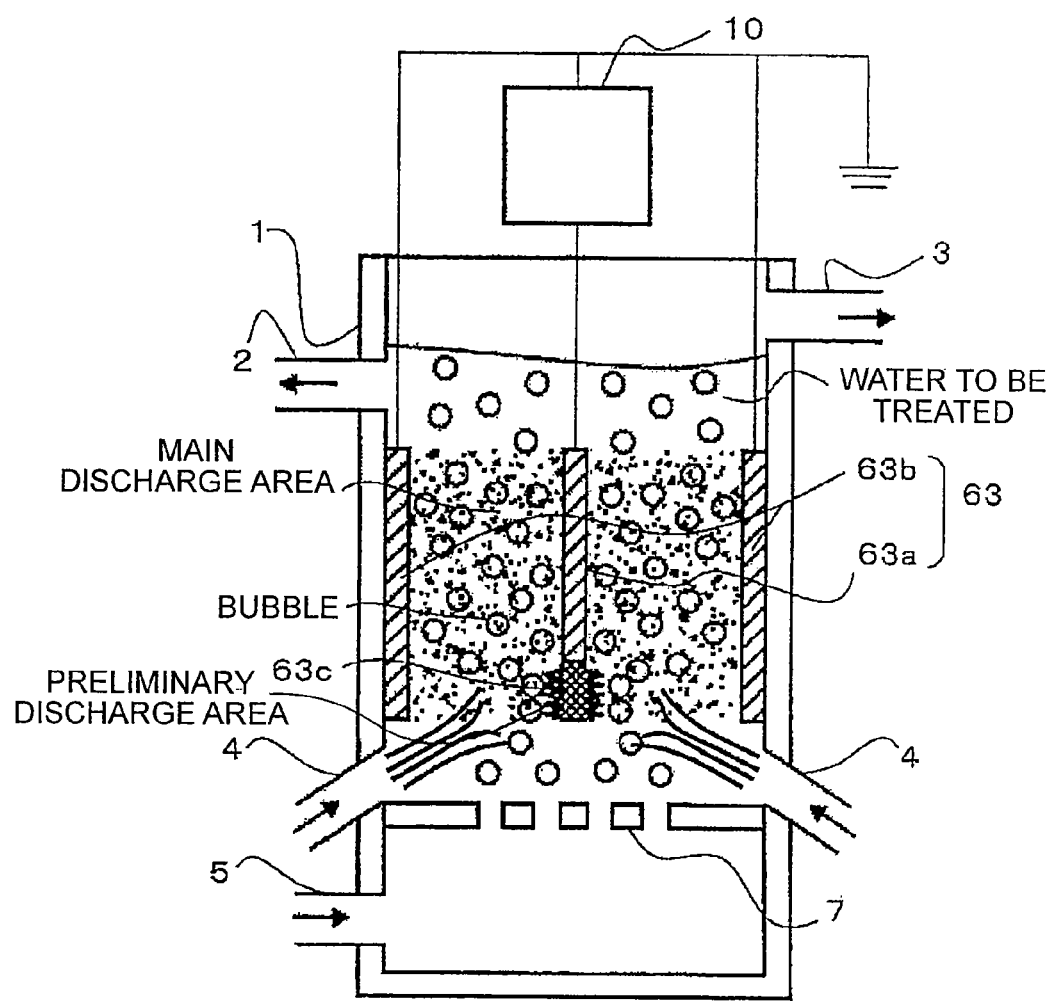
FIG. 32 is a structural diagram illustrating a water treatment device according to Embodiment 29 of the present invention.

FIG. 32 is a structural diagram illustrating a water treatment device according to Embodiment 29 of the present invention. Embodiment 29 of the present invention differs from Embodiment 28 described above in that each water inlet 4 is slanted toward the high electric field area 63c so that water to be treated flows toward the high electric field area 63c.

As illustrated in FIG. 32, in Embodiment 29 of the present invention, the high electric field area 63c in which a plurality of needle-shaped electrodes are formed so as to protrude side by side is provided on a surface of the first integrated electrode 63a at an end, the bubble generating unit 8 that is made from an insulating material and shaped like a perforated flat plate is provided below the integrated electrodes 63, and each water inlet 4 is slanted so that water to be treated flows toward the high electric field area 63c.

A voltage is applied at this point to the first integrated electrode 63a by the pulse power supply 10, thereby forming an electric field between the integrated electrodes 63. A gas is also supplied to the gas inlet 5 from the gas supply 9, thereby introducing bubbles into water to be treated from the nozzle tip holes of the bubble generating unit 8. Water to be treated is then run from each water inlet 4, thereby creating a water current that is directed toward the high electric field area 63c in the treatment tank.

Bubbles are thus led by the water current to be brought into contact with the high electric field area 63c of the first integrated electrode 63a, thereby forming high electric fields in the bubbles, and preliminary discharge is caused via the bubbles. Charged particles which are initial electrons of discharge are generated inside the bubbles that have caused preliminary discharge, and bubble electric discharge therefore continues stably in the main discharge area.

Embodiment 29 of the present invention, where bubbles are led by a water current to be brought into contact with the high electric field area, thus has an additional advantage to the advantages of Embodiments 28 in that the bubble generating unit 8 only needs to generate bubbles and has an increased degree of freedom in structure, which means that bubbles can be generated by a simple structure such as a mesh plate or an airstone.

While Embodiment 29 of the present invention deals with an example in which bubbles are led by a water current generated from each water inlet 4, the water current may be created by, for instance, a screw that is included in the device, and the method of creating a water current is not limited to the example given above.

Embodiment 30

Figure 33:
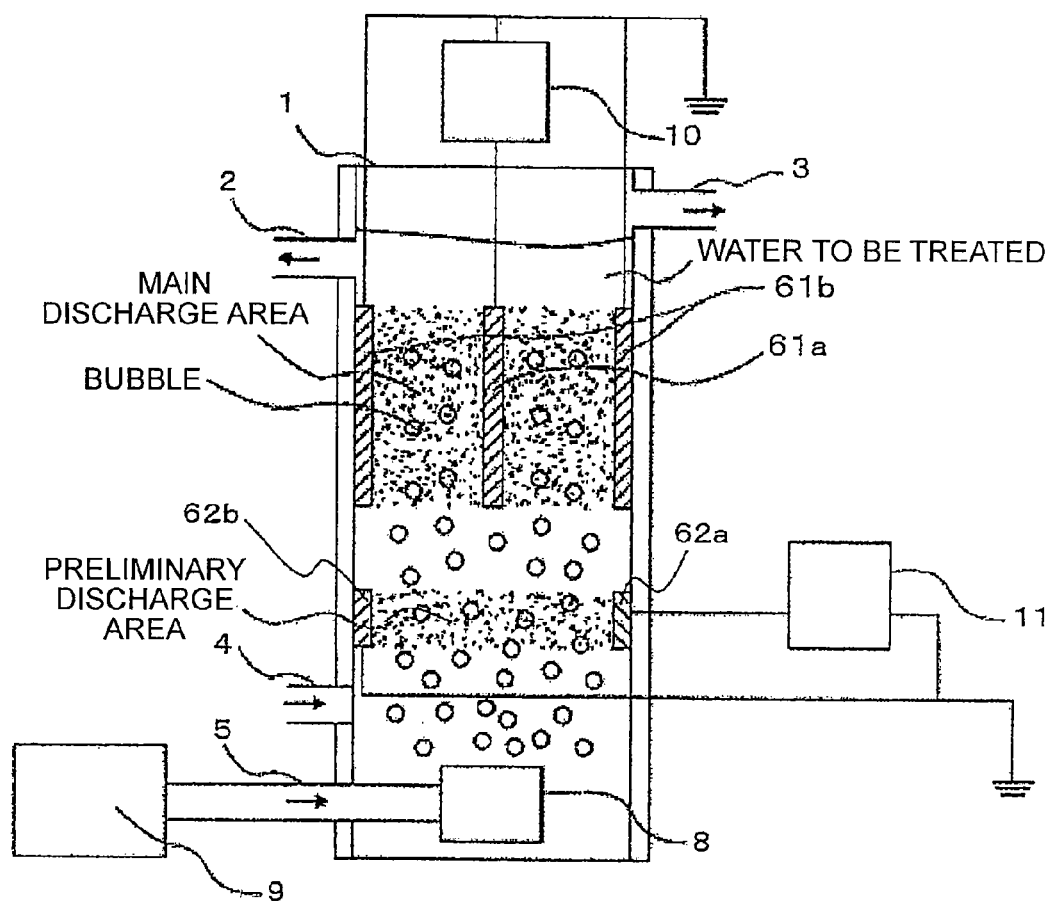
FIG. 33 is a structural diagram illustrating a water treatment device according to Embodiment 30 of the present invention.

FIG. 33 is a structural diagram illustrating a water treatment device according to Embodiment 30 of the present invention. Embodiment 30 of the present invention differs from the other embodiments in that the distance between the auxiliary electrodes 62 is relatively large and in that an excessive voltage in terms of an applied voltage necessary to form a bubble electric discharge starting electric field is applied by the second power supply 11 to an area between the auxiliary electrodes 62, thereby causing preliminary discharge inside bubbles.

As illustrated in FIG. 33, the auxiliary electrodes 62 in Embodiment 30 of the present invention are built from a pair of plate electrodes, and the gap between the auxiliary electrodes 62 is set larger than that of the auxiliary electrodes in the other embodiments. The auxiliary electrodes 62 are connected to the second power supply 11 capable of outputting a pulsed high voltage. The second power supply 11 applies, to the area between the auxiliary electrodes 62, an excessive voltage which is at least 1.5 times higher than an applied voltage necessary to form a bubble electric discharge starting electric field, thereby causing preliminary discharge through use of bubbles.

Embodiment 30 of the present invention, where an excessively high voltage is applied between the auxiliary electrodes 62 to form a high electric field between the electrodes, thus has an additional advantage to the advantages of Embodiment 1 in that bubble preliminary discharge can be caused by a high electric field despite a wide gap between the auxiliary electrodes 62, which means that preliminary discharge can be caused in a wide area in water to be treated through use of a large quantity of bubbles. This makes discharge in water to be treated via an even larger quantity of bubbles possible, thereby improving the efficiency of water treatment.

While the device mode of FIG. 33 is used to describe the method of preliminary discharge between the auxiliary electrodes 62 in Embodiment 30 of the present invention, this treatment method is applicable not just to the device mode of FIG. 33 but also to the device modes of other embodiments described above.

Embodiment 31

Figure 34:
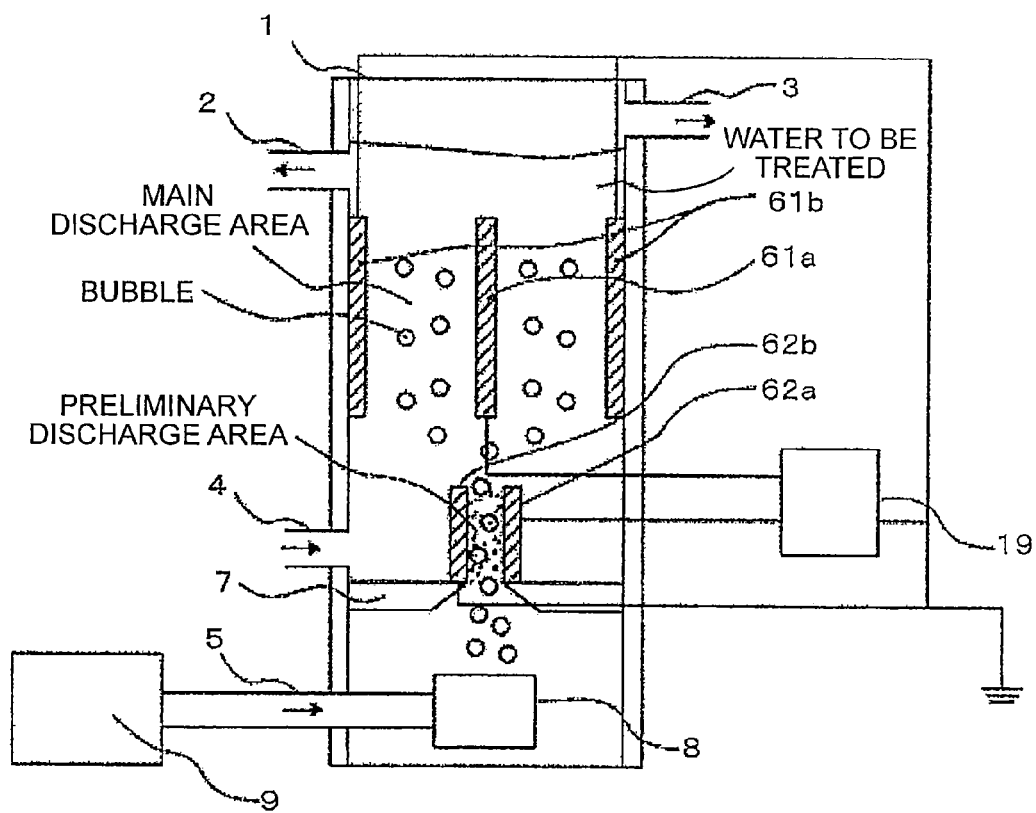
FIG. 34 is a structural diagram illustrating a water treatment device according to Embodiment 31 of the present invention.

FIG. 34 is a structural diagram illustrating a water treatment device according to Embodiment 31 of the present invention. Embodiment 31 of the present invention differs from the embodiments described above in that a two-output channel power supply 19 having two channels of high-voltage output terminals which output different waveforms on different schedules from each other is included, and in that main discharge and preliminary discharge are caused while avoiding applying a high voltage to the main electrodes 61 and the auxiliary electrodes 62 concurrently.

As illustrated in FIG. 34, the auxiliary electrodes 62 and the main electrodes 61 are included in Embodiment 31 of the present invention, and are connected to the two-output channel power supply 19 having two channels of high-voltage output terminals which output different waveforms on different schedules from each other. The bubble generating unit 8 for generating bubbles in water to be treated is provided in a lower part of the device.

Bubbles are generated in water to be treated by introducing a gas into the bubble generating unit 8. The generated bubbles are driven by buoyancy to travel upward. A pulsed high voltage is applied at this point between the main electrodes 61 and between the auxiliary electrodes 62 by the two-output channel power supply 19, thereby forming an electric field in each of the main discharge area, which is between the main electrodes 61, and the preliminary discharge area, which is between the auxiliary electrodes 62.

However, the two-output channel power supply 19 does not apply a voltage to the main electrodes 61 and the auxiliary electrodes 62 concurrently, and always staggers the time to apply voltage to the main electrodes 61 and the time to apply voltage to the auxiliary electrodes 62. Main discharge and preliminary discharge are thus caused separately by independent voltage application, and a voltage drop due to one of main discharge and preliminary discharge therefore does not affect the stability of the other of main discharge and preliminary discharge.

Embodiment 31 of the present invention, where main discharge and preliminary discharge are caused separately by independent voltage application, thus has an additional advantage to the advantages of Embodiment 1 in that a voltage drop due to one of main discharge and preliminary discharge therefore does not affect the stability of the other of main discharge and preliminary discharge.

While the device mode of FIG. 34 is used to describe the method of discharge between the main electrodes 61 and between the auxiliary electrodes 62 in Embodiment 31 of the present invention, this treatment method is applicable not just to the device mode of Embodiment 31 but also to the device modes of other embodiments described above.

Embodiment 32

Figure 35:
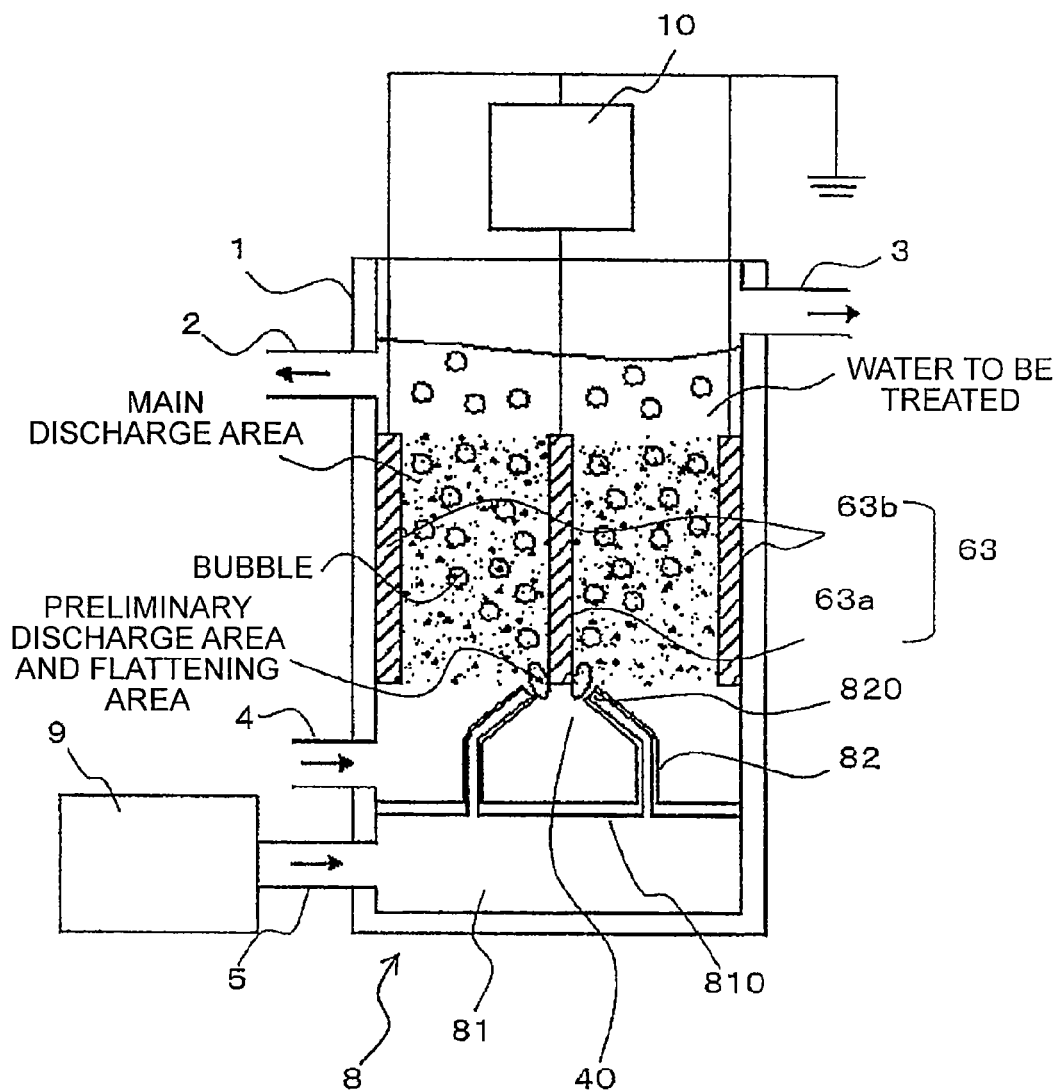
FIG. 35 is a structural diagram illustrating a water treatment device according to Embodiment 32 of the present invention.

FIG. 35 is a structural diagram illustrating a water treatment device according to Embodiment 32 of the present invention. As illustrated in FIG. 35, the water treatment device includes a treatment tank 1 in which water to be treated is run, a plurality of discharge electrodes provided inside the treatment tank 1, here, 63a and 63b (integrated electrodes 63 which include a first integrated electrode 63a and a second integrated electrode 63b) a bubble generating unit 8 provided in a lower part of the treatment tank 1, a bubble flattening unit 40 for flattening bubbles, a gas supply 9 for feeding a gas into the treatment tank 1, and a pulse power supply 10 connected to the discharge electrodes 63a and 63b.

The treatment tank 1 in an example of FIG. 35 is a container that is rectangular in section, and the treatment tank 1 is capable of storing a fixed amount of water to be treated. The treatment tank 1 is provided with a water inlet 4 through which water to be treated is poured into the treatment tank 1, a water outlet 2 through which water to be treated that has been treated in the treatment tank 1 is let out, a gas inlet 5 which connects the gas supply 9 and the treatment tank 1, and a gas outlet 3 for letting out a gas that has been fed into water to be treated from the bubble generating unit 8.

The thus structured treatment tank 1 is a container where water to be treated poured through the water inlet 4 is treated while the fixed amount of the water to be treated is stored, and water to be treated that has been treated is let out of the water outlet 2. The water outlet 2 and the gas outlet 3 are provided in an upper part of the treatment tank 1, and the water inlet 4 and the gas inlet 5 are provided in a lower part of the treatment tank 1. The gas outlet 3 is provided above the water outlet 2. The water inlet 4 is provided below the water outlet 2. The gas inlet 5 is provided further below the water inlet 4.

The plurality of discharge electrodes, 63a and 63b (three in total in this example), are disposed in water to be treated in the treatment tank 1. The discharge electrodes 63a and 63b are spaced apart from one another in the width direction of the treatment tank 1 (the left-right direction in FIG. 35). The discharge electrodes 63a and 63b in this example are shaped like a plate that is rectangular in section, and the electrodes are arranged so as to face one another in the width direction of the treatment tank 1. The material of the discharge electrodes 63a and 63b is, for example, a metal material such as stainless steel, aluminum, or copper.

In this example, of the plurality of discharge electrodes, 63a and 63b, the electrode that is disposed at the center of the treatment tank 1 is the first discharge electrode 63a, and the pair of electrodes arranged so as to face each other across the first discharge electrode 63a is the second discharge electrodes 63b. The second discharge electrodes 63b are provided on wall surfaces of the treatment tank 1. When applied a voltage by the pulse power supply 10, one of the first discharge electrode 63a and the second discharge electrodes 63b behaves as an anode and the other behaves as a cathode. This causes a discharge area where one or more electric fields (two in this example) are generated to be formed between the first discharge electrode 63a and one of the second discharge electrodes 63b, which face the first discharge electrode 63a, and between the first discharge electrode 63a and the other of the second discharge electrodes 63b.

It is preferred to set the gap between the first discharge electrode 63a and one of the second discharge electrodes 63b where the discharge area is to be formed within a range of from 2 mm to 50 mm. When the gap is smaller than this range, bubbles partially bridge the discharge electrodes, causing large-current discharge and resulting in unstable discharge and a decrease in the amount of water to be treated, which may lead to a drop in treatment efficiency. When the gap is larger than this range, for example, when the gap is 50 mm, even the application of a voltage of 100 kV cannot cause discharge inside bubbles, according to Expression (6), which expresses the electric field E applied to an oxygen bubble that is located between the plate electrodes and which is described later, and setting a larger gap is therefore impractical considering treatment efficiency.

Discharge surfaces where the first discharge electrode 63a and the second discharge electrodes 63b face each other may be covered with a dielectric. This suppresses contamination of water to be treated caused by the precipitation of metal components of the electrodes due to ion etching or electrolysis when bubble electric discharge is caused in the vicinity of electrode surfaces. Alumina ceramic or glass, for example, can be used as the material of the dielectric. A preferred thickness range of the dielectric is from 10 μm to 5,000 μm. This is because a dielectric film that is too thin is insufficient in dielectric strength and a dielectric film that is too thick requires the application of a huge voltage to cause discharge. Thermal spraying onto a surface of a metal body, for example, can be used to cover the electrodes with the dielectric.

The bubble generating unit 8 includes gas storage 81 where a gas fed from the gas supply 9 is temporarily stored inside the treatment tank 1, and a plurality of bubble emitting nozzles 82 for feeding the gas in the gas storage 81 into water to be treated. The bubble generating unit 8 is placed below the discharge electrodes 63a and 63b so that generated bubbles ascend by buoyancy in the discharge area. The bubble generating unit 8 is connected to the gas supply 9 via the gas inlet 5. The gas used in this example is an oxygen gas.

The gas storage 81 has a border plate 810 to secure a space where the gas can be stored in a lower part of the treatment tank 1. The border plate 810 is a plate that is rectangular in section, and is fit so as to divide the interior of the treatment tank 1 into an upper section and a lower section. The border plate 810 is positioned below the water inlet 4 of the treatment tank 1 and above the gas inlet 5, and is fit in a manner that prevents water to be treated from seeping into the gas storage 81. The border plate 810 has a plurality of gas holes (two in this example) for mounting the bubble emitting nozzles 82 to the border plate 810.

One bubble emitting nozzle 82 is provided in each gas hole to protrude from the border plate 810 toward one of the discharge electrodes 63a and 63b. Each bubble emitting nozzle 82 is built from an insulator. At the tip of the bubble emitting nozzle 82, a bubble hole 820 is formed to emit, as a bubble, into water to be treated, the gas flown from the gas storage 81 into the bubble emitting nozzle 82. The bubble emitting nozzle 82 is mounted to the gas hole leaving a close gap between the bubble hole 820 and one of the discharge electrodes 63a and 63b. In this example, all bubble emitting nozzles 82 are placed close to the first discharge electrode 63a.

Figure 36A:
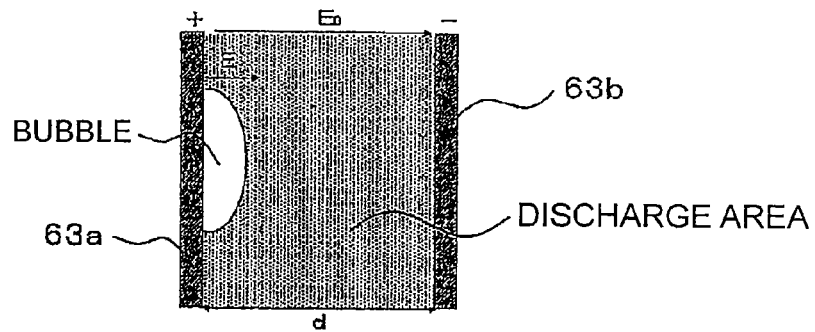
FIG. 36A is a schematic view illustrating a state in which a bubble is emitted from a bubble hole so as to come into direct contact with a discharge electrode.
Figure 36B:
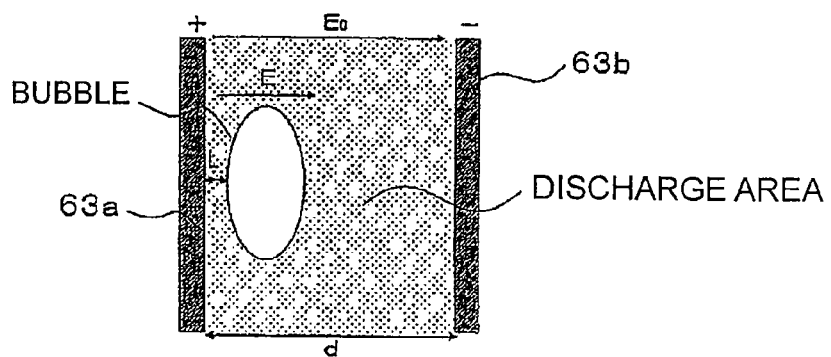
FIG. 36B is a schematic view illustrating a state in which a bubble is emitted from a bubble hole to a point that is distanced from a discharge electrode by a distance L.

FIG. 36A is a schematic view illustrating a state in which a bubble is emitted from the bubble hole 820 so as to come into direct contact with one of the discharge electrodes 63a and 63b. FIG. 36B is a schematic view illustrating a state in which a bubble is emitted from the bubble hole 820 to a point that is at a distance L from one of the discharge electrodes 63a and 63b. One first discharge electrode 63a and one second discharge electrode 63b are illustrated in each of FIGS. 36A and 36B. FIGS. 36A and 36B illustrate states in which a bubble is in contact with or close to the first discharge electrode 63a.

The gap between the bubble hole 820 and the first discharge electrode 63a is set to a value that brings a generated bubble into direct contact with the first discharge electrode 63a without the intervention of a liquid phase as illustrated in FIG. 36A, or a value that makes the distance L between the generated bubble and the first discharge electrode 63a 1 mm or less as illustrated in FIG. 36B. In order to secure this gap, the bubble hole 820 and the first discharge electrode 63a are placed close to each other across a narrow gap.

The bubble flattening unit 40 flattens a bubble generated from the bubble hole 820 into a substantially elliptical shape having a minor axis which corresponds to the shorter diameter of the bubble and a major axis which corresponds to the longer diameter of the bubble and which is longer than the minor axis, as those illustrated in FIGS. 36A and 36B. The bubble flattening unit 40 in Embodiment 32 of the present invention refers to the bubble generating unit 8 which has the bubble hole 820 and the first discharge electrode 63a, and flattens a bubble by bringing the bubble into contact with the first discharge electrode 63a before the bubble is completely emitted from the bubble hole 820 into water to be treated. In short, the bubble is sandwiched between the bubble hole 820 and the first discharge electrode 63a to be flattened. In order to flatten a bubble in this manner, the gap between the bubble hole 820 and the first discharge electrode 63a is set to a value equal to or less than the minor axis.

The gas supply 9 is connected to the gas inlet 5 of the treatment tank 1. The gas supplied from the gas supply 9 is fed into the gas storage 81 through the gas inlet 5. The gas supply 9 can be a gas canister to which a mass flow controller is connected to supply a gas to the gas storage 81 in an amount necessary for the treatment of water to be treated at a set flow rate.

A power supply preferred as the pulse power supply 10 outputs a voltage waveform that is quick to rise and is short in voltage application time. For example, a power supply that outputs a pulsed voltage is used as the pulse power supply 10. This is for decreasing energy loss that is an adverse effect of Joule loss in discharge in water. The conductivity is low at 1 μS/cm or less and the insulating properties are high in highly pure water such as ion exchanged water, whereas water to be treated which contains many impurities is high in conductivity. The application of a voltage between the first discharge electrode 63a and the second discharge electrodes 63b by the pulse power supply 10 therefore leads to Joule loss in which most are consumed as thermal energy by the energization of water.

Joule loss increases in proportion to the pulse width of the voltage waveform, and is reduced by momentary voltage application that lasts about several hundred nanoseconds. Discharge in water therefore uses a short pulse power supply capable of outputting a voltage wavelength that is quick to rise and is short in voltage application time at a full width at half maximum (FWHM) for about 300 nanoseconds.

A preferred frequency range is from 10 Hz to 1 MHz. This is because when the output pulse waveform has a fixed shape, a frequency less than 10 Hz requires the application of a huge voltage to input a set power, and a frequency more than 1 MHz consumes enormous power.

A preferred output voltage range is from 1 kV to 200 kV. This is because an output voltage lower than 1 kV results in a failure to cause discharge inside bubbles, and an output voltage higher than 200 kV increases the cost of introducing a power supply.

A water treatment method using the water treatment device is described next. First, water to be treated is poured from the water inlet 4 into the treatment tank 1 (a water-to-be-treated pouring step). Next, the pulse power supply 10 applies a voltage between the discharge electrodes 63a and 63b to form a discharge area between the discharge electrode 63a and one of the discharge electrodes 63b, and between the discharge electrode 63a and the other of the discharge electrodes 63b (a discharge area forming step).

In a state where there is no fear of water to be treated seeping into the gas storage 81 from the bubble emitting nozzles 82 (namely, a state where the liquid surface of the water to be treated poured into the treatment tank 1 is below each bubble hole 820 in the height direction of the treatment tank 1), a gas is fed from the gas supply 9 into the gas storage 81 so that bubbles can be generated from the bubble hole 820 (a bubble generating step).

A bubble emitted from the bubble hole 820 is stretched thin along the first discharge electrode 63a to be flattened by sandwiching the bubble between the first discharge electrode 63a and the bubble hole 820, which construct the bubble flattening unit 40, and keeping the bubble in contact with the first discharge electrode 63a before the bubble is completely emitted from the bubble hole 820 (a bubble flattening step). The flattened bubble is emitted into the discharge area. An electric field is applied at this point to the interior of the flattened bubble by the first discharge electrode 63a, thereby causing discharge inside the bubble. This is called preliminary discharge (a preliminary discharge step).

The preliminary discharge generates charged particles such as ions and electrons inside the bubble. In other words, this preliminary discharge refers to discharge that has the role of generating inside a bubble charged particles, which spark discharge, by applying an electric field that is extremely high compared to an electric field for starting discharge in the air to a bubble in water and thus causing discharge inside the bubble.

The bubble containing charged particles ascends by buoyancy in the discharge area formed in the water to be treated. The first discharge electrode 63a causes the ascending bubble to keep discharging, thereby enabling the discharge that has been caused in the preliminary discharge to continue in the discharge area. This is called main discharge. The discharge inside the bubble which is maintained by main discharge generates OH radicals in the water to be treated (an OH radical generating step). In other words, this main discharge refers to discharge that has the role of generating OH radicals efficiently by allowing a bubble that has come to contain charged particles through preliminary discharge to keep discharging in the discharge area.

The water to be treated is treated by the OH radicals generated in the OH radical generating step (a water-to-be-treated treating step). The water to be treated that has been treated is let out of the treatment tank 1 from the water outlet 2 (a treated-water-to-be-treated releasing step). The bubble ascending by buoyancy in the water to be treated is ultimately let out of the treatment tank 1 from the gas outlet 3. Those are performed for the duration of a set degradation time, to thereby complete all steps of the treatment of water to be treated.

The principle of the generation of OH radicals that are generated in the OH radical generation step is described next. When discharge is caused through use of a bubble that contains oxygen as in Embodiment 32 of the present invention, O radicals are generated inside the bubble by a collision that is caused between electrons and oxygen molecules by main discharge as expressed by Formula (1).

The O radicals react with water molecules, generating OH radicals as expressed by Formula (2).

A collision that is caused between electrons and water molecules by discharge also generates OH radicals as expressed by Formula (3).

OH radicals are generated in water to be treated through reactions expressed by Formulae (2) and (3). When the reaction of OH radicals progresses further, ozone, hydrogen peroxide, and the like are generated as well and contribute to the treatment of water to be treated directly or indirectly. A substance generated in this manner is higher in oxidative activity and has an accordingly stronger effect on the treatment of water to be treated when the oxidation-reduction potential of the substance is higher. The oxidation-reduction potential which is an indicator of the oxidizing power of a substance is shown in FIG. 2 for each relevant substance.

FIG. 2 shows that OH radicals are higher in oxidation-reduction potential than O radicals and others, and therefore is highly effective for the treatment of water to be treated.

An applied electric field that is necessary to cause preliminary discharge through use of bubbles is described next. An electric field E applied to an oxygen bubble that is located between plate electrodes in water is generally expressed by Expression (6) when a uniform electric field between the plate electrodes is given as $E_0$, the relative permittivity of water is given as $\varepsilon_1$, and the relative permittivity of oxygen bubbles is given as $\varepsilon_2$.

[Math. 4]

$$E = \frac{3\varepsilon_1}{2\varepsilon_1 + \varepsilon_2} E_0 \quad (6)$$

Figure 36C:
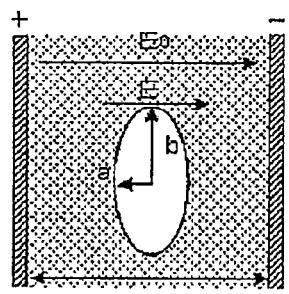
FIG. 36C is an explanatory diagram about a bubble located between plate electrodes in water.

FIG. 36(c) is an explanatory diagram about a bubble located between plate electrodes in water. When a bubble is located between plate electrodes as illustrated in FIG. 36(c), the oblateness of the bubble is given as m (m satisfies m=b/a and m>1), and the oxygen bubble relative permittivity $\varepsilon_2$ is 1, the electric field E inside the bubble is expressed by Expressions (7) and (8). The symbol a represents a half of the minor axis when the bubble has a substantially elliptical shape, and the symbol b represents a half of the major axis when the bubble has a substantially elliptical shape.

[Math. 5]
$$E = \frac{E_0}{1 + \frac{m^2}{2\varepsilon_1}(1 - \varepsilon_1)A_1} \quad (7)$$

[Math. 6]
$$A_1 = \frac{2\left(\sqrt{m^2 - 1} - \tan^{-1}\sqrt{m^2 - 1}\right)}{(m^2 - 1)^{3/2}} \quad (8)$$

The water relative permittivity $\varepsilon_1$ is about 80, and is sufficiently higher than the oxygen bubble relative permittivity $\varepsilon_2$ which is 1. Expression (7) can therefore be approximated into Expression (9).

[Math. 7]
$$E \cong \frac{E_0}{\left(1 - \frac{m^2 A_1}{2}\right)} \quad (9)$$

Figure 37:
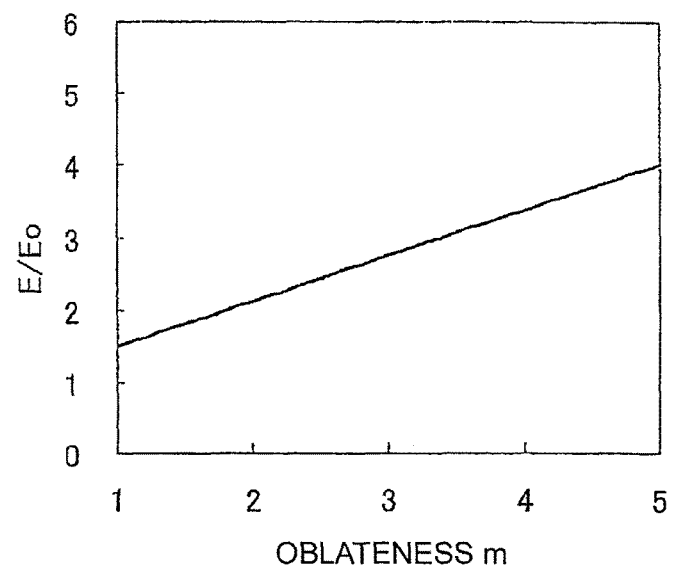
FIG. 37 is a graph showing a relation between an electric field increment rate $E/E_\theta$ and an oblateness m that is observed when a bubble is flattened.

FIG. 37 is a graph showing a relation between $E/E_0$, which represents the rate of electric field increase by bubble flattening, and the oblateness m. As shown in FIG. 37, the relation between the rate $E/E_0$ of electric field increase by bubble flattening and the oblateness m is such that a higher electric field E is applied to a bubble when the oblateness m is greater (when the bubble is stretched thinner in a direction perpendicular to an electric field between the electrodes).

A graph showing a relation between the diameter of an oxygen bubble in water and the discharge starting electric field which is derived from Paschen's law is given in FIG. 3. According to the relation between the diameter of an oxygen bubble in water and the discharge starting electric field which is derived from Paschen's law and shown in FIG. 3, a smaller bubble diameter (a smaller value of "a" in FIG. 36(c)) equals a greater applied electric field that is necessary to cause preliminary discharge. It is therefore understood from the results of FIG. 37 and FIG. 3 that, while flattening a bubble in order to increase the oblateness m makes high electric field application to the bubble possible, reducing the bubble diameter a undesirably increases the discharge starting electric field of the bubble.

Figure 38:
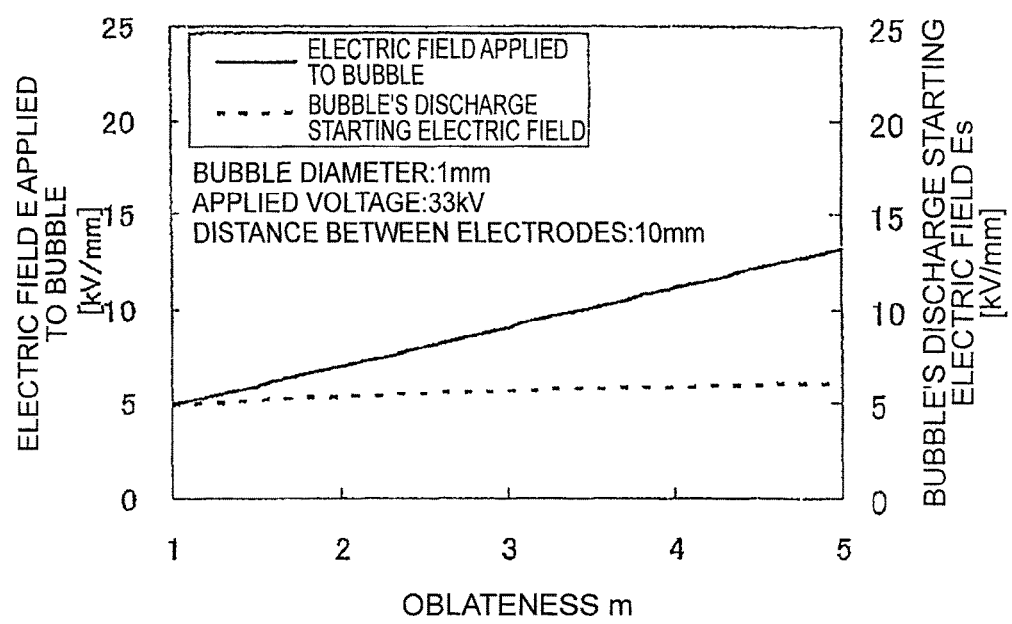
FIG. 38 is a graph showing a relation between an electric field applied to a bubble and the oblateness that is observed when the bubble has a diameter of 1 mm.
Figure 39:
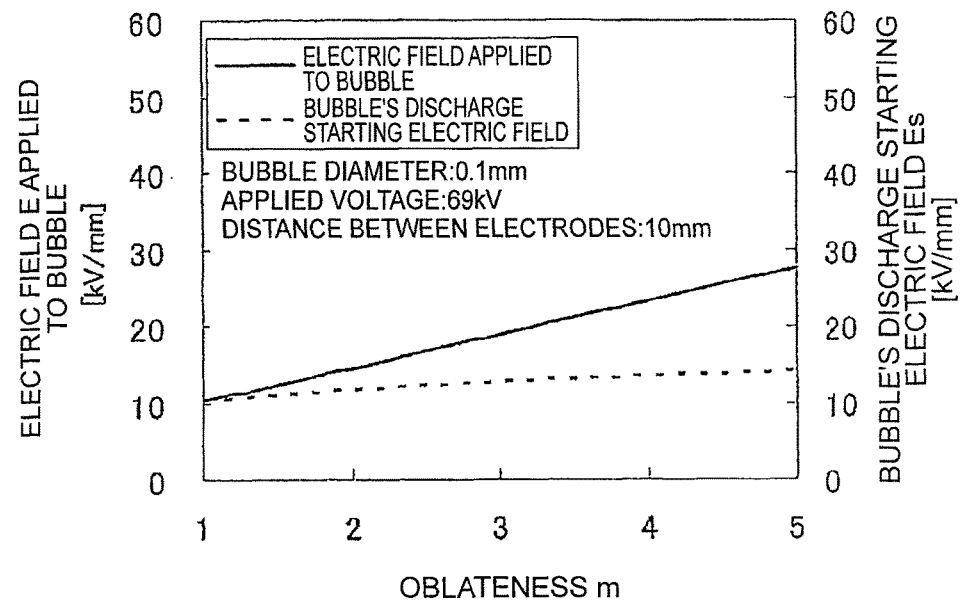
FIG. 39 is a graph showing a relation between the electric field applied to a bubble and the oblateness that is observed when the bubble has a diameter of 0.1 mm.
Figure 40:
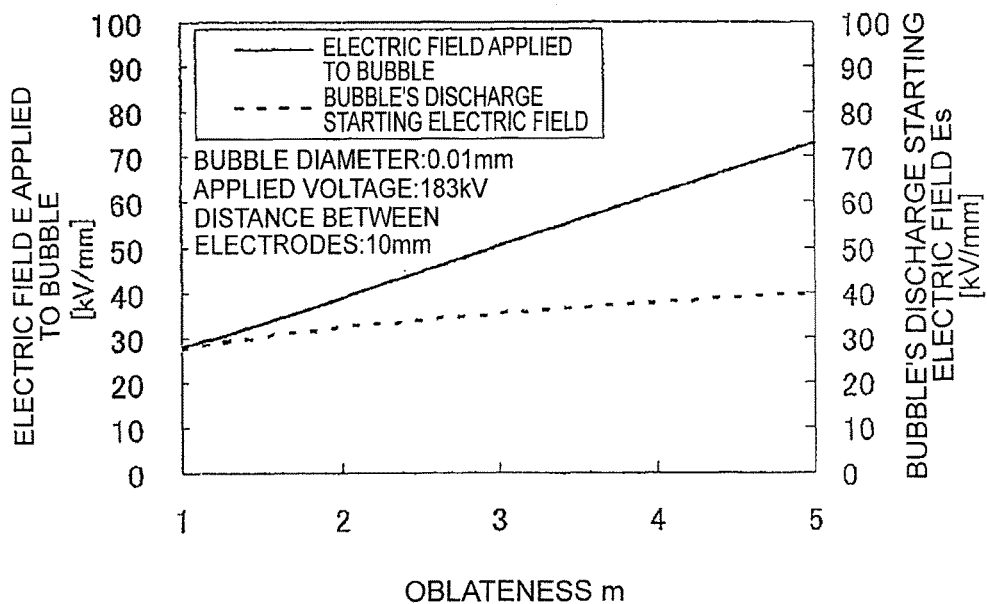
FIG. 40 is a graph showing a relation between the electric field applied to a bubble and the oblateness that is observed when the bubble has a diameter of 0.01 mm.

FIG. 38 is a graph showing a relation between an electric field applied to a bubble and the oblateness that is observed when the bubble has a diameter of 1 mm. FIG. 39 is a graph showing a relation between the electric field applied to a bubble and the oblateness that is observed when the bubble has a diameter of 0.1 mm. FIG. 40 is a graph showing a relation between the electric field applied to a bubble and the oblateness that is observed when the bubble has a diameter of 0.01 mm.

As shown in FIGS. 38 to 40, under any of the conditions, the amount of increase in a discharge starting electric field $E_s$ of a bubble is larger than the amount of increase in the electric field E applied to the bubble when the oblateness m increases. It is therefore concluded that, by flattening a bubble between the electrodes under a condition where the oblateness m is high, the electric field E can be applied to the bubble as an electric field that increases by an amount larger than the amount of increase of the bubble's discharge starting electric field.

OH radicals generated by main discharge react at the boundary between water to be treated, which is to be degraded, and a bubble, and increasing the areal dimension of contact on the gas-liquid boundary is important in terms of efficiency in the treatment of water to be treated. It is therefore desirable from the viewpoint of increasing the areal dimension of contact on the gas-liquid boundary to feed a large quantity of bubbles that have a small diameter into water to be treated.

A bubble whose diameter is in millimeters or less ascends by buoyancy in water while being shrunk and expanded repeatedly by the viscous resistance of water usually within an oblateness range of from 1 to 1.5 of the oblateness m, though there are variations depending on the bubble diameter and the bubble ascension rate. Accordingly, in Embodiment 32 and subsequent embodiments of the present invention, the areal dimension of contact on the gas-liquid boundary is increased while applying a higher electric field to a bubble by flattening the bubble between the electrodes so that the oblateness m is 1.5 or more (in other words, so that the half minor axis a is made short with respect to the half major axis b).

In a water treatment device and a water treatment method as described above, where a bubble emitted from the bubble hole 820 is sandwiched between the bubble hole 820 and the first discharge electrode 63a to be flattened and enter the discharge area, preliminary discharge can be caused in which an electric field that is extremely high compared to an electric field for starting discharge in the air is applied to the interior of the bubble. The bubble which has undergone preliminary discharge ascends by buoyancy a discharge area formed in water to be treated, thereby continuing discharge inside the bubble. OH radicals can thus be generated throughout the discharge area. This makes the treatment of more water to be treated possible, and the treatment efficiency can be improved by giving the treatment tank 1 a large capacity.

A bubble in water has fewer charged particles such as electrons and ions, which spark discharge, than in the atmospheric air, and accordingly has difficulties in causing discharge. This problem is more prominent for a bubble with a smaller bubble diameter, and may cause a discharge delay of several minutes or more till discharge since the application of an electric field. In the present invention, however, charged particles can be generated in a bubble by preliminary discharge as described above. The present invention can consequently reduce the discharge delay, which is on the order of $10^3$ to $10^5$ seconds at a bubble diameter of 1 mm in the past, to $30^{-7}$ seconds or less. This eliminates the need for X-ray irradiation or other countermeasures, and helps to cut cost as well.

As described above, the water treatment device according to Embodiment 32 includes a plurality of discharge electrodes and a bubble generating unit which is placed close to the discharge electrodes. The water treatment method includes the bubble flattening step in which a bubble emitted from the bubble hole 820 is flattened along the first discharge electrode 63a, and the preliminary discharge step in which preliminary discharge is caused through use of the flattened bubble. A high electric field is thus applied to the interior of the flattened bubble. With this structure, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

The bubble emitting nozzles 82 which are built from insulators in Embodiment 32 are not limited thereto. The bubble emitting nozzles 82 may be built from, for example, a conductive metal material such as stainless steel, iron, or copper. In the case of using such bubble emitting nozzles 82 that are built from a conductive metal material, it is preferred to ground the bubble emitting nozzles 8.

Embodiment 33

The preceding Embodiment 32 describes a case in which the second discharge electrodes 63b are disposed on wall surfaces of the treatment tank 1 so as to face each other across the first discharge electrode 63a placed at the center of the interior of the treatment tank 1. Embodiment 33 of the present invention, on the other hand, describes a case in which the very walls of the treatment tank 1 that face each other across the first discharge electrode 63a placed at the center of the interior of the treatment tank 1 serve as the second discharge electrodes 63b.

Figure 41:
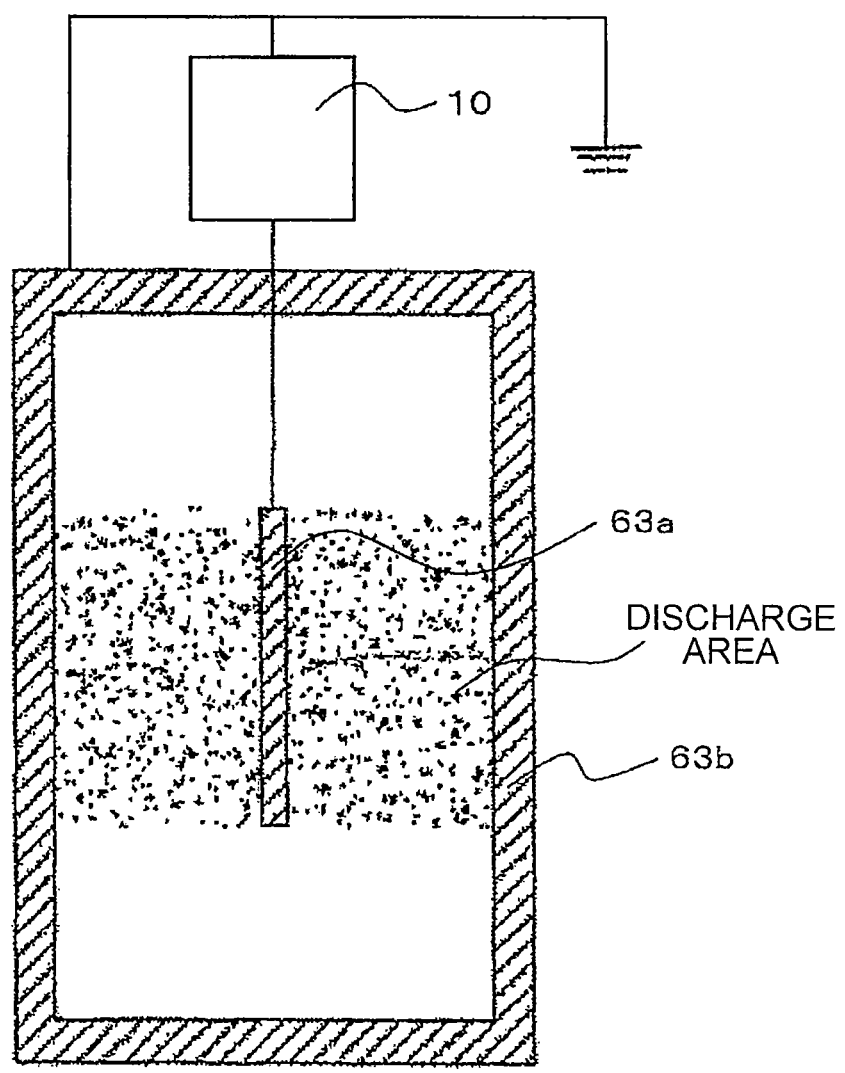
FIG. 41 is a structural diagram illustrating the placement of discharge electrodes of a water treatment device according to Embodiment 33 of the present invention.

FIG. 41 is a structural diagram illustrating the placement of the discharge electrodes 63a and 63b of a water treatment device according to Embodiment 33 of the present invention. As illustrated in FIG. 41, a container constituting the treatment tank 1 which is rectangular in section is formed from the material of the discharge electrodes 63a and 63b. In other words, the second discharge electrodes 63b are unitary with the treatment tank 1. The material used for the treatment tank 1 in Embodiment 33 of the present invention is, for example, a conductive material such as stainless steel, aluminum, or copper. The rest of the structure is the same as in Embodiment 32.

In the thus structured water treatment device of Embodiment 33 of the present invention, as in Embodiment 32, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

In addition, with the second discharge electrode placed all around the first discharge electrode, the discharge area can be wider than in Embodiment 32. This enables the water treatment device to treat an even larger amount of water to be treated.

Embodiment 34

The preceding Embodiment 33 describes a case in which the very walls of the treatment tank 1 serve as the second discharge electrodes 63b and the treatment tank 1 is a container that has a rectangular shape in section. However, the shape of the treatment tank 1 is not limited to one that is rectangular in section, and Embodiment 34 of the present invention describes a case in which the treatment tank 1 has a different shape in section.

Figure 42:
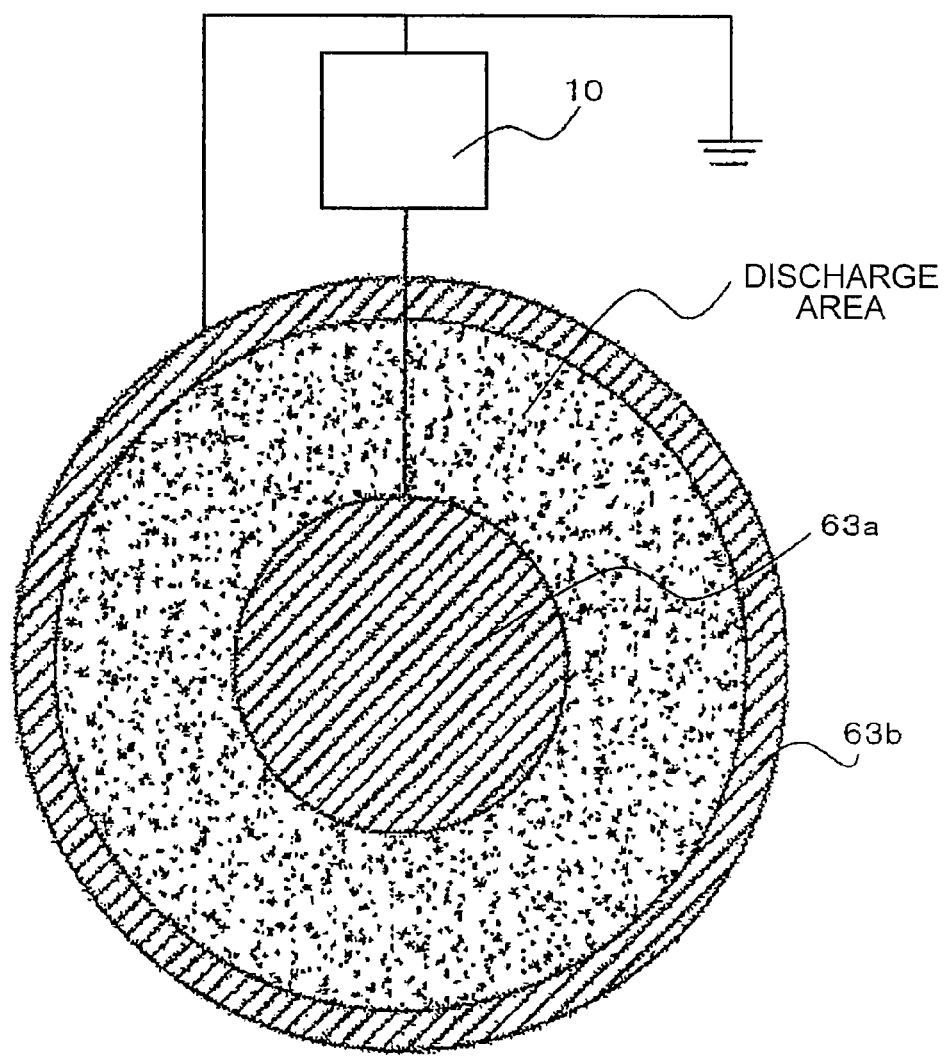
FIG. 42 is a structural diagram illustrating, in top view, the placement of discharge electrodes of a water treatment device according to Embodiment 34 of the present invention.

FIG. 42 is a structural diagram illustrating in top view the placement of the discharge electrodes 63a and 63b of the water treatment device according to Embodiment 34 of the present invention. As illustrated in FIG. 42, a cylindrical container is used as the treatment tank 1. The first discharge electrode 63a is shaped like a pillar that is substantially circular in section (shaped like a column). The rest of the structure is the same as in Embodiment 33.

In the thus structured water treatment device of Embodiment 34 of the present invention, as in Embodiment 32, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

In addition, as in Embodiment 33, with the second discharge electrode placed all around the first discharge electrode, the discharge area can be wider than in Embodiment 32. This enables the water treatment device to treat an even larger amount of water to be treated.

Embodiment 35

The preceding Embodiments 32 to 34 describe cases in which the bubble hole 820 is formed at the tip of each bubble emitting nozzle 82. Embodiment 35 of the present invention, on the other hand, describes a case in which the bubble hole 820 is formed in a tubular portion 810b, which is created by modifying the border plate 810.

Figure 43:
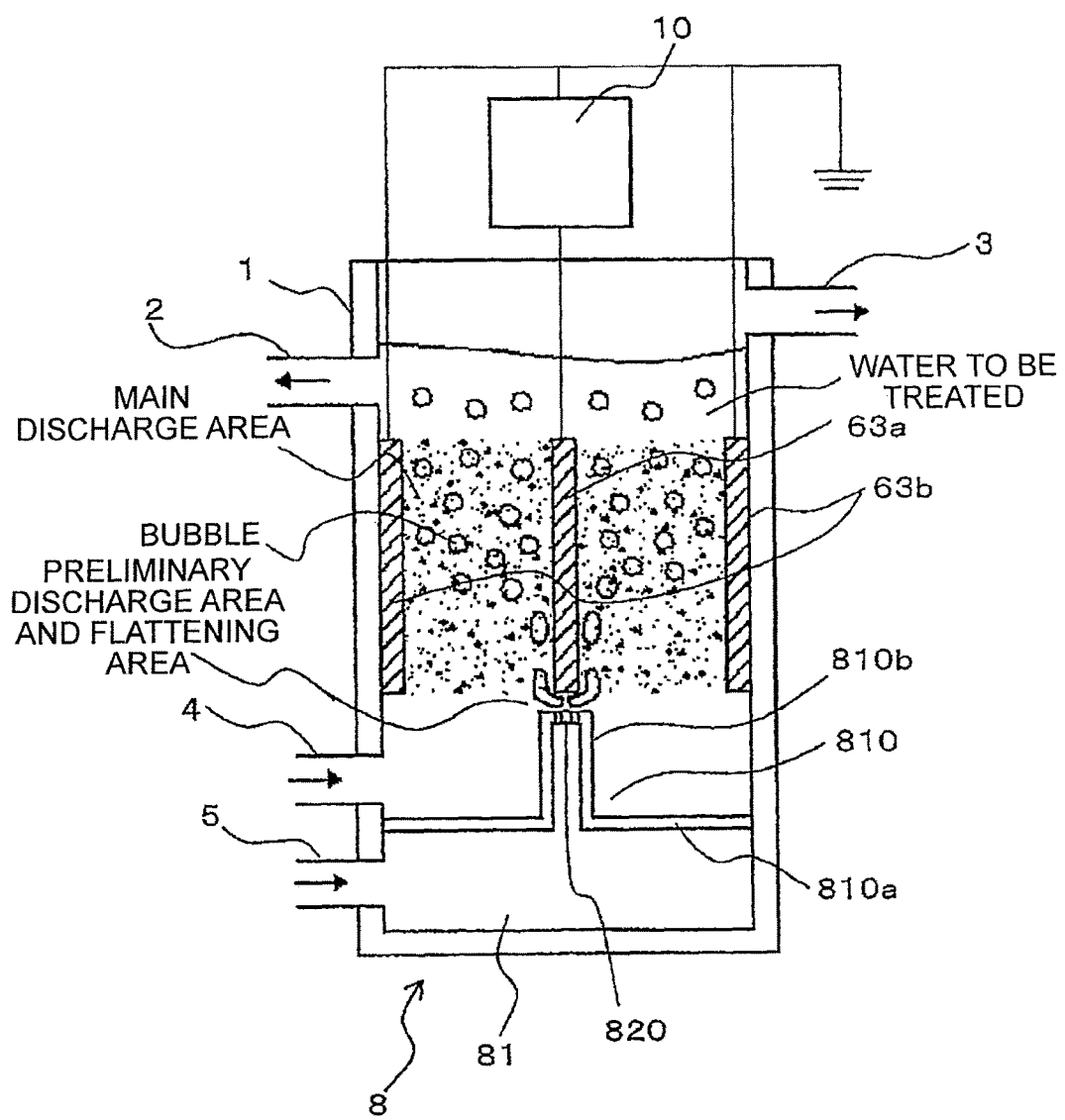
FIG. 43 is a structural diagram illustrating a water treatment device according to Embodiment 35 of the present invention.

FIG. 43 is a structural diagram illustrating a water treatment device according to Embodiment 35 of the present invention. As illustrated in FIG. 43, the border plate 810 is shaped so as to include a rectangular plate portion 810a, which is similar to the border plate 810 of Embodiment 32, and the tubular portion 810b, which is a portion opposed to the first discharge electrode 63a and which protrudes from the plate portion 810a to a point close to the first discharge electrode 63a.

The bubble hole 820 is formed as a hole opened in a surface of the tubular portion 810b where the tubular portion 810b and the first discharge electrode 63a face each other. The surface of the tubular portion 810b where the bubble hole 820 is formed and the first discharge electrode 63a are at a close distance from each other which is smaller than the bubble diameter. Accordingly, the bubble flattening unit 40 in Embodiment 35 of the present invention refers to the bubble generating unit 8, which has the bubble hole 820, and the first discharge electrode 63a as well, and a bubble emitted from the bubble hole 820 into water to be treated is sandwiched between the bubble hole 820 and the first discharge electrode 63a to be flattened. The rest of the structure is the same as in Embodiment 32.

In the thus structured water treatment device of Embodiment 35, as in Embodiment 32, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

While FIG. 43 illustrates a case in which the bubble emitting nozzle 82 that has the structure of Embodiment 35 of the present invention is applied to Embodiment 32, the same effect is obtained when this bubble emitting nozzle 82 is applied to Embodiments 33 and 34.

Embodiment 36

The preceding Embodiments 32 to 35 describe cases where preliminary discharge and main discharge are both caused in the same discharge area. Embodiment 36 of the present invention, on the other hand, describes a case in which discharge area for preliminary discharge and a discharge area for main discharge are provided separately from each other.

Figure 44:
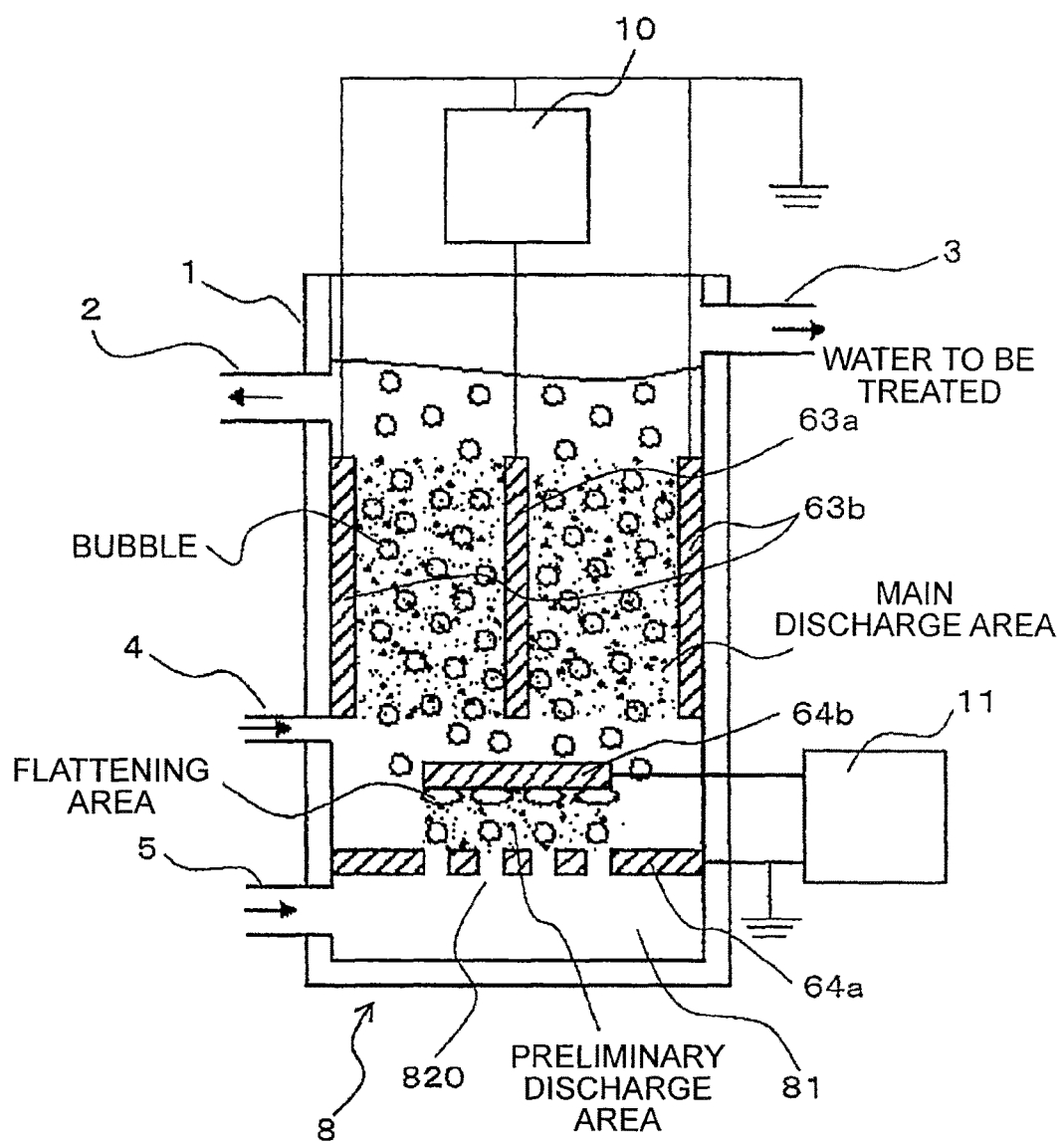
FIG. 44 is a structural diagram illustrating a water treatment device according to Embodiment 36 of the present invention.

FIG. 44 is a structural diagram illustrating a water treatment device according to Embodiment 36 of the present invention. In FIG. 44, the border plate 810 is used as a third discharge electrode 64a. The third discharge electrode 64a which is also the border plate 810 of Embodiment 36 of the present invention is therefore formed from the material of the discharge electrodes 63a and 63b. The third discharge electrode 64a has a plurality of holes (four in this example) each of which serves as the bubble hole 820.

A fourth discharge electrode 64b is provided in a place that is above the third discharge electrode 64a and below the first discharge electrode 63a and the second discharge electrodes 63b. In other words, the third discharge electrode 64a and the fourth discharge electrode 64b are placed below the first discharge electrode 63a and the second discharge electrodes 63b, and at a distance from each other in water to be treated.

The fourth discharge electrode 64b has the shape of a column. The fourth discharge electrode 64b is placed immediately above the bubble holes 820 with the longitudinal direction of the fourth discharge electrode 64b running along the width direction of the treatment tank 1 (the left-right direction in FIG. 44). In short, five discharge electrodes in total which are the first discharge electrode 63a, a pair of second discharge electrodes 63b, the third discharge electrode 64a, and the fourth discharge electrode 64b are provided in this example.

A bubble emitted from each bubble hole 820 which is formed in the third discharge electrode 64a thus ascends by buoyancy in water to be treated and comes into contact with the fourth discharge electrode 64b to be flattened. The bubble flattening unit 40 in Embodiment 36 of the present invention therefore refers to the third discharge electrode 64a, which is also the bubble generating unit 8, and the fourth discharge electrode 64b.

The third discharge electrode 64a and the fourth discharge electrode 64b are connected to a second pulse power supply (the second power supply) 11, which is provided separately from the pulse power supply 10. A preliminary discharge area (a second discharge area) is thus formed between the third discharge electrode 64a and the fourth discharge electrode 64b. The discharge area and the preliminary discharge area are formed in separate places in water to be treated by the placement of the first discharge electrode 63a, the pair of second discharge electrodes 63b, the third discharge electrode 64a, and the fourth discharge electrode 64b. The rest of the structure is the same as in Embodiment 32.

A water treatment method in Embodiment 36 of the present invention is described next. After a water-to-be-treated pouring step, the pulse power supply 10 applies a voltage to the discharge electrodes 63a and 63b to form a discharge area between the discharge electrodes 63a and 63b. The second pulse power supply 11 applies a voltage to the discharge electrodes 64a and 64b to form the preliminary discharge area between the discharge electrodes 64a and 64b (a discharge area forming step). A bubble generating step is executed at the same timing as the water-to-be-treated pouring step.

After the bubble generating step, a bubble emitted from each bubble hole 820 enters the preliminary discharge area while keeping in contact with the third discharge electrode 64a, ascends by buoyancy until coming into contact with the fourth discharge electrode 64b, and is flattened along the longitudinal direction of the fourth discharge electrode 64b (a bubble flattening step). This causes preliminary discharge inside the bubble (a preliminary discharge step). Thereafter, the bubble that has been flattened and has undergone preliminary discharge ascends around the column of the fourth discharge electrode 64b and enters the discharge area. The subsequent steps which are an OH radical generating step, a water-to-be-treated treating step, and a treated-water-to-be-treated releasing step are the same as those in Embodiment 32.

In the thus structured water treatment device of Embodiment 36, as in Embodiment 32, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

In addition, with the discharge electrodes for forming the discharge area and the discharge electrodes for forming the preliminary discharge area provided separately, voltage application for preliminary discharge and voltage application for main discharge can be controlled under their respective optimum conditions. This helps to cut power consumption.

Further, with bubble holes opened in the third discharge electrode 64a which is also the border plate, a larger quantity of bubbles than in Embodiments 32 to 35 can be emitted at once. This makes treatment in a wider extent possible and accordingly improves treatment efficiency.

The shape of the third discharge electrode 64a which is columnar in Embodiment 36 of the present invention is not limited thereto, and can be any shape that allows bubbles to ascend by buoyancy to the discharge area without staying around.

Embodiment 37

The preceding Embodiments 32 to 36 describe cases where the gas inlet 5 is provided below the water inlet 4. Embodiment 37 of the present invention, on the other hand, describes a structure with which the same effect is obtained when the gas inlet 5 is provided above the water inlet 4.

Figure 45:
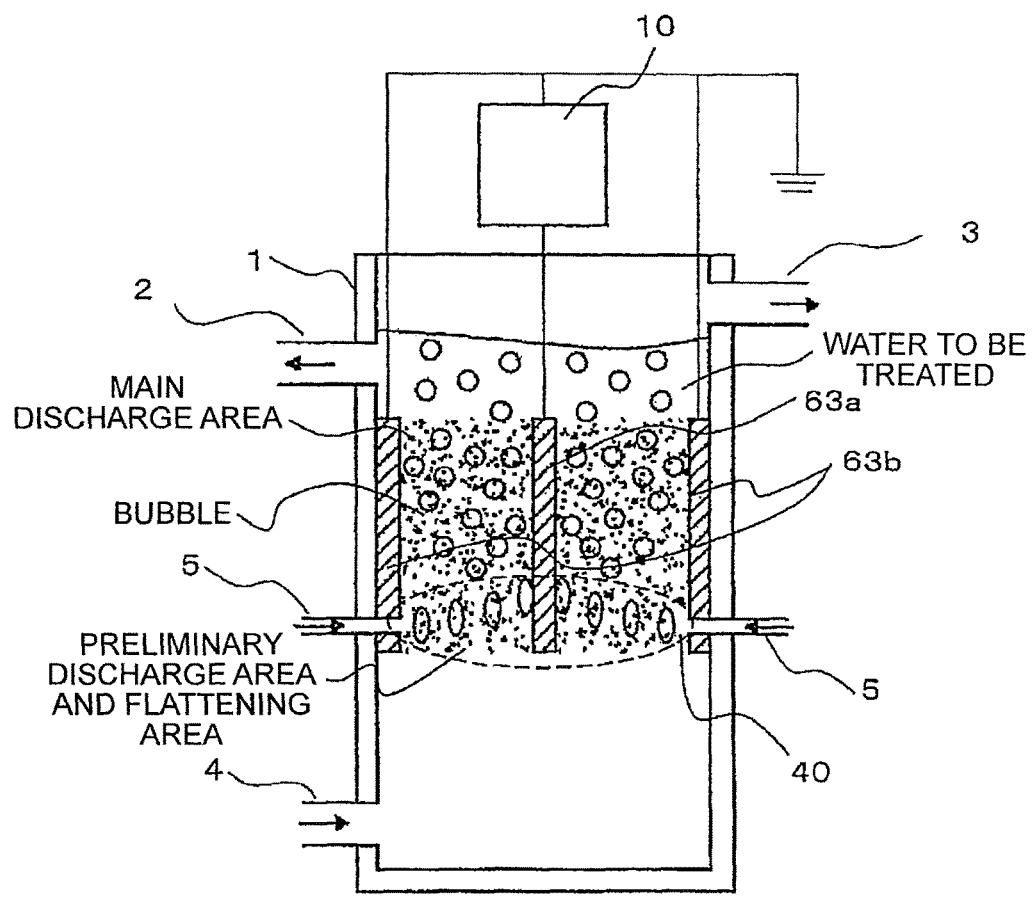
FIG. 45 is a structural diagram illustrating a water treatment device according to Embodiment 37 of the present invention.

FIG. 45 is a structural diagram illustrating a water treatment device according to Embodiment 37 of the present invention. As illustrated in FIG. 45, at least one gas inlet 5 is provided above the water inlet 4 for water to be treated. In this example, one gas inlet 5 is provided at each end in the width direction of the treatment tank 1. The gas inlets 5 are positioned so that bubbles can be emitted directly into a discharge area. The gas inlets 5 in this example are provided so as to pierce the lower part of the second discharge electrodes 63b through the treatment tank 1.

With this structure, where bubbles are emitted into the discharge area directly from the gas inlets 5, there is no need to separate the gas storage 81 from water to be treated in the treatment tank 1. The border plate 810 is therefore not provided.

In Embodiment 37 of the present invention, the flow rate of gas supplied from the gas supply 9 to the gas inlets 5 is increased from the one in Embodiments 32 to 36. Increasing the gas flow rate enhances the velocity at which bubbles are emitted from the gas inlets 5, and the bubbles are therefore greatly affected by the viscous resistance of water to be treated. This generates a resistance force against the travel direction of the bubbles (the height direction of the water treatment device), and the bubbles are therefore flattened from being stretched thin in a direction perpendicular to the bubble emission direction.

In Embodiment 37 of the present invention, the flow rate of water to be treated poured from the water inlets 4 is increased from the one in Embodiments 32 to 36. This enhances the flow velocity of water to be treated that circulates in the treatment tank 1. A bubble emitted into water to be treated is flattened thin along a direction in which the water to be treated flows (the height direction of the water treatment device), due to the impact of the bubble's inertial force on the flow of the water to be treated. The bubble flattening unit 40 in Embodiment 37 of the present invention therefore refers to a combination of the gas inlets 5 and the gas supply 9, and a combination of the gas inlets 5 and the water inlet 4. The rest of the structure is the same as in Embodiment 32.

In the thus structured water treatment device of Embodiment 37, as in Embodiment 32, preliminary discharge is caused in which a high electric field is applied to the interior of a bubble, and the bubble now containing charged particles owing to the preliminary discharge continues to discharge in the discharge area, thereby generating OH radicals. Consequently, OH radicals are generated in a large quantity in a shorter time than in the past, an effect of which is that water to be treated can be treated with high efficiency even when the treatment tank has a large capacity.

In addition, because bubbles are emitted into the treatment tank directly from the gas inlets instead of forming a separate bubble hole, there is no need to provide such members as a border plate and a bubble emitting nozzle, and the cost can be reduced further.

While a gas supplied from the gas supply 9 is an oxygen gas in the embodiments described above, the present invention is not limited thereto. For example, nitrogen, the air, steam, argon, or helium, or a mixture gas thereof can be used. When a mixture gas in which oxygen or steam is mixed with an inert gas of nitrogen is used, resultant OH radicals can have a long life span and the effect of degradation by OH radicals can be improved.

When a mixture gas of argon and oxygen, or argon and steam, is used, discharge can be caused by an electric field that is lower than when oxygen or steam is used alone. Means for generating steam can be one that heats water with an electric heater.

In the embodiments described above, water to be treated is treated while stored in the treatment tank 1, and water to be treated that has been treated is let out of the treatment tank 1. However, the present invention is not limited thereto, and may employ a structure in which water to be treated is circulated for the duration of a degradation time necessary to treat the water to be treated. This structure can be realized through use of, for example, a liquid mass flow controller or a pump.

The dimensions, materials, shapes, placement, and the like of the components that are written in the embodiments described above are not to limit the scope of the present invention thereto, unless specially noted otherwise, and are merely examples of how the present invention is carried out.

Although the above has specifically described the content of the present invention with reference to the preferred embodiments, it is self-evident that persons skilled in the art can adopt various kinds of modifications based on the basic technical concepts and teachings of the present invention.

The invention claimed is:

1. A water treatment device for treating water to be treated inside a treatment tank by generating a bubble in the water to be treated and causing discharge through use of the bubble, the water treatment device comprising:
   discharge electrodes placed in the water to be treated;
   a bubble generating unit having a bubble hole through which an externally supplied gas emerges as a bubble into the water to be treated; and
   a high-voltage power supply,
   wherein the bubble contacts at least one of the discharge electrodes placed in the water to be treated to flatten a shape of the bubble generated by the bubble generating unit,
   wherein the high-voltage power supply applies a high voltage between the discharge electrodes to form a discharge area in which discharge is caused inside the bubble, and
   wherein the flattened bubble is emitted into the discharge area
   wherein a longitudinal axis of the bubble hole faces a wall surface of or an end of the at least one of the discharge electrodes and a gap is provided between the bubble hole and the at least one of the discharge electrodes, and the bubble contacts the wall surface of, or at the end of, the at least one of the discharge electrodes that the bubble hole faces.

2. A water treatment device according to claim 1, wherein the gap is arranged between the bubble hole and the discharge electrodes, and the gap between the bubble hole and the discharge electrodes is equal to or smaller than a diameter of the bubble.

3. A water treatment device according to claim 1, wherein the bubble is flattened through use of an inertial force of the bubble that works on a flow velocity of the water to be treated when the bubble is transported in the water to be treated.

4. A water treatment device according to claim 2, wherein the bubble is flattened through use of an inertial force of the bubble that works on a flow velocity of the water to be treated when the bubble is transported in the water to be treated.

5. A water treatment device according to claim 1, wherein the discharge electrodes are a pair of discharge electrodes.

6. A water treatment device according to claim 2, wherein the discharge electrodes are a pair of discharge electrodes.

7. A water treatment device according to claim 1, wherein the discharge electrodes are two or more pairs of discharge electrodes that are arranged in series with respect to a travel direction of the bubble.

8. A water treatment device according to claim 2, wherein the discharge electrodes are two or more pairs of discharge electrodes that are arranged in series with respect to a travel direction of the bubble.

9. A water treatment device according to claim 1, wherein the discharge electrodes have a concentric structure comprising a column-shaped electrode and a cylindrically-shaped electrode.

10. A water treatment device according to claim 2, wherein the discharge electrodes have a concentric structure comprising a column-shaped electrode and a cylindrically-shaped electrode.

11. A water treatment device according to claim 1, wherein surfaces of the discharge electrodes are covered with a dielectric.

12. A water treatment device according to claim 2, wherein surfaces of the discharge electrodes are covered with a dielectric.

13. A method of treating water using the water treatment device of claim 1, comprising:
- a bubble generating step of generating, by the bubble generating unit, the bubble in the water to be treated inside the treatment tank;
- a bubble flattening step of flattening the bubble generated in the bubble generating step;
- a preliminary discharge step of causing preliminary discharge in which charged particles are generated inside the bubble, by emitting the bubble that has been flattened in the bubble flattening step into the discharge area and discharging by the discharge electrodes for the bubble; and
- a main discharge step of continuing the discharge by the discharge electrodes for the bubble during a period in which the bubble that has undergone the preliminary discharge in the preliminary discharge step stays in the discharge area.

14. A water treatment method according to claim 13, wherein, in the bubble flattening step, the bubble generated by the bubble generating unit in the water to be treated inside the treatment tank is emitted toward the discharge electrodes to be brought into contact with the discharge electrodes and thus flattened.

* * * * *